United States Patent
Iwami et al.

(10) Patent No.: US 10,667,206 B2
(45) Date of Patent: May 26, 2020

(54) INFORMATION PROCESSING DEVICE, INFORMATION PROCESSING SYSTEM, AND INFORMATION PROCESSING METHOD

(71) Applicant: Sony Corporation, Tokyo (JP)

(72) Inventors: Hideki Iwami, Saitama (JP); Katsutoshi Itoh, Tokyo (JP); Yoshihiko Ikenaga, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/164,839

(22) Filed: Oct. 19, 2018

(65) Prior Publication Data

US 2019/0053149 A1 Feb. 14, 2019

Related U.S. Application Data

(60) Continuation of application No. 16/022,149, filed on Jun. 28, 2018, now Pat. No. 10,172,080, which is a
(Continued)

(30) Foreign Application Priority Data

Feb. 12, 2014 (JP) .................................. 2014-024016

(51) Int. Cl.
*H04W 48/18* (2009.01)
*H04W 4/80* (2018.01)
(Continued)

(52) U.S. Cl.
CPC ............ *H04W 48/18* (2013.01); *H04H 20/00* (2013.01); *H04L 65/4069* (2013.01); *H04W 4/80* (2018.02);
(Continued)

(58) Field of Classification Search
CPC ................................ H04W 48/18; H04W 4/80
See application file for complete search history.

(56) References Cited

U.S. PATENT DOCUMENTS

| 8,135,947 B1 | 3/2012 | Evans et al. |
| 2007/0286140 A1 | 12/2007 | Kwon |

(Continued)

FOREIGN PATENT DOCUMENTS

| JP | 2008-278388 A | 11/2008 |
| JP | 2009-540661 A | 11/2009 |

(Continued)

OTHER PUBLICATIONS

Wifi Alliance: "Wi-Fi Certified MiracastTM': Extending the Wi-Fi Experience to Seamless Video Display", Internet Citation, XP002700078, Sep. 19, 2012, pp. 1-18.
(Continued)

*Primary Examiner* — Tuan H Nguyen
(74) *Attorney, Agent, or Firm* — Xsensus LLP

(57) ABSTRACT

Appropriate control is performed when communication is performed between a plurality of information processing devices. An information processing device performs real-time image transmission with another information processing device according to a Wi-Fi CERTIFIED Miracast specification. The information processing device includes a control unit. The control unit performs control such that setting request information for performing a setting related to the real-time image transmission is received from the other information processing device via an access point. The control unit performs control such that a setting request for performing the setting based on the setting request information is transmitted to the other information processing device through direct communication.

4 Claims, 41 Drawing Sheets

Related U.S. Application Data division of application No. 15/663,875, filed on Jul. 31, 2017, now Pat. No. 10,034,234, which is a continuation of application No. 15/112,319, filed as application No. PCT/JP2014/081810 on Dec. 2, 2014, now Pat. No. 9,775,107.

(51) Int. Cl.

| | | |
|---|---|---|
| *H04W 76/14* | (2018.01) | |
| *H04H 20/00* | (2009.01) | |
| *H04L 29/06* | (2006.01) | |
| *H04W 40/04* | (2009.01) | |
| *H04W 76/10* | (2018.01) | |
| *H04W 84/12* | (2009.01) | |
| *H04W 92/18* | (2009.01) | |
| *H04W 76/15* | (2018.01) | |
| *H04W 84/18* | (2009.01) | |

(52) U.S. Cl.
CPC .......... *H04W 40/04* (2013.01); *H04W 76/10* (2018.02); *H04W 76/14* (2018.02); *H04W 76/15* (2018.02); *H04W 84/12* (2013.01); *H04W 84/18* (2013.01); *H04W 92/18* (2013.01)

(56) References Cited

U.S. PATENT DOCUMENTS

| | | | |
|---|---|---|---|
| 2011/0069689 A1 | 3/2011 | Grandhi et al. | |
| 2011/0082940 A1 | 4/2011 | Montemurro et al. | |
| 2011/0122835 A1 | 5/2011 | Naito et al. | |
| 2011/0145935 A1 | 6/2011 | Adams et al. | |
| 2012/0178368 A1 | 7/2012 | Fleck | |
| 2013/0139210 A1 | 5/2013 | Huang et al. | |
| 2013/0166759 A1* | 6/2013 | Rajamani | H04L 69/22 709/227 |
| 2014/0365611 A1* | 12/2014 | Praveenkumar | H04L 69/24 709/219 |

FOREIGN PATENT DOCUMENTS

| | | |
|---|---|---|
| JP | 2013-505641 A | 2/2013 |
| JP | 2013-507028 A | 2/2013 |
| JP | 2013-150282 A | 8/2013 |
| JP | 2014-27360 A | 2/2014 |
| JP | 2014-505408 A | 2/2014 |
| JP | 2014-526843 A | 10/2014 |
| JP | 2015-503859 A | 2/2015 |
| WO | 2007/142481 A1 | 12/2007 |
| WO | 2007142481 A1 | 12/2007 |
| WO | 2011/035100 A2 | 3/2011 |
| WO | 2011035100 A2 | 3/2011 |
| WO | 2011/039718 A1 | 4/2011 |
| WO | 2011039718 A1 | 4/2011 |
| WO | 2012/040567 A | 3/2012 |
| WO | 2013/040249 A1 | 3/2013 |
| WO | 2013040249 A1 | 3/2013 |
| WO | 2013/096678 A2 | 6/2013 |
| WO | 2013096678 A2 | 6/2013 |

OTHER PUBLICATIONS

International Search Report dated Mar. 3, 2015, in PCT/JP2014/081810 filed Dec. 2, 2014.
Extended European Search Report dated Jul. 13, 2017 in Patent Application No. 14882336.2.
Office Action issued in Japanese Application 2015-562698 dated Sep. 4, 2018.
Extended European Search Report dated Oct. 30, 2018 in application No. 18190674, 8 pages.
Wi-Fi Certified Miracast(TM): Extending the Wi-Fi experience to seamless video display, XP-002700078, Sep. 19, 2012, Wi-Fi Alliance, 18 pages.
Japanese Office Action dated Sep. 4, 2018 in corresponding JP Application 2015-562698, 3 pages.

* cited by examiner

FIG.4

MANAGEMENT INFORMATION RETENTION UNIT
390

| TERMINAL IDENTIFICATION INFORMATION | FREQUENCY CHANNEL | RADIO WAVE PROPAGATION MEASUREMENT INFORMATION | | | | | | DEVICE INFORMATION | BAND USE LEVEL | DISPLAY FORM | STANDBY OR WAKE-UP | MULTI-RECEPTION DIVERSITY CORRES-PONDENCE |
|---|---|---|---|---|---|---|---|---|---|---|---|---|
| | | PER | BER | NUMBER OF RETRANS-MISSIONS OF PACKETS | THROUGHPUT | FRAME DROP | SIR (RSSI) | | | | | |
| 391 | 392 | 393 | | | | | | 394 | 395 | 396 | 397 | 398 |
| DSC200 | 60GHz | ... | ... | ... | ... | ... | ... | MOBILE | 20Mbps | SUB (PERIPHERAL CHANNEL) | STANDBY | NO |
| DR400 | 2.4GHz | ... | ... | ... | ... | ... | ... | STATIONARY | 20Mbps | MAIN (MIDDLE CHANNEL) | WAKE-UP | YES |

FIG. 5
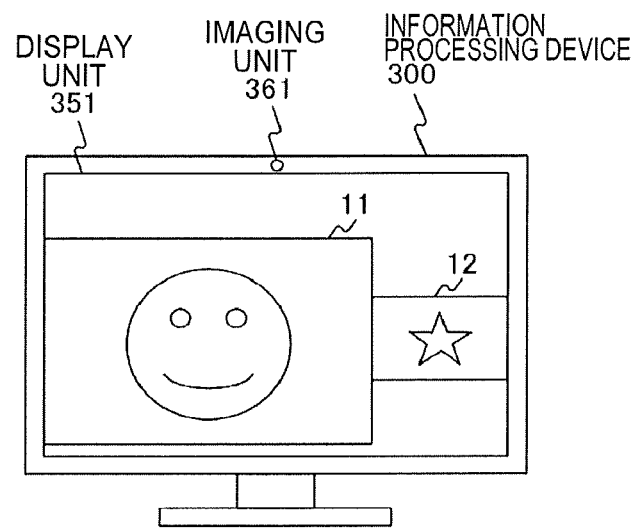
a
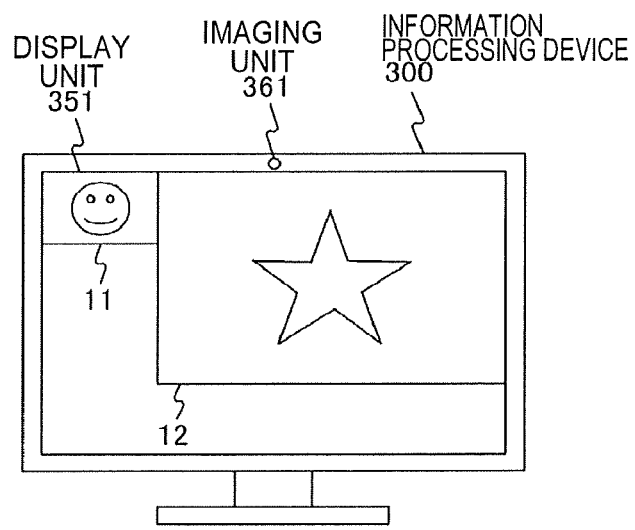
b

SETTING EXAMPLE OF MODE UNDER CONTROL OF SINK DEVICE

SETTING EXAMPLE OF MODE UNDER CONTROL OF SOURCE DEVICE

COMMUNICATION EXAMPLE OF CANCELLING standby MODE

FIG. 20

GROUP MANAGEMENT
INFORMATION RETENTION UNIT
750

| 751 | 752 | 753 | 754 | 755 | 756 |
|---|---|---|---|---|---|
| TERMINAL IDENTIFICATION INFORMATION | USER INFORMATION | COMMUNICATION MODE | GROUP PARTICIPATION STATE | OUTDOOR USE | AVAILABLE GROUP PARTICIPATION TIME |
| 0001 | STUDENT 1 | IMAGE TRANSMISSION MODE (PERIPHERAL CHANNEL) | PARTICIPATING | PERMITTED | ALL DAY |
| 0002 | STUDENT 2 | IMAGE TRANSMISSION MODE (MIDDLE CHANNEL) | PARTICIPATING | NOT PERMITTED | 20140206. 10:00 TO 15:00 |
| 0003 | STUDENT 3 | STANDBY MODE | PARTICIPATING | PERMITTED | ONLY 20140206 |
| 0004 | STUDENT 4 | – | NOT PARTICIPATING | PERMITTED | 20140206. 10:00 TO 15:00 |
| ⋮ | ⋮ | ⋮ | ⋮ | ⋮ | ⋮ |

FIG. 22
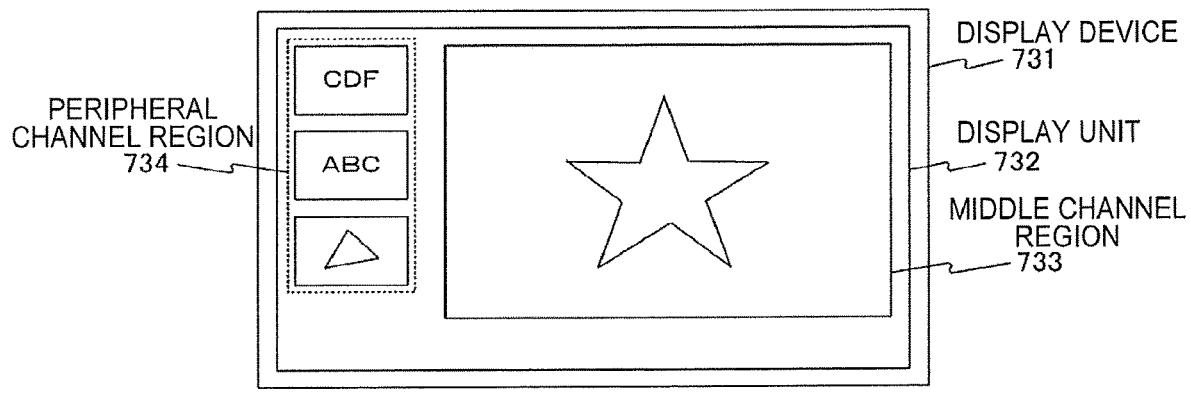
a
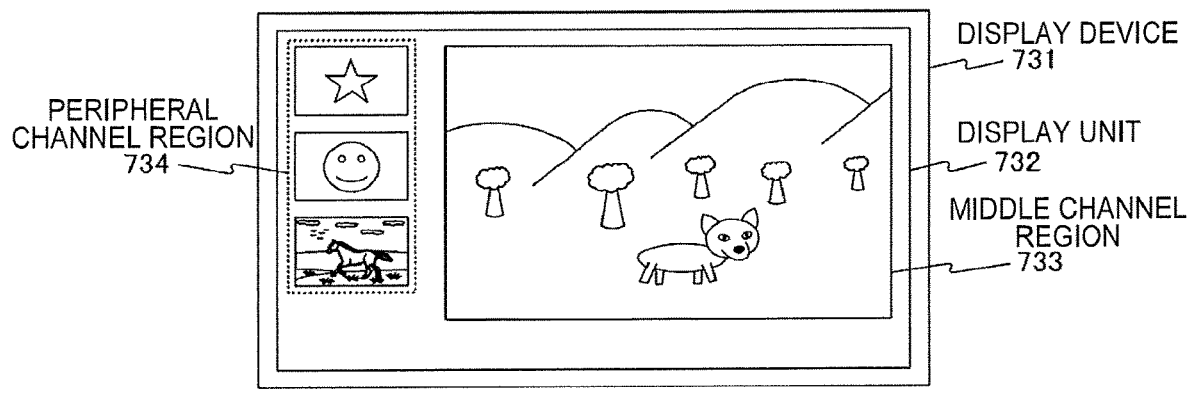
b
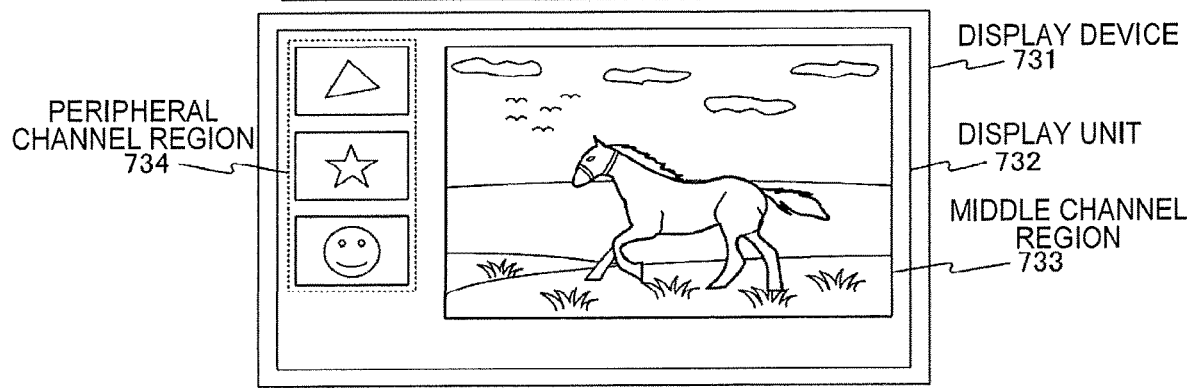
c

FIG. 34

WFD IE FORMAT EXAMPLE

| Field | Size (octets) | Value (Hexadecimal) | Description |
|---|---|---|---|
| Element ID | 1 | DD | IEEE 802.11 vendor specific usage |
| Length | 1 | Variable | Length of the following fields in the IE in octets. The length field is variable and set to 4 plus the total length of WFD subelements. |
| OUI | 3 | 50-6F-9A | WFA Specific OUI |
| OUI Type | 1 | 0A | Identifying the type or version of the WFD IE. Setting to 0x0A indicates WFA WFD v1.0 |
| WFD subelements | Variable | | One or more WFD Subelements appear in the WFD IE |

FIG. 35

General Format Of a WFD Subelement EXAMPLE

| Field | Size (octets) | Value (Hexadecimal) | Description |
|---|---|---|---|
| Subelement ID | 1 | | Identifying the type of WFD subelement. The specific value is defined in Table 5-3. |
| Length | 2 | Variable | Length of the following fields in the subelements |
| Subelements body field | Variable | | Subelement specific information fields |

FIG. 36

WFD Subelement ID Definitions EXAMPLE

| Subelement ID (Decimal) | Description |
|---|---|
| 0 | WFD Device Information |
| 1 | Associated BSSID |
| 2 | WFD Audio Formats |
| 3 | WFD Video Formats |
| 4 | WFD 3D Video Formats |
| 5 | WFD Content Protection |
| 6 | Coupled Sink Information |
| 7 | WFD Extended Capability |
| 8 | Local IP Address |
| 9 | WFD Session Information |
| 10 | Alternative MAC Address |
| 11 | New Device Information |
| 12-255 | Reserved |

FIG. 37

New Device Information Subelement EXAMPLE

| Field | Size (octets) | Value | Description |
|---|---|---|---|
| Subelement ID | 1 | 11 | |
| Length | 1 | Variable | Length of the following fields in the subelements. |
| New Device Information | 3 | | |

FIG. 38

New Device Information Field EXAMPLE

| Field | Size (octets) | Value | Description |
|---|---|---|---|
| 1:0 | 3 | Infra CONNECTION | [0] WIRELESS USE(1:Connected 0:Non-use)<br>[1] CABLE USE(1:Connected 0:Non-use) |
| 5:2 | | WIRELESS CAPABILITY | [5] TIME DIVISION CONNECTION OF SAME FREQUENCY CHANNEL (1:OK 0:NG)<br>[4] TIME DIVISION CONNECTION OF DIFFERENT FREQUENCY CHANNELS (1:OK 0:NG)<br>[3] SIMULTANEOUS CONNECTION OF SAME FREQUENCY CHANNEL (1:OK 0:NG)<br>[2] SIMULTANEOUS CONNECTION OF DIFFERENT FREQUENCY CHANNELS (1:OK 0:NG) |
| 10:8 | | Source Capability | 10: Infra USE(1:OK 0:Non-Available)<br>9: P2P USE(1:OK 0:Non-Available)<br>8: TLDS USE(1:OK 0:Non-Available) |
| 13:11 | | Sink Capability | 13: Infra USE(1:OK 0:Non-Available)<br>12: P2P USE(1:OK 0:Non-Available)<br>11: TLDS USE(1:OK 0:Non-Available) |
| 23:14 | | Frequency Channel | DESCRIBE Channel NUMBER WHEN WIRELESS USE IS Connected IN [1:0] |

FIG. 39

Payload OF ASP message EXAMPLE

| Field | Size (octets) | Value | Description |
|---|---|---|---|
| 1:0 | 3 | Infra CONNECTION | [0] WIRELESS USE(1:Connected 0:Non-use)<br>[1] CABLE USE(1:Connected 0:Non-use) |
| 5:2 | | WIRELESS CAPABILITY | [5] TIME DIVISION CONNECTION OF SAME FREQUENCY CHANNEL (1:OK 0:NG)<br>[4] TIME DIVISION CONNECTION OF DIFFERENT FREQUENCY CHANNELS (1:OK 0:NG)<br>[3] SIMULTANEOUS CONNECTION OF SAME FREQUENCY CHANNEL (1:OK 0:NG)<br>[2] SIMULTANEOUS CONNECTION OF DIFFERENT FREQUENCY CHANNELS (1:OK 0:NG) |
| 10:8 | | Source Capability | 10: Infra USE(1:OK 0:Non-Available)<br>9: P2P USE(1:OK 0:Non-Available)<br>8: TLDS USE(1:OK 0:Non-Available) |
| 13:11 | | Sink Capability | 13: Infra USE(1:OK 0:Non-Available)<br>12: P2P USE(1:OK 0:Non-Available)<br>11: TLDS USE(1:OK 0:Non-Available) |
| 23:14 | | Frequency Channel | DESCRIBE Channel NUMBER WHEN WIRELESS USE IS Connected IN [1:0] |

INFORMATION PROCESSING DEVICE, INFORMATION PROCESSING SYSTEM, AND INFORMATION PROCESSING METHOD

CROSS-REFERENCE TO RELATED APPLICATIONS

The present application is a continuation of U.S. patent application Ser. No. 16/022,149, filed Jun. 28, 2018, which is a divisional of U.S. patent application Ser. No. 15/663,875, filed Jul. 31, 2017 now U.S. Pat. No. 10,034,234, issued on Jul. 24, 2018, which is a continuation of U.S. patent application Ser. No. 15/112,319, filed Jul. 18, 2016, now U.S. Pat. No. 9,775,107, issued on Sep. 26, 2017 which is a National Stage Application based on PCT/JP2014/081810, filed Dec. 2, 2014, and claims priority to Japanese application no. 2014-024016, filed Feb. 12, 2014; the entire contents of each of which are incorporated herein by reference.

TECHNICAL FIELD

The present technology relates to an information processing device and more particularly, to an information processing device, an information processing system, and an information processing method in which various kinds of information are exchanged using wireless communication.

BACKGROUND ART

In the related art, wireless communication technologies for exchanging various kinds of data using wireless communication are blown. For example, information exchange devices that interchange various kinds of information through wireless communication between two wireless communication devices have been proposed (for example, see Patent Literature 1).

CITATION LIST

Patent Literature

Patent Literature 1: JP 2008-278388A

SUMMARY OF INVENTION

Technical Problem

According to the above-described technologies of the related art, various kinds of information can be interchanged between two information processing devices through wireless communication even when connection is not established by wired lines. For example, an image based on image data transmitted from a transmission side information processing device can be displayed on a display unit of a reception side information processing device.

Here, for example, when various kinds of information are interchanged between two information processing devices using wireless communication, a case in which communication is performed directly between the two information processing devices and a case in which communication is performed indirectly between the two information processing devices are assumed. Further, the case in which communication is performed indirectly between the two information processing devices includes, for example, a case in which communication is performed indirectly between the two information processing devices through another communication device (for example, an access point or a base station).

For example, when communication is performed directly between the two information processing devices, transition is assumed to be performed so that communication is performed indirectly between the two information processing devices. Further, when communication is performed indirectly between the two information processing devices, transition is assumed to be performed so that communication is performed directly between the two information processing devices. When switching of communication is performed as described above, it is important to perform appropriate control.

The present technology was made in light of the foregoing, and it is an object of the present technology to perform appropriate control when communication is performed between a plurality of information processing devices.

Solution to Problem

The present technology was made to solve the problem, and a first aspect thereof is an information processing device, an information processing method thereof, and a program for causing a computer to execute the information processing method, the information processing device performing real-time image transmission with another information processing device according to a wireless fidelity (Wi-Fi) CERTIFIED Miracast specification (technical specification Wi-Fi Display), and including: a control unit configured to perform control such that setting request information for performing a setting related to the real-time image transmission is received from the other information processing device via an access point, and a setting request for performing the setting based on the setting request information is transmitted to the other information processing device through direct communication. Thus, there is an operation in which setting request information is received from another information processing device via an access point, and a setting request is transmitted to another information processing device through direct communication.

According to the first aspect, the control unit may interchange capability information related to the information processing device with the other information processing device via the access point. The other information processing device may generate the setting request information based on the capability information. Thus, there is an operation in which capability information related to the information processing device is interchanged with another information processing device via the access point, and another information processing device generates the setting request information based on the capability information.

According to the first aspect, the control unit may perform control such that, when switching between a connection state with the other information processing device via the access point and a connection state with the other information processing device through the direct communication is performed, a connection process is performed using at least one of port information and IP information related to a connection before the switching. Thus, there is an operation in which, when switching between a connection state with another information processing device via the access point and a connection state with another information processing device through the direct communication is performed, a connection process is performed using at least one of port information and IP information related to a connection before the switching.

According to the first aspect, the control unit may perform control such that image transmission according to the Wi-Fi CERTIFIED Miracast specification is performed through the direct communication after the setting request is transmitted to the other information processing device. Thus, there is an operation in which the image transmission according to the CERTIFIED Miracast specification is performed through the direct communication after the setting request is transmitted to another information processing device.

According to the first aspect, the control unit may perform control such that an image displayed on a predetermined region in a display unit is transmitted through a wireless transmission path of a low frequency band, and an image displayed on a region larger than the predetermined region in the display unit is transmitted through a wireless transmission path of a high frequency band. Thus, there is an operation in which an image displayed on a predetermined region in a display unit is transmitted through a wireless transmission path of a low frequency band, and an image displayed on a region larger than the predetermined region in the display unit is transmitted through a wireless transmission path of a high frequency band.

According to the first aspect, the control unit may perform control such that the setting request is transmitted to the other information processing device through the direct communication based on a manipulation of a user. Thus, there is an operation in which the setting request is transmitted to another information processing device through the direct communication based on a manipulation of a user.

According to the first aspect, the control unit may perform control such that, when there are a plurality of information processing devices configured to perform image transmission through the direct communication, the setting request is transmitted to the other information processing device through the direct communication based on a predetermined order. Thus, there is an operation in which, when there are a plurality of information processing devices configured to perform the image transmission through the direct communication, the setting request is transmitted to another information processing device through the direct communication based on a predetermined order.

According to the first aspect, the control unit may perform control such that permission information indicating whether or not a connection with the other information processing device via an access point other than the access point or a base station is permitted is interchanged via the access point, and when the permission information indicating that the connection is permitted is received, an interchange with the other information processing device via the access point other than the access point or the base station is performed. Thus, there is an operation in which permission information is interchanged via the access point, and when the permission information indicating that the connection is permitted is received, an interchange with another information processing device via another access point or a base station is performed.

According to the first aspect, the control unit may perform control such that, when the permission information indicating that the connection is permitted is received, at least one of image data, and audio data is received from the other information processing device via the access point other than the access point or the base station and output. Thus, there is an operation in which, when the permission information indicating that the connection is permitted is received, at least one of image data and audio data is received from another information processing device via another access point or a base station and output.

According to the first aspect, the control unit may perform control such that information for performing the direct communication is interchanged using near field communication. Thus, there is an operation in which information for performing the direct communication is interchanged using near field communication.

A second aspect of the present technology is an information processing device, an information processing method thereof, and a program for causing a computer to execute the information processing method, the information processing device performing real-time image transmission with another information processing device according to a Wi-Fi CERTIFIED Miracast specification, and including: a control unit configured to perform control such that setting request information for performing a setting related to the real-time image transmission is transmitted to the other information processing device via an access point, and a setting request for performing the setting based on the setting request information is received from the other information processing device through direct communication. Thus, there is an operation in which setting request information is transmitted to another information processing device via an access point, and a setting request is received from another information processing device through direct communication.

A third aspect of the present technology is an information processing device, an information processing method thereof, and a program for causing a computer to execute the information processing method, the information processing device including: a control unit configured to perform control such that, when real-time image transmission is performed between a sink device and a plurality of source devices according to a Wi-Fi CERTIFIED Miracast specification, any one communication mode of a standby mode in which the sink device and the source devices are connected via an access point and an image transmission mode in which the sink device and the source devices are connected through direct communication is set in the source devices. Thus, there is an operation in which any one communication mode between a standby mode and an image transmission mode is set in a source device.

According to the third aspect, the control unit may perform control such that an image indicating the plurality of source devices is displayed on an input and output unit, and the communication mode is set in the source device based on an manipulation input in the input and output unit. Thus, there is an operation in which an image indicating a plurality of source devices is displayed on an input and output unit, and the communication mode is set in the source device based on a manipulation input in the input and output unit.

According to the third aspect, the control unit may perform control such that the communication mode is set in the source device based on a predetermined order. Thus, there is an operation in which the communication mode is set it the source device based on a predetermined order.

A fourth aspect of the present technology is an information processing system, an information processing method thereof, and a program for causing a computer to execute the information processing method, the information processing system including: a sink device configured to perform real-time image transmission with a source device according to a Wi-Fi CERTIFIED Miracast specification and perform control such that a setting request information for causing the source device to perform a setting related to the real-time image transmission is transmitted to the source device via an access point, and a setting request for performing the setting based on the setting request information is received from the source device through direct communication with the source device; and a control device configured to perform control such that, when the real-time image transmission is performed between the sink device and the plurality of source devices, any one communication mode of a standby mode in which the sink device and the source devices are connected via the access point and an image transmission mode in which the sink device and the source devices are connected through the direct communication is set in the source devices. Thus, there is an operation in which a sink device transmits setting request information to a source device via an access point and receives a setting request from the source device through direct communication, and a control device sets any one communication mode between a standby mode and an image transmission mode in the source device.

Advantageous Effects of Invention

According to the present technology an excellent effect that appropriate control can be performed when communication is performed between a plurality of information processing devices can be obtained. The effect described herein is not necessarily limited, and any effect described in the present disclosure may be included.

BRIEF DESCRIPTION OF DRAWINGS

FIG. 4 is a diagram schematically illustrating a content example retained in a management information retention unit 390 according to the first embodiment of the present technology.

FIG. 5 is a diagram illustrating a transition example of images displayed on a display unit 351 of the information processing device 300 according to the first embodiment of the present technology.

FIG. 20 is a diagram schematically illustrating a content example retained in a group management information retention unit 750 according to the second embodiment of the present technology.

FIG. 22 is a diagram illustrating a transition example of a display screen displayed on a display device 731 according to the second embodiment of the present technology.

FIG. 34 is a diagram illustrating an example of a WFD IE format interchanged between devices included in the communication system 700 according to the second embodiment of the present technology.

FIG. 35 is a diagram illustrating an example of a WFD IE format interchanged between devices included in the communication system 700 according to the second embodiment of the present technology.

FIG. 36 is a diagram illustrating an example of a WFD IE format interchanged between devices included in the communication system 700 according to the second embodiment of the present technology.

FIG. 37 is a diagram illustrating an example of a WFD IE format interchanged between devices included in the communication system 700 according to the second embodiment of the present technology.

FIG. 38 is a diagram illustrating an example of a WFD IE format interchanged between devices included in the communication system 700 according to the second embodiment of the present technology.

FIG. 39 is a diagram illustrating an example of a new message for an application service platform (ASP) interchanged between devices included in the communication system 700 according to the second embodiment of the present technology.

DESCRIPTION OF EMBODIMENTS

Hereinafter, modes (hereinafter, "embodiments") for carrying out the present technology will be described. The description will proceed in the following order:

1. First embodiment (example of controlling wireless communication based on user information or management information)

2. Second embodiment (example of switching connection between source device and sink device via access point and direct connection between source device and sink device)

3. Third embodiment (example of starting group authentication between source device and sink device using near field communication)

4. Fourth embodiment (example in which source device is automatically connected to access point or sink device)

5. Application examples

1. First Embodiment

[Configuration Example of Communication System]

Figure 1:
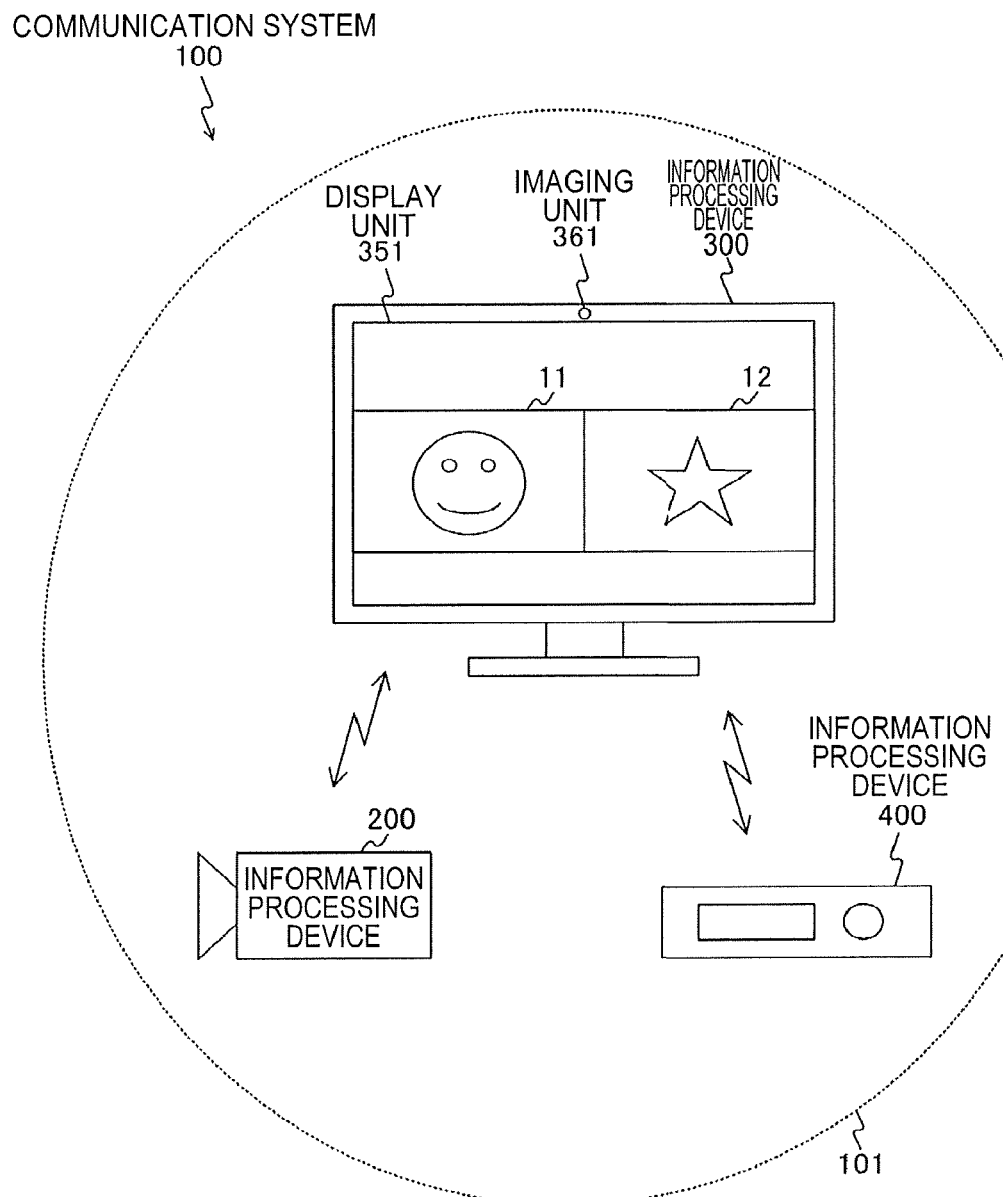
FIG. 1 is a block diagram illustrating a system configuration example of a communication system 100 according to a first embodiment of the present technology

FIG. 1 is a block diagram illustrating a system configuration example of a communication system 100 according to a first embodiment of the present technology.

The communication system 100 includes information processing devices 200, 300, and 400. The communication system 100 is a communication system in which the information processing device 300 receives data (for example, image data or audio data) transmitted from at least one of the information processing devices 200 and 400.

The information processing devices 200, 300, and 400 are transmission and reception devices that have a wireless communication function. The information processing devices 200, 300, and 400 are, for example, display devices (for example, personal computers) or portable information processing devices (for example, smartphones or tablet terminals) that have a wireless communication function. The information processing devices 200, 300, and 400 are, for example, wireless communication devices that conform to Institute of Electrical and Electronics Engineers (IEEE) 802.11, 802.15, or 802.16, 3rd Generation Partnership Project (3GPP) specification (for example, Wideband Code Division Multiple Access (W-CDMA)), Global system for Mobile Communications (GSM: registered trademark), Worldwide Interoperability for Microwave Access (Wi-MAX), WIMAX2, Long Term Evolution (LTE), LTE-A (Advanced), or the like. The information processing devices 200, 300, and 400 can interchange various kinds of information using the wireless communication function.

Here, an example of a case in which wireless communication using wireless Local Area Network (LAN) is performed between the information processing devices 200 and 300 or between the information processing devices 400 and 300 will be described.

As the wireless LAN, for example, Wireless Fidelity (Wi-Fi) Direct, Tunneled Direct Link Setup (TDLS), an ad-hoc network, or a mesh network can be used. As short-range wireless audio visual (AV) transmission communication used in the communication system 100, for example, Wi-Fi Certified Miracast (technical specification title: Wi-Fi Display) can be used. Wi-Fi Certified Miracast is a mirroring technology for transmitting an audio or a display image reproduced with one terminal to another terminal using the technology of Wi-Fi Direct or TDLS and outputting the audio or image data similarly with the other terminal.

In Wi-Fi Certified Miracast, user Input Back Channel (UIBC) is realized on Transmission Control Protocol/Internet Protocol (TCP/IP). UIBC is a technology for transmitting manipulation information of an input device such as a mouse or a keyboard from one terminal to another terminal. Instead of Wi-Fi Certified Miracast, another remote desktop software (for example, Virtual Network Computing (VNC)) may be applied.

Here, in Wi-Fi Certified Miracast, for example, it is established that an image (video) is compressed and decompressed using H.264. For example, in Wi-Fi Certified Miracast, H.264 can be adjusted on a transmission side. An embodiment of the present technology is not limited to H.264, but can also correspond to various codecs such as H.265 (for example, high efficiency video coding (HEVC) and scalable video coding extensions of high efficiency video coding (SHVC)) and Moving Picture Experts Group (MPEG4), Joint 1Photographic Experts Group (JPEG) 2000. Further, it can also correspond to a line-based codec in which one or more lines are bundled and compressed or two or more lines are divided into 2×2 or more macro blocks to be compressed and decompressed. For example, by obtaining a difference with a previous code amount region of a specific code amount region (such as a picture, a bundle of a plurality of lines, or a macro block), it is possible to correspond to a codec that reduces a transmission rate without performing compression such as DCT or Wavelet. Further, an image (video) may be transmitted or received with non-compression.

In the first embodiment of the present technology an example in which the information processing device 200 sets image data and audio data generated through an imaging operation as a transmission target will be described. In the first embodiment of the present technology, an example in which the information processing device 400 sets content (for example, content formed by image data and audio data) stored in a storage unit (for example, a hard disk) as a transmission target. An electronic device (for example, a PC, a game device, a smartphone, or a tablet terminal) on which a camera is mounted as the information processing device 200 may be used. Another electronic device (for example, an imaging device, a game device, a smartphone, or a tablet terminal) that includes a display unit as the information processing device 300 may be used. If the information processing device 400 has a tethering function, the information processing device 400 may acquire content stored in an internet services provider (IPS) via wireless or wired network and set the content as a transmission target.

For example, image data generated through an imaging operation of the information processing device 200 is transmitted to the information processing device 300 and an image 11 based on the image data is displayed on a display unit 351 of the information processing device 300. Further, content stored in a storage unit (for example, a hard disk) of the information processing device 400 is transmitted to the information processing device 300 and an image 12 based on this content is displayed on the display unit 351 of the information processing device 300.

In this way, in the first embodiment of the present technology, an example in which the information processing devices 200 and 400 serve as source side information processing devices (source devices) and the information processing device 300 serves as a sink side information processing device (sink device) will be described.

In FIG. 1, a range in which the information processing device 300 can perform direct communication via peer to peer (P2P) direct connection using wireless communication is indicated as an information transfer range 101. The information transfer range 101 is an information transfer range (a service range) based on the information processing device 300.

[Configuration Example of Information Processing Device (Source Device)]

Figure 2:
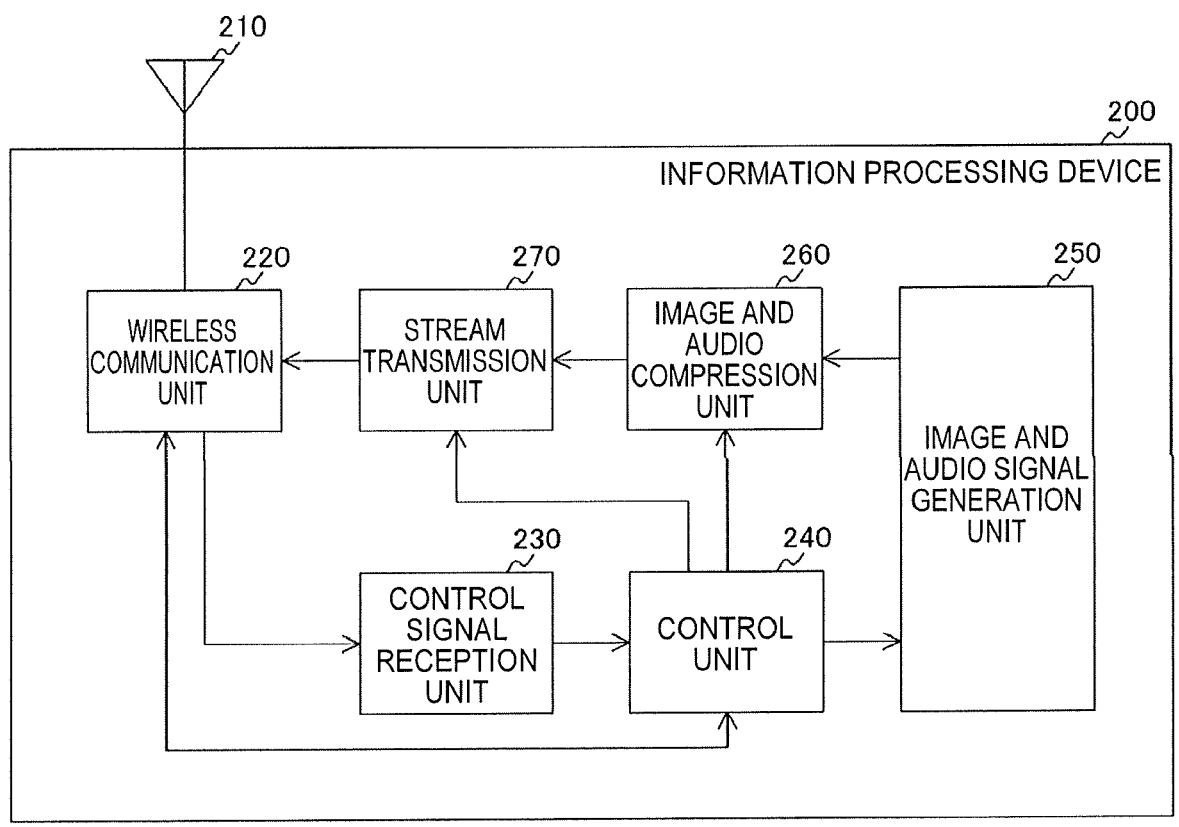
FIG. 2 is a block diagram illustrating a functional configuration example of an information processing device 200 according to the first embodiment of the present technology.

FIG. 2 is a block diagram illustrating a functional configuration example of the information processing device 200 according to the first embodiment of the present technology. The functional configuration of the information processing device 400 related to wireless communication is substantially the same as that of the information processing device 200. Therefore, in the first embodiment of the present technology, only the information processing device 200 will be described and the description of the information processing device 400 will be omitted.

The information processing device 200 includes an antenna 210, a wireless communication unit 220, a control signal reception unit 230, a control unit 240, an image and audio signal generation unit 250, an image and audio compression unit 260, and a stream transmission unit 270.

The wireless communication unit 220 transmits and receives each piece of information (for example, image data and audio data) to and from another information processing device (for example, the information processing device 300) via the antenna 210 using wireless communication under the control of the control unit 240. For example, when an image data transmission process is performed, the image data generated by the image and audio signal generation unit 250 is compressed by the image and audio compression unit 260 and the compressed image data (image stream) is transmitted from the antenna 210 via the wireless communication unit 220.

The wireless communication unit 220 is assumed to be able to transmit and receive each piece of information to and from another information processing device (for example, the information processing device 300) using a plurality of frequency channels. In the first embodiment of the present technology, an example in which the wireless communication unit 220 has a function of transmitting and receiving three kinds of frequency channels, 2.4 GHz, 5 GHz, and 60 GHz will be described. In this way, when the source device has the function of transmitting and receiving the plurality of frequency channels, a sink device (for example, the information processing device 300) can control a frequency channel to be used by each source device.

The control signal reception unit 230 acquires a control signal (for example, information interchanged with the information processing device 300) transmitted from another information processing device (for example, the information processing device 300) among the pieces of information received by the wireless communication unit 220. Then the control signal reception unit 230 outputs the acquired control signal to the control unit 240.

The control unit 240 performs control on each piece of information to be transmitted from the information processing device 200. For example, the control unit 240 performs control on the image and audio signal generation unit 250 and the image and audio compression unit 260 based on the control signal received by the control signal reception unit 230. For example, the control unit 240 performs control such that the number of channels of audio or the resolution of image data which is a transmission target is changed or performs control such that an image region of the image data which is a transmission target is changed. That is, the control unit 240 performs transmission control of a stream (for example, data transmission speed control, scalability transmission rate control) which is a transmission target based on the control signal received by the control signal reception unit 230.

The control unit 240 may have a function of measuring a radio wave propagation situation (link radio wave propagation situation) when data is transmitted to and received from the sink device using the wireless communication and may transmit a measurement result (radio wave propagation measurement information) to the sink device.

Here, the radio wave propagation measurement information is, for example, information used to determine whether line quality with the sink device is quality with which the image data and the audio data can be transmitted and received. The radio wave propagation measurement information is used for example, when stream transmission control (for example, the data transmission speed control, the scalability transmission rate control) is performed. The radio wave propagation measurement information will be described in detail with reference to FIG. 4. Instead of the radio wave propagation measurement information, the control unit 240 may count the number of retransmissions of the same packet and perform the stream transmission control corresponding to the counted number of retransmissions.

Here, the data transmission speed mainly means an occupancy ratio to a communication line and is assumed to include a meaning of a communication speed or a communication capacity. For example, the resolution is defined as an index of image quality configured to include a component such as an image frame (the number of vertical and horizontal pixels) of the image data, or a bit rate (compression ratio) of the image data. As the index of the quality, the throughput of a stream can be used. The number of channels of audio is assumed to include a meaning of an audio recording and reproducing method such as a monaural (1.0 ch) or a stereo (2.0 ch). The number of channels of audio is defined as an index of audio quality configured to include a component such as a bit rate (compression ratio) of audio data or the number of channels. As the index of the audio quality, the throughput of a stream can be used.

The control unit 240 performs control such that a state unstable in the data rate control is improved. For example, the control unit 240 comprehends system performance information of a sink device (for example, the information processing device 300) by interchanging information with the sink device. Here, the system performance information is, for example, performance information regarding the system of the sink device. For example, the system performance information is a usable frequency channel, a resolution, Transmission Control Protocol (TCP), and User Datagram Protocol (UDP). The system performance information is, for example, information indicating each of correspondence of an encryption method, correspondence of standard definition (SD)/high definition (HD), and correspondence of a low power consumption mode. For example, the control unit 240 can select a method for the stream transmission control (for example, the data transmission speed control and the scalability transmission rate control) to further improve the entire system stability of the communication system 100 according to whether the sink device corresponds to the lower power consumption mode.

For example, the control unit 240 is assumed to insert information regarding whether the information processing device 200 is a mobile device during interchange of information with the information processing device 300. For example, capability information regarding the information processing device 200 can include information regarding whether the information processing device 200 is a mobile device. When it is comprehended that the information processing device 200 is the mobile device, the information processing device 300 can determine that it is not necessary to operate the information processing device 200 based on association with other connected information processing devices. In this way, when it is determined that it is not necessary to operate the information processing device 200, the information processing device 200 receives a transmission stop command from the information processing device 300. When the control unit 240 comprehends the transmission stop command, the control unit 240 can be powered down the function of each of the image and audio signal generation unit 250, the image and audio compression unit 260, and the stream transmission unit 270 for a given time. The control unit 240 can transition the wireless communication unit 220 to intermittent reception (which is a mode in which the wireless communication unit 220 rises up periodically so that the wireless communication unit 220 can receive a command from the information processing device 300 and the device is powered down in other cases).

The image and audio signal generation unit 250 generates data (image data and audio data) which is an output target under the control of the control unit 240 and outputs the generated data to the image and audio compression unit 260. For example, the image and audio signal generation unit 250 includes an imaging unit (not illustrated) and an audio acquisition unit (not illustrated). The imaging unit (for example, a lens, an image sensor, or a signal processing circuit) images a subject and generates an image (image data). The audio acquisition unit (for example, a microphone) acquires a surrounding audio when the image data is generated. The data generated in this way is a transmission target to be transmitted to another information processing device (for example, the information processing device 300).

The image and audio compression unit 260 compresses (encodes) the data (the image data and the audio data) generated by the image and audio signal generation unit 250 under the control of the control unit 240. Then, the image and audio compression unit 260 outputs the compressed data (the image data and the audio data) to the stream transmission unit 270. The image and audio compression unit 260 may be realized by performing the encoding by software or may be realized by performing the encoding by hardware. The image and audio compression unit 260 is assumed to function as a codec, but is assumed to be able to handle an uncompressed image or audio. Further, the image and audio compression unit 260 can also function as a scalable codec. Here, the scalable codec means, for example, a codec which can be applied freely according to the resolution of a reception side information processing device (sink device), a network environment, or the like.

The stream transmission unit 270 performs a transmission process of transmitting the data (the image data and the audio data) compressed by the image and audio compression unit 260 as a stream from the antenna 210 via the wireless communication unit 220 under the control of the control unit 240.

The information processing device 200 can include a display unit, an audio output unit, and a manipulation reception unit in addition to the above-described units, but these units are not illustrated in FIG. 2. The example in which the information processing device 200 generates the image data and the audio data which are the transmission targets has been described. However, the information processing device 200 may acquire image data and audio data which are transmission targets from an external device. For example, the information processing device 200 may acquire image data and audio data which are transmission targets from a web camera equipped with a microphone. The information processing device 200 may set content (for example, content formed by image data and audio data) stored in a storage device (for example, a hard disk) as a transmission target irrespective of the inside or outside of the information processing device 200. In this case, the content stored in the storage device is also assumed to be compressed content. In this case, when the compressed content is compressed in accordance with an encoding scheme defined in a standard adopted in the communication system 100, the compressed content may be transmitted without being decrypted (decoded).

A display unit (not illustrated) of the information processing device 200 is, for example, a display unit that displays an image generated by the image and audio signal generation unit 250. As the display unit, for example, a display panel such as an electro-luminescence (EL) or crystal light-emitting diode (LED) display or a liquid crystal display (LCD) can be used.

An audio output unit (not illustrated) of the information processing device 200 is, for example, an audio output unit (for example, a speaker) that outputs an audio generated by the image and audio signal generation unit 250. An image can be output from both of a transmission device and a reception device, but an audio is preferably output from only one of the transmission device and the reception device.

A manipulation reception unit (not illustrated) of the information processing device 200 is a manipulation reception unit that receives a manipulation input performed by a user and is, for example, a keyboard, a mouse, a game pad, a touch panel, a camera, of a microphone. The manipulation reception unit and the display unit can be integrally configured using a touch panel capable of performing a manipulation input when the user touches or approaches a display surface with his or her finger.

[Configuration Example of Information Processing Device (Sink Side)]

Figure 3:
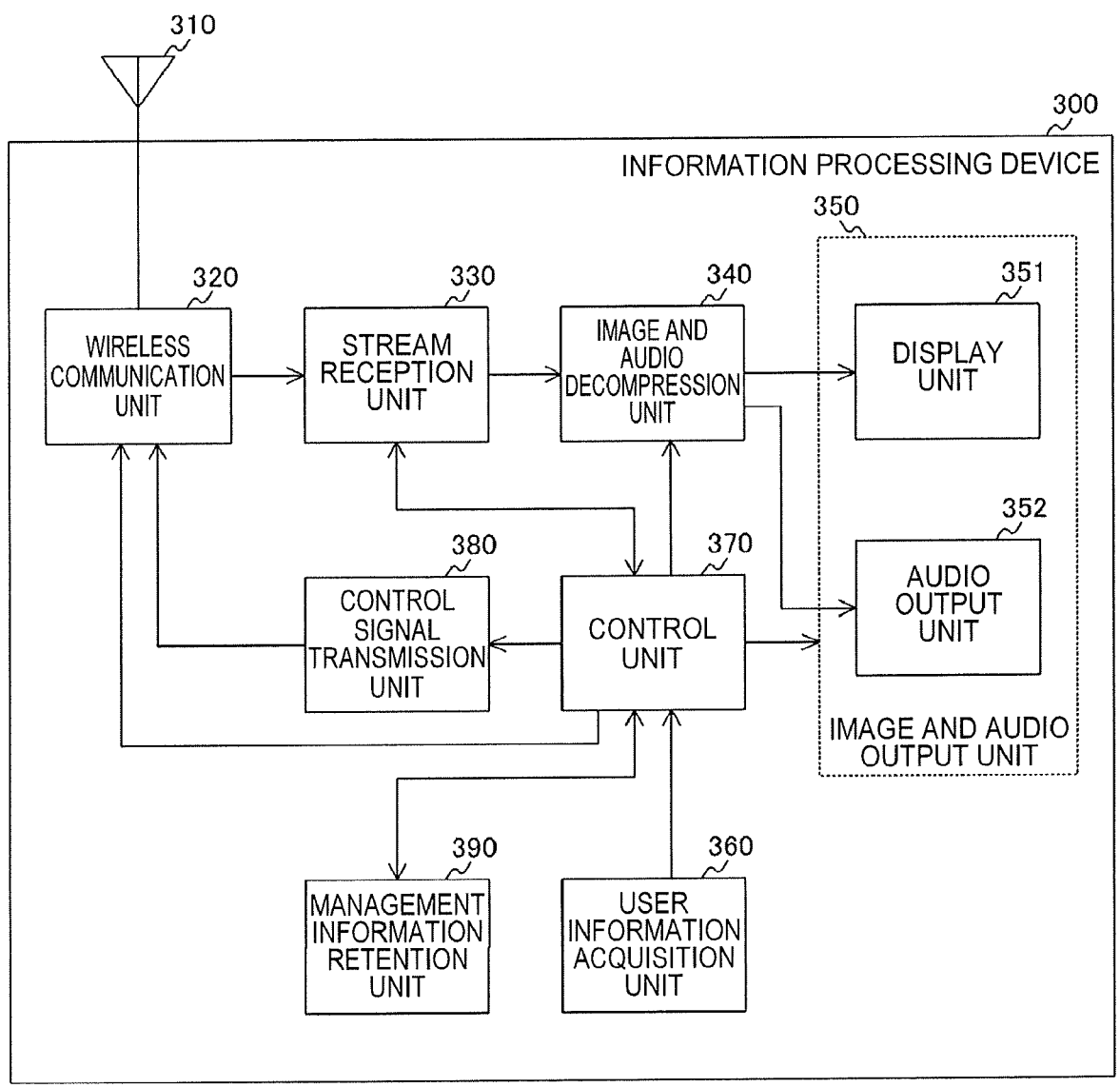
FIG. 3 is a block diagram illustrating a functional configuration example of an information processing device 300 according to the first embodiment of the present technology.

FIG. 3 is a block diagram illustrating a functional configuration example of the information processing device 300 according to the first embodiment of the present technology.

The information processing device 300 includes an antenna 310, a wireless communication unit 320, a stream reception unit 330, an image and audio decompression unit 340, an image and audio output unit 350, a user information acquisition unit 360, a control unit 370, a control signal transmission unit 380, and a management information retention unit 390.

The wireless communication unit 320 transmits and receives each piece of information (for example, image data and audio data) to and from another information processing device (for example, the information processing device 200) via the antenna 310 using wireless communication under the control of the control unit 370. For example, when an image data reception process is performed, the image data received by the antenna 310 is decompressed (decoded) by the image and audio decompression unit 340 via the wireless communication unit 320 and the stream reception unit 330. Then, the decompressed image data is supplied to the image and audio output unit 350 and an image according to the decompressed image data is output from the image and audio output unit 350. That is, the image according to the decompressed image data is displayed on a display unit 351.

The wireless communication unit 320 is assumed to be able to transmit and receive each piece of information to and from another information processing device (for example, the information processing device 200) using a plurality of frequency channels. In the first embodiment of the present technology, an example in which the wireless communication unit 320 has a function of transmitting and receiving three kinds of frequency channels, 2.4 GHz, 5 GHz, and 60 GHz will be described. That is, the wireless communication unit 320 can perform communication using a first frequency band and communication using a second frequency band of a higher data transmission speed than the first frequency band. The control unit 370 controls a frequency channel to be used among a plurality of frequency channels in wireless communication with each source device.

Link between the information processing devices 200 and 300 and link between the information processing devices 400 and 300 may be established with the same frequency channel or may be established with different frequency channels.

In the first embodiment of the present technology, an example in which the wireless communication unit 320 has the function of transmitting and receiving three kinds of frequency channels, 2.4 GHz, 5 GHz, and 60 GHz will be described, but an embodiment of the present technology is not limited thereto. For example, the wireless communication unit 320 may have a function of transmitting and receiving other frequency channels, two frequency channels, four or more frequency channels.

The stream reception unit 330 receives streams (for example, an image stream and an audio stream) and interchange information with each source device among the pieces of information received by the wireless communication unit 320 under the control of the control unit 370. Then, the stream reception unit 330 outputs the received command information to the control unit 370 and outputs the received streams to the image and audio decompression unit 340 and the control unit 370.

Here, the interchange information with each source device is information transmitted from a source device (for example, the information processing device 200) and includes, for example, a request for acquiring system performance information of the information processing device 300. The system performance information is, for example, information indicating a usable frequency channel, a resolution, TCP, and UDP or each of correspondence of an encryption method, correspondence of SD/HD, and correspondence of a low power consumption mode.

The stream reception unit 330 has a function of measuring a radio wave propagation situation (link radio wave propagation situation) when data is transmitted to and received from a sink device using the wireless communication. The stream reception unit 330 outputs a measurement result (radio wave propagation measurement information) to the control unit 370. The radio wave propagation measurement information will be described in detail with reference to FIG. 4.

The image and audio decompression unit 340 decompresses (decodes) the streams (image data and the audio data) transmitted from another information processing device (for example, the information processing device 200) under the control of the control unit 370. Then, the image and audio decompression unit 340 outputs the decompressed data (the image data and the audio data) to the image and audio output unit 350. The image and audio decompression unit 340 may be realized by performing the decoding by software or may be realized by performing the decoding by hardware. The image and audio decompression unit 340 is assumed to function as a codec, but is assumed to be able to handle an uncompressed image or audio. Further, the image and audio decompression unit 340 can also function as a scalable codec.

The image and audio output unit 350 includes a display unit 351 and an audio output unit 352.

The display unit 351 is a display unit that displays each image (for example, the images 11 and 12 illustrated in FIG. 1) based on the image data decompressed by the image and audio decompression unit 340. As the display unit 351, for example, a display panel such as an organic EL panel, a crystal LED display, an LCD panel can be used. As the display unit 351, a touch panel capable of performing a manipulation input when a user touches or approaches a display surface with his or her finger may be used.

The audio output unit 352 is an audio output unit (for example, a speaker) that outputs various audios (an audio and the like related to an image displayed on the display unit 351) based on the audio data decompressed by the image and audio decompression unit 340. Here, as an audio output method, for example, a method of reproducing only an audio of a source device allocated to a middle channel (a main image) from a speaker and reproducing no audio of a source device allocated to a peripheral channel (a sub-image) can be used. As another audio output method, for example, a method of setting the volume of an audio of a source device allocated to the middle channel as a main and lowering the volume of an audio of a source device allocated to the peripheral channel and reproducing the audio can be used. Other audio output methods may be used.

The user information acquisition unit 360 acquires information regarding a user (user information) and outputs the acquired user information to the control unit 370. For example, the user information acquisition unit 360 can acquire the user information by receiving an input from a manipulation reception unit (a keyboard, a mouse, a remote controller, a game pad, or a touch panel) for which the user can directly set a display method. The manipulation reception unit is, for example, a manipulation member that designates any region in an image displayed on the display unit 351. For example, the user information acquisition unit 360 can acquire the user in formation by receiving an input from a device which can comprehend a user's intention, such as a camera, a microphone, or any of various sensors (for example, gyro sensors and sensors detecting human bodies).

For example, the user information acquisition unit 360 acquires the user information generated through a user motion when information based on the stream received from another information processing device (for example, the information processing device 200) using the wireless communication is output from the image and audio output unit 350. The user information is, for example, user information generated through a user motion related to an image displayed on the display unit 351. For the user information is information example, generated based on a user manipulation related to the image displayed on the display unit 351.

The control unit 370 causes the management information retention unit 390 to retain each piece of information acquired by the stream reception unit 330 and manages each source device based on management information retained the management information retention unit 390. The control unit 370 performs the stream transmission control (for example, the data transmission speed control, and the scalability transmission rate control) so that stability is improved for streams transmitted from a plurality of source devices in the entire system.

For example, the control unit 370 performs the stream transmission control (for example, the data transmission speed control and the scalability transmission rate control) based on the user information acquired by the user information acquisition unit 360 and the management information retained in the management information retention unit 390. Specifically, the control unit 370 generates a control signal for each source device to perform the stream transmission control (for example, the data transmission speed control and the scalability transmission rate control) based on the management information retained in the management information retention unit 390 and outputs the generated control signal to the control signal transmission unit 380. For example, the control unit 370 changes the resolution of an image displayed on the display unit 351 based on the user information and the management information and generates a control signal to request a transmission rate equivalent to the resolution to each source device. For example, the control unit 370 generates a control signal to change a display region of an image on the display unit 351 based on the user information and the management information. For example, the control unit 370 generates a control signal to change the size of an image on the display unit 351 based on the user information and the management information.

The control unit 370 performs control such that a frequency channel and a resolution to be used are set based on the user information and the management information. For example, the control unit 370 sets a frequency channel to be used for each source device in the plurality of frequency channels of the wireless communication unit 320. When the power consumption mode is different from each frequency channel, the control unit 370 comprehends each mode and sets the frequency channel for caring the power consumption of a mobile device. That is, the control unit 370 can separately set a first power consumption mode related to the first frequency band and a second power consumption mode related to the second frequency band of a higher data transmission speed than the first frequency band.

The control signal transmission unit 380 performs a transmission process of transmitting the control signal output from the control unit 370 to another wireless communication device via the wireless communication unit 320 and the antenna 310.

The management information retention unit 390 is a table that retains information (management information) to manage each source device connected to the information processing device 300 using the wireless communication. Content retained in the management information retention unit 390 will be described in detail with reference to FIG. 4.

[Content Example Retained in Management Information Retention Unit]

FIG. 4 is a diagram schematically illustrating a content example retained in the management information retention unit 390 according to the first embodiment of the present technology.

The management information retention unit 390 is a table that retains information (management information) to manage each source device connected to the information processing device 300 using the wireless communication. For example, in the management information retention unit 390, terminal identification information 391, a frequency channel 392, a radio wave propagation measurement information 393, device information 394, a band use level 395, a display form 396, standby or wake-up 397, and multi-reception diversity correspondence 398 are retained in association therewith.

In the terminal identification information 391, identification information is stored to identify the source devices connected to the information processing device 300 using the wireless communication.

In the frequency channel 392, a frequency channel actually used by the source device connected to the information processing device 300 using the wireless communication is stored.

In the radio wave propagation measurement information 393, radio wave propagation measurement information regarding the source device connected to the information processing device 300 using the wireless communication is stored. The radio wave propagation measurement information is measured by the stream reception unit 330 for each source device connected to the information processing device 300 using the wireless communication.

As the radio wave propagation measurement information 393, for example, a packet error rate (PER), a bit error rate (BER), the number of retransmissions of packets, and a throughput are stored. As the radio wave propagation measurement information 393, for example, frame drop, a signal to interference ratio (SIR), and a received signal strength indicator (RSSI) are stored. Here, instead of the SIR, a signal to interference plus noise ratio (SINR) may be used. The radio wave propagation measurement information 393 illustrated in FIG. 4 is an example. At least one piece of information among the pieces of information may be stored or another piece of radio wave propagation measurement information may be measured by the stream reception unit 330 to be stored. The radio wave propagation measurement information measured by the source device may be acquired and stored. Packet delay received by a reception side may be determined and information regarding the packet delay may be used as radio wave propagation measurement information. The packet delay serves as one index related to radio wave propagation since delay occurs in transmission to the reception side through a retransmission process in layer 2 at the time of occurrence of an error. The packet delay serves as, for example, an index indicating where link characteristics deteriorate in a wireless system in which a plurality of devices share wireless bands.

In the device information 394, classification of the source device (an attribute of the source device) connected to the information processing device 300 using the wireless communication is stored. For example, either of a mobile device and a stationary device is stored as the classification of the source device. Either of a device of which a power source is inserted and another device may be stored as the classification of the source device. Either of a battery-driven device and another device may be stored as the classification of the source device.

In the band use level 395, a band use level of the source device connected to the information processing device 300 using the wireless communication is stored. As the band use level, for example, a resolution or a throughput can be used. For example, in the band use level, a throughput during use may be stored, a pre-decided table may be prepared and a number indicating correspondence of a range of the table may be stored and managed.

In the display form 396, a data display form (an output form) based on a stream transmitted from the source device connected to the information processing device 300 using the wireless communication is stored. For example, a display form (a main image (a middle channel) or a sub-image (a peripheral channel)) of the image data which is displayed on the display unit 351 and which is based on the stream transmitted from the source device is stored. For example, an output form (a main audio or a sub-audio) of the audio data which is output from the audio output unit 352 and which is based on the stream transmitted from the source device is stored. A format in which the peripheral channel is not displayed may be realized in accordance with the display form.

In the standby or wake-up 397, a mode (a standby mode or a wake-up mode) of the source device connected to the information processing device 300 using the wireless communication is stored. The standby mode and the wake-up mode will be described in detail with reference to FIGS. 6 to 8.

In the multi-reception diversity correspondence 398, information indicating whether the source device connected to the information processing device 300 using the wireless communication corresponds to the multi-reception diversity is stored.

In this way, the management information retained in the management information retention unit 390 is information for associating the identification information (the terminal identification information 391) used to identity the other information processing device with the capability information regarding the other information processing device for management. The management information retained in the management information retention unit 390 includes at least the information (the radio wave propagation measurement information 393) regarding the radio wave propagation measurement related to the communication with the other information processing device and the information (the standby or wake-up 397) regarding power consumption as the capability information regarding the other information processing device. The management information retained in the management information retention unit 390 includes the information (the display form 396) regarding a display form for displaying the image information as the capability information regarding the other information processing device. The information regarding the display form is, for example, information indicating that the image information is displayed as main information or sub-information.

[Transition Example of Image]

FIG. 5 is a diagram illustrating a transition example of images displayed on the display unit 351 of the information processing device 300 according to the first embodiment of the present technology.

FIG. 5*a* illustrates an example of a display form in which the images 11 and 12 are displayed on the display unit 351 of the information processing device 300 by setting the image 11 as a middle channel and setting the image 12 as a peripheral channel.

FIG. 5*b* illustrates an example of a display form in which the images 11 and 12 are displayed on the display unit 351 of the information processing device 300 by setting the image 11 as a peripheral channel and setting the image 12 as a middle channel.

For example, a case in which each of the information processing devices 200 and 400 transmits a stream (the image data and the audio data) with a standard resolution to the information processing device 300 is assumed. In this case, as illustrated in FIG. 1, the image 11 based on the image data from the information processing device 200 and the image 12 based on the image data from the information processing device 400 can be displayed on the display unit 351 of the information processing device 300 so that the sizes of the images 11 and 12 are the same. In this example, a given resolution and a display region are defined to be the same, but a scaler function may be added to the display unit 351 so that the images 11 and 12 are resealed and displayed on the display unit 351. However, in the embodiments of the present technology to facilitate the description, this function is assumed not to be used in the description.

In the display forms of the images 11 and 12, for example, the display forms set at the time of the previous communication may be retained and the images 11 and 12 may be displayed on the display unit 351 of the information processing device 300 according to the display forms.

The display forms of the images 11 and 12 may be decided based on an order of connection to the information processing device 300. For example, a case in which the information processing device 200 is first connected to the information processing device 300 and the information processing device 400 is connected to the information processing device 300 after the connection is assumed. In this case, the images 11 and 12 are displayed on the display unit 351 of the information processing device 300 by setting the image 11 as the middle channel and setting the image 12 as the peripheral channel. That is, the images may be displayed in the procedure of the middle channel and the peripheral channel based on the order of the connection to the information processing device 300.

As illustrated in FIG. 5*a*, when the images 11 and 12 are displayed on the display unit 351 by setting the image 11 as the middle channel and setting the image 12 as the peripheral channel, user information for setting the image 12 as the middle channel is assumed to be acquired by the user information acquisition unit 360. For example, when a viewer performs a manipulation of setting the image 12 as the middle channel using a pointer such as a remote controller or a gesture, the user information for setting the image 12 as the middle channel is acquired by the user information acquisition unit 360. In this case, as illustrated in FIG. 5*b*, the images 11 and 12 are displayed on the display unit 351 by setting the image 12 as the middle channel and setting the image 11 as the peripheral channel. Further, display positions of the images 11 and 12 on the display surface of the display unit 351 are decided based on user information (for example, a manual manipulation or a line of sight) acquired by the user information acquisition unit 360.

[Communication Example]

Figure 6:
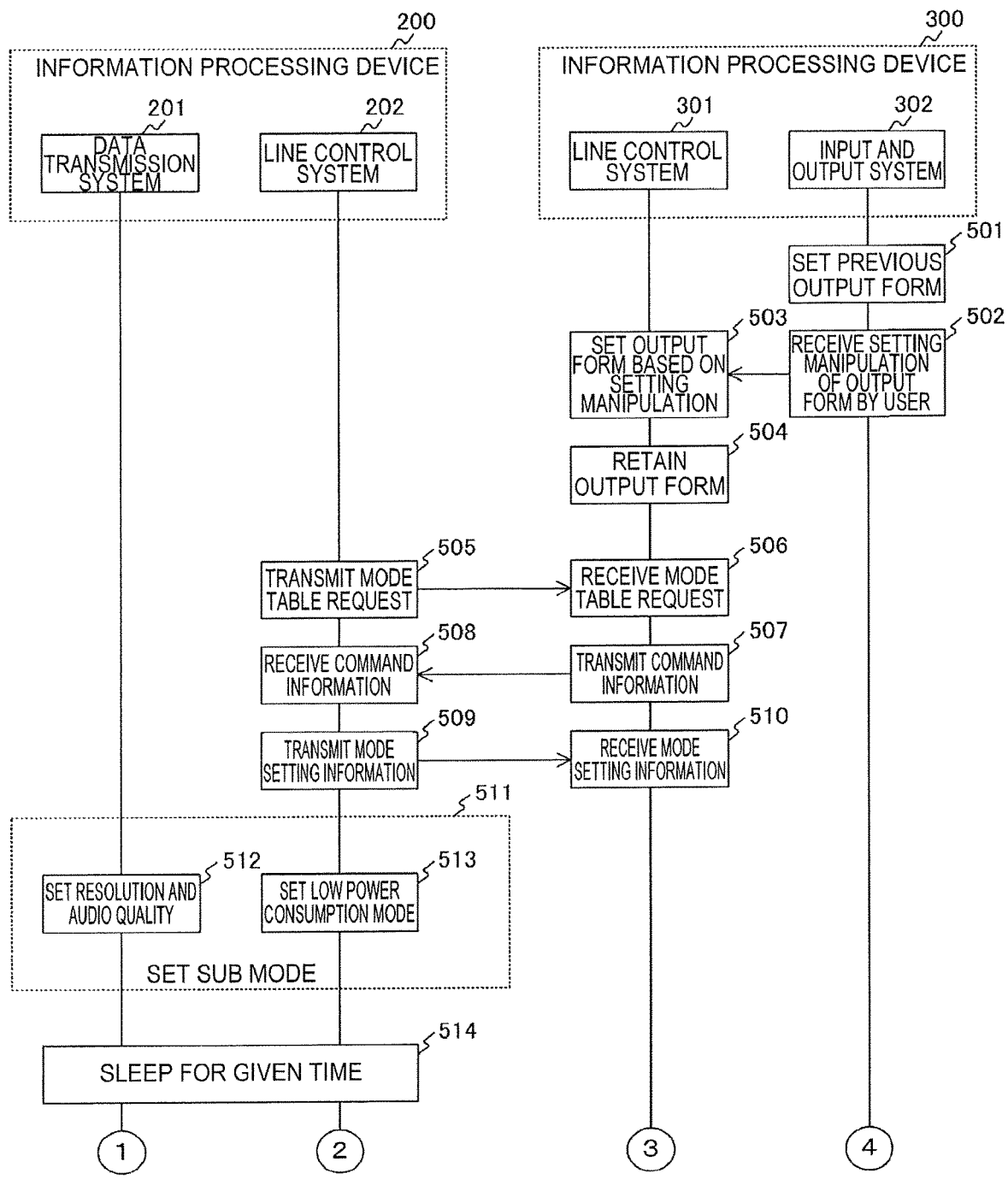
FIG. 6 is a sequence chart illustrating a communication process example between devices included in the communication system 100 according to the first embodiment of the present technology.
Figure 7:
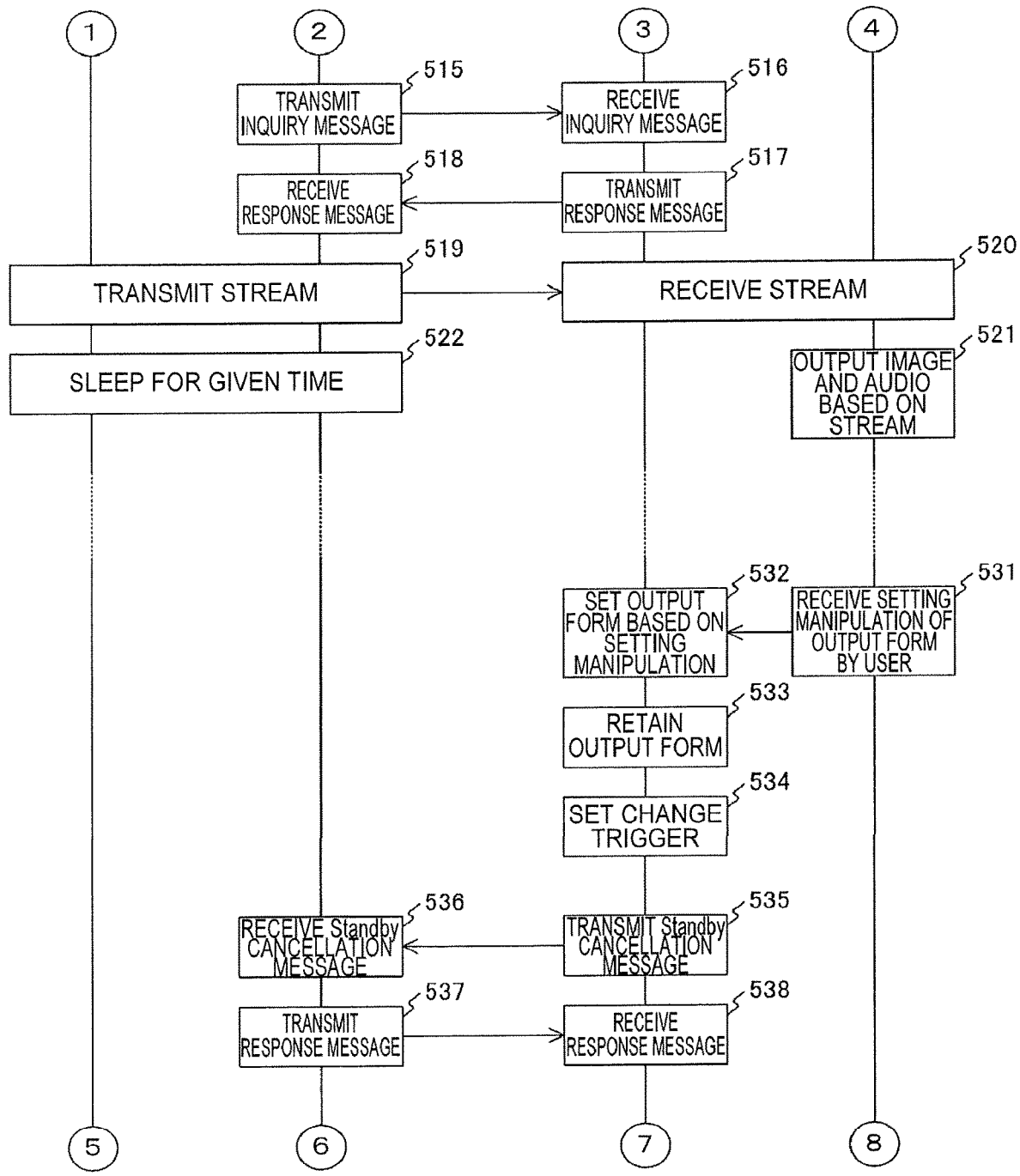
FIG. 7 is a sequence chart illustrating a communication process example between devices included in the communication system 100 according to the first embodiment of the present technology.
Figure 8:
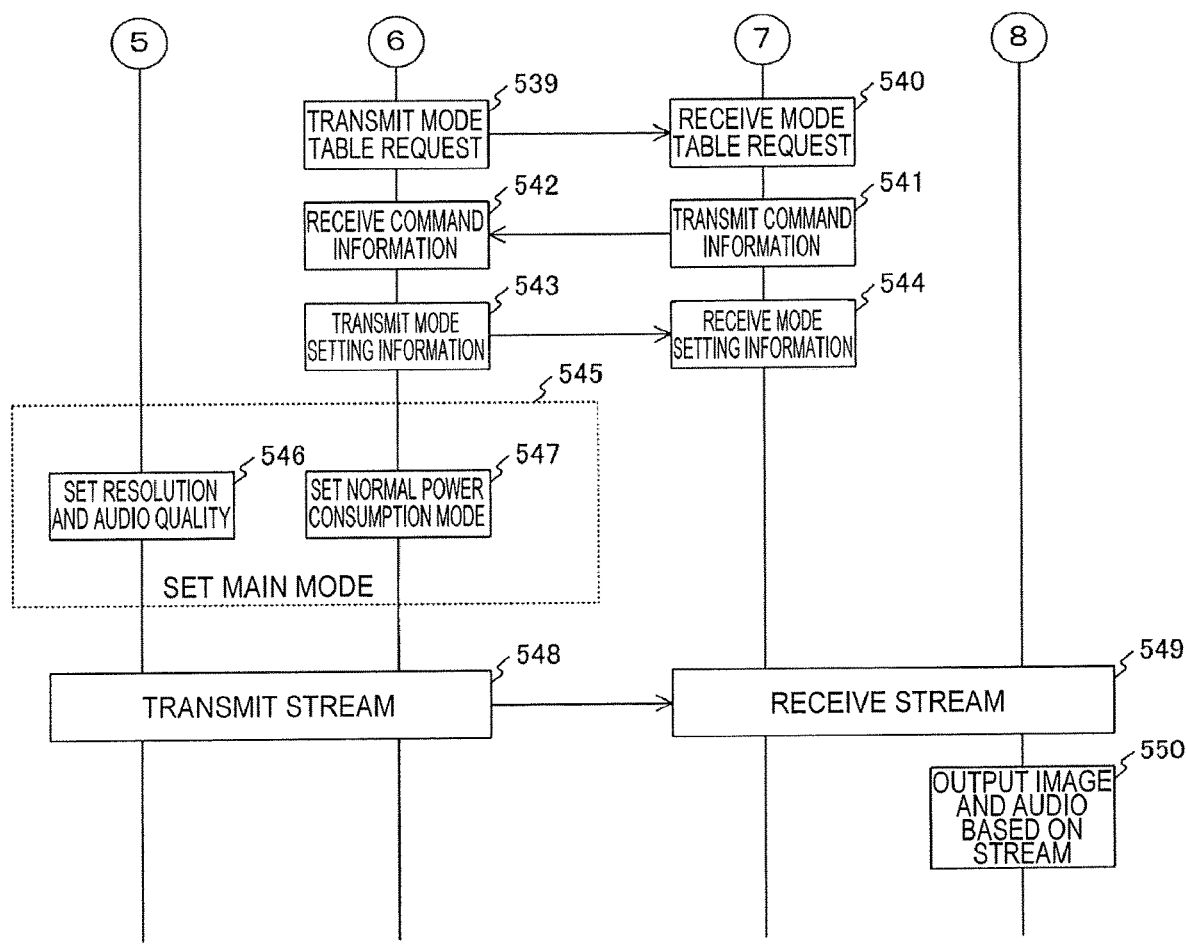
FIG. 8 is a sequence chart illustrating a communication process example between devices included in the communication system 100 according to the first embodiment of the present technology.

FIGS. 6 to 8 are sequence charts illustrating a communication process example between the devices included in the communication system 100 according to the first embodiment of the present technology. FIGS. 6 to 8 illustrate an example of a communication process between a the information processing devices 200 and 300.

In FIGS. 6 to 8, the image and audio signal generation unit 250, the image and audio compression unit 260, and the stream transmission unit 270 among the units included in the information processing device 200 are illustrated as a data transmission system 201. The antenna 210, the wireless communication unit 220, the control signal reception unit 230, and the control unit 240 are illustrated as a line control system 202.

In FIGS. 6 to 8, the antenna 310, the wireless communication unit 320, the stream reception unit 330, the control unit 370, and the control signal transmission unit 380 in the configuration of the information processing device 300 are illustrated as a line control system 301. The image and audio decompression unit 340, the image and audio output unit 350, and the user information acquisition unit 360 are illustrated as an input and output system 302.

In FIGS. 6 to 8, first, an example in which an image based on the image data from the information processing device 200 is displayed as a peripheral channel on the display unit 351 of the information processing device 300 and a low power consumption mode is set in the information processing device 200 is illustrated. Subsequently, an example in which an image based on the image data from the information processing device 200 is displayed as a middle channel on the display unit 351 and a normal power consumption mode is set in the information processing device 200 is illustrated. That is, in FIGS. 6 to 8, a connection setup example of the information processing devices 200 and 300 and a transition example of the power consumption mode in the information processing device 200 are illustrated.

First, when the information processing device 300 is powered up, a previous output form (which is an output form when the information processing device 300 is powered down) is set as an output form (which is an image display form and an audio output form) of the information processing device 300 (501). The control unit 370 of the information processing device 300 causes the management information retention unit 390 to retain the management information of each source device connected to the information processing device 300 using the wireless communication (illustrated in FIG. 4). As illustrated in FIG. 5, the control unit 370 of the information processing device 300 causes the display unit 351 to display the images 11 and 12 corresponding to two streams respectively transmitted from the information processing devices 200 and 400 based on the previous output form.

Subsequently, a case in which the user performs a manipulation of setting the output form (changing manipulation) is assumed (502). In this case, a control signal related to the setting manipulation is acquired as the user information by the user information acquisition unit 360 and the user information is output to the control unit 370. Then, the control unit 370 changes the content retained in the management information retention unit 390 (illustrated in FIG. 4) based on the user information (503 and 504). For example, as illustrated in FIG. 5*b*, a case in which the setting manipulation (changing manipulation) is performed to set the image 11 based on the image data from the information processing device 200 as the peripheral channel is assumed. In this case, the control unit 370 changes the display form 396 (illustrated in FIG. 4) of the information processing device 200 in the management information retention unit 390 to "SUB" (503 and 504).

The information processing device 200 transmits a mode table request on inquiry request of the resolution, the audio quality, the low power consumption mode, and the like) to the information processing device 300 periodically or aperiodically (also including only the start time) (505 and 506). The mode table request is a request for transmitting each piece of information (which is information used to communicate with the information processing device 200 with the management information regarding the information processing device 300 (for example, resolution information or the like which can be displayed by the information processing device 200)) managed in the information processing, device 300.

When the information processing device 300 receives the mode table request (506), the information processing device 300 transmits command information according to the mode table request (507 and 508). The command information is information regarding the information processing device 200 used for the information processing device 300 to give a setting demand to the information processing device 200 along with the radio wave propagation environment and the display form. For example, the command information is information that includes output form information (for example, a middle channel and a peripheral channel) of the resolution and the audio quality, whether to correspond to the low power consumption mode, a maker name, and presence or absence of a multi-reception diversity function. For example, the command information is information that includes the resolution and the audio quality, the kinds of image and audio codecs, presence of absence of a 3D function presence or absence of the content protection, the display size of a display device, topology information, a usable protocol, setting information (port information or the like) of the protocol, connection interface information (the type of connector or the like), horizontal synchronization and vertical synchronization positions, performance priority request information of a source device, a mode control table response to whether to correspond to the low power consumption mode, a maximum transmission throughput or a receivable maximum throughput of wireless transmission, central processing unit (CPU) power, a battery remaining quantity and power supply information. Each piece of information is included in a part of capability information. Here, the output form information of the resolution and the audio quality regarding the information processing device 200 is, for example, information indicating whether the display form of the data from the information processing device 200 is a main form (a middle channel) or a sub-form (a peripheral channel). The information processing device 300 transmits the command information including a demand for the setting of the resolution and the audio quality or the low power consumption mode as a parameter from the viewpoint of the information processing device 300. Besides each piece of information regarding the information processing device 200, the information processing device 300 may transmit each piece of information regarding all the source devices as the command information. In this case, the information processing device 200 selects and uses only information dedicated for the own information processing device. When a device that conforms to Wi-Fi Certified Miracast, the device corresponds to wfd-audio-codecs, wfd-video-formats, wfd-content-protection, wfd-displayedid, wfd-coupledsink, wfd-client-rtpports, wfd-I2C, wfd-uibcca-pability wfd-connectortype, wfd-sandby-resume-capability and the like defined as RTSP Message, but message content to be transmitted is assumed not to be limited in these commands.

When the information processing device 200 receives the command information (508), the control unit 240 of the information processing device 200 specifies whether the output form of the data from the information processing device 200 is the main form or the sub-form based on the command information. Based on the command information, the control unit 240 of the information processing device 200 determines whether the information processing device 300 has a function corresponding to a power consumption operation mode. Subsequently, the control unit 240 of the information processing device 200 transmits mode setting information indicating that the specified output form is set to the information processing device 300 (509 and 510). Here, the sub-form is assumed to be specified as the output form of the data from the information processing device 200. The information processing device 300 is assumed to have a function corresponding to the low power consumption mode. Accordingly, the control unit 240 of the information processing device 200 transmits mode setting information for notifying the information processing device 300 that the specified output form (sub-form) is set and the low power consumption mode is set, to the information processing device 300 (509 and 510).

In this example, the example in which the image is specified as the middle channel or the peripheral channel and the low power consumption mode is set based on the command information has been described, but the low power consumption mode may be set without using the determination of the middle channel or the peripheral channel as a reference. For example, the low power consumption mode may be set by interchanging a permission flag indicating that the mode can transition to the low power consumption mode between the source and sink devices.

Subsequently, the control unit 240 of the information processing device 200 sets a image transmission mode (the peripheral channel) as the transmission mode (511). Accordingly, in the data transmission system 201, audio quality is set to output a resolution and sub-audio for displaying the peripheral channel (512). In the line control system 202, the low power consumption mode is set (513).

Here, when the low power consumption mode is set in this way, both of the sink and source devices are assumed to have the function. For example, a mobile device (for example, a cellular phone, a smartphone, or a tablet terminal) is driven by a battery to operate in many cases. Therefore, when the output form of the data from the own information processing device is not the main form (when the output form is the sub-form), it is desirable to reduce battery consumption of the own information processing device as much as possible. Accordingly, in the source device in which the output form in the sink device is set to the sub-form, it is desirable to set the low power consumption mode. Further, in the setting process (512), only an audio of the source device allocated to the middle channel may be set to be reproduced from a speaker and the audio of the source device allocated to the peripheral channel may be set not to be reproduced. The volume of the audio of the source device allocated to the middle channel may be set as a main and the volume of the audio of the source device allocated to the peripheral channel may be set to be lowered and reproduced.

In this way, the control unit 370 of the information processing device 300 performs control such that the low power consumption mode in the information processing device 200 is set when the output form is set as the peripheral channel (sub-display). That is, the control unit 370 of the information processing device 300 performs control such that the power consumption mode is set in the information processing device 200 based on the output form of the display unit 351 in which the image information is output based on the stream.

When the low power consumption mode is set in this way (513), the control unit 240 of the information processing device 200 starts intermittent transmission (514 to 522).

Specifically, the information processing device 200 stops the transmission process only for a given time and sleeps each unit (514). Subsequently, when the given time passes (514), the information processing device 200 wakes up each unit of the information processing device 200 to perform the transmission process and performs the transmission process to the information processing device 300 (515 to 520).

For example, the control unit 240 of the information processing device 200 transmits an inquiry message for confirming whether any change is made in the information processing device 300 to the information processing device 300 (for example, a change in the output form) (515 and 516).

When the inquiry message is received (516), the control unit 370 of the information processing device 300 transmits a response message to the information processing device 200 to notify whether any change is made (for example, the change in the output form) (517 and 518). Here, it is assumed that no change is made in the information processing device 300 (for example, the change in the output form). Therefore, the control unit 370 of the information processing device 300 transmits a response message for notifying that no change is made (for example, the change in the output form) to the information processing device 200 (517 and 518).

When the response message indicating that no change is made (for example, the change in the output form) in this way (518), it is not necessary to change the setting in the information processing device 200. Therefore, the control unit 240 of the information processing device 200 transmits a stream for outputting the peripheral channel and the sub-audio to the information processing device 300 (519 and 520). When the information processing device 300 receives the stream in this way (520), the information processing device 300 outputs the image and the audio based on the received stream (521). For example, as illustrated in FIG. 5b, the image 11 based on the stream from the information processing device 200 is displayed as the peripheral channel on the display unit 351.

When the transmission process ends (519), the information processing device 200 stops the transmission process only for a given time and sleeps each unit (522). The intermittent transmission is continuously performed until a change request is given from the information processing device 300.

Here, in the intermittent transmission, a period in which the stream is not transmitted from the information processing device 200 occurs. Therefore, the information processing device 300 preferably performs a display process of interpolating and displaying the image corresponding to the stream finally received from the information processing device 200. However, the information processing device 300 is assumed not to have an interpolation process function either. In this case, during the sleep period, the image from the information processing device 200 may not be displayed on the display unit 351. Therefore, when the information processing device 300 does not have the interpolation process function, the image data from the information processing device 200 may be continuously transmitted. For example, in the stream which is a transmission target from the information processing device 200, the final image data at the time of the transmission stop is retained in a transmission buffer. During the sleep period, the image processing of the information processing device 200 is stopped, but the transmission process is continuously performed in a wireless link and the image data retained in the transmission buffer is continuously transmitted.

During the sleep period, only the image corresponding to the stream transmitted from the information processing device 400 may be displayed on the display unit 351. For example, the image corresponding to the stream transmitted from the information processing device 400 can be displayed on the entire surface of the display unit 351.

Next, an example of the case in which the user performs a manipulation of setting the output form (changing manipulation) will be described.

When the user performs the manipulation of setting the output form (changing manipulation) (531), as described above, the control unit 370 changes the content retained in the management information retention unit 390 (illustrated in FIG. 4) based on the user information related to the setting manipulation (532 and 533). For example, as illustrated in FIG. 5a, the case in which the user performs the setting manipulation (changing manipulation) of setting the image 11 based on the image data from the information processing device 200 as the middle channel is assumed. In this case, the control unit 370 changes the display form 396 (illustrated in FIG. 4) of the information processing device 200 in the management information retention unit 390 to "MAIN" (532 and 533).

Here, as described above, when the low power consumption mode is set in the information processing device 200, the information processing device 200 is assumed to sleep. In this way, when the information processing device 200 sleeps, the information processing device 200 may not be notified that the user performs the manipulation of setting the output form (changing manipulation).

Accordingly, when the user performs the manipulation of setting the output form (changing manipulation) 531 and the content retained in the management information retention unit 390 (illustrated in FIG. 4) is changed (532 and 533), the control unit 370 of the information processing device 300 sets a change trigger (534). The change trigger is a trigger for notifying the information processing device 200 that the user performs the manipulation of setting the output form (changing manipulation) when the inquiry message is received from the information processing device 200. Through the change trigger, the information processing device 200 cancels the state of the standby mode and notifies the information processing device 200 that the user performs the manipulation of setting the output form (changing manipulation).

Here, a case in which each unit of the information processing device 200 wakes up and the transmission process to the information processing device 300 starts is assumed. In this case, the control unit 370 of the information processing device 300 transmits a standby cancellation message to the information processing device 200 (535 and 536).

When the standby cancellation message is received (536), the control unit 240 of the information processing device 200 transmits a response message to the information processing device 300 (537 and 538).

In this way, it is necessary to inquire the setting in the information processing device 200 in accordance with the standby mode cancellation request from the sink device (535 to 538). Therefore, the control unit 240 of the information processing device 200 transmits the mode table request to the information processing device 300 (539 and 540). As described above, the mode table request is a request for transmitting each piece of information (the management information regarding the information processing device 200) managed in the information processing device 300. In the above-described processes (535 to 538), the messages (for example, the response message to the inquire message in the processes (515 to 518)) of the change (for example, the change in the output form) may be interchanged.

When the information processing device 300 receives the mode table request (540), the information processing device 300 transmits the command information according to the mode table request (541 and 542). Here, when the command information is already transmitted from the information processing device 300 to the information processing device 200, the information processing device 200 already acquire the information included in the command information. Therefore, the information processing device 300 may transmit only difference information as the command information according to the mode table request (541 and 542). The difference information is information regarding the change and is, for example, output form information of the resolution and the audio quality regarding the information processing device 200.

When the command information is received (542), the control unit 240 of the information processing device 200 specifies whether the output form of the data from the information processing device 200 is the main form or the sub-form based on the command information. Subsequently, the control unit 240 of the information processing device 200 transmits the mode setting information indicating the setting of the specified output form to the information processing device 300 (543 and 544). Here, the main form is assumed to be specified as the output form of the data from the information processing device 200. Accordingly the control unit 240 of the information processing device 200 transmits the mode setting information for notifying the information processing device 300 that the specified output form (main form) is set and the normal power consumption mode is set, to the information processing device 300 (543 and 544). The processes (539 to 544) may be performed with Capability Re-negotiation when the device conforms to Wi-Fi Certified Miracast. In the case of Capability Re-negotiation, it is not necessary to perform negotiation again in regard to the setting values unchanged in the output form in the process (534). For example, wfd-displayedid, wfd-client-rtpports, wfd-I2C, and wfd-connectortype can be exemplified.

Subsequently, the control unit 240 of the information processing device 200 sets the image transmission mode (the middle channel) as the transmission mode (545). Accordingly, in the data transmission system 201, the resolution for displaying the middle channel and the audio quality for outputting the main audio are set (546). In the line control system 202, the normal power consumption mode is set (547).

When the normal power consumption mode is set in this way (547), the control unit 240 of the information processing device 200 starts a normal transmission process (548 and 549). That is, the information processing device 200 transmits the stream for outputting the middle channel and the main audio to the information processing device 300 (548 and 549). When the stream is received in this way (549), the information processing device 300 outputs the image and the audio based on the received stream (550). For example, as illustrated in FIG. 5a, the image 11 based on the stream from the information processing device 200 is displayed as the middle channel on the display unit 351.

In this example, the example in which the previous output form (the output form when the information processing device 300 is powered down) is set as the display form of the display unit 351 when the information processing device 300 is powered up has been described. However, when the information processing device 300 is powered up, another output form may be set. For example, when the information processing device 300 is powered up, a default output form may be normally set. Alternatively, the output form may be decided based on an order of connection to the information processing device 300.

In FIGS. 6 to 8, the example in which the information processing device 200 inquires the setting information regarding the information processing device 300 and sets the transmission parameters based on the received parameter information has been described. However, the information processing device 200 may ask a setting request for the parameters desired to be set to the information processing device 300 and may set the parameters when the information processing device 200 receives a response indicating that there is no problem from the information processing device 300. This example is illustrated in FIGS. 9 and 10.

[Communication Example]

Figure 9:
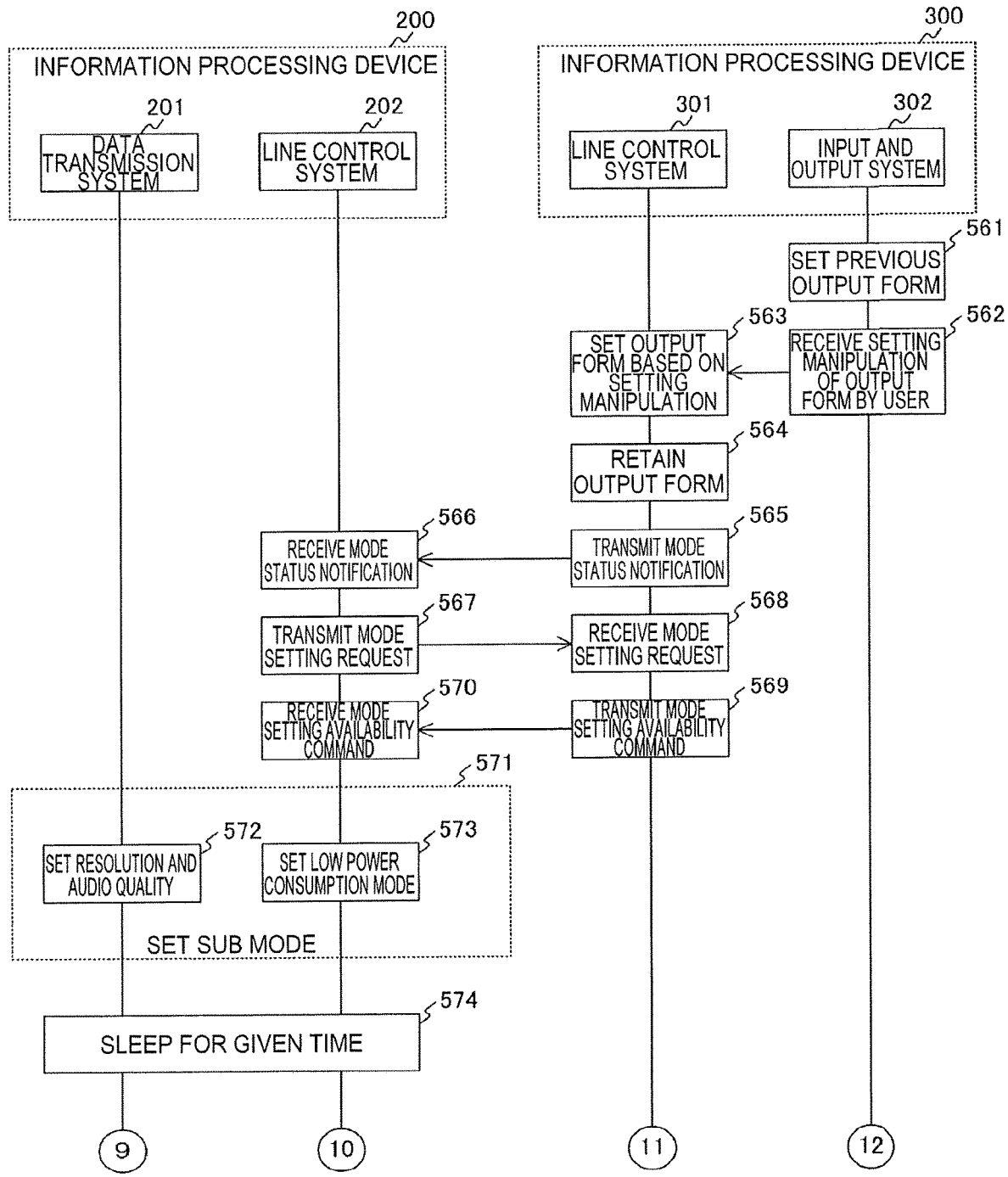
FIG. 9 is a sequence chart illustrating a communication process example between devices included in the communication system 100 according to the first embodiment of the present technology.
Figure 10:
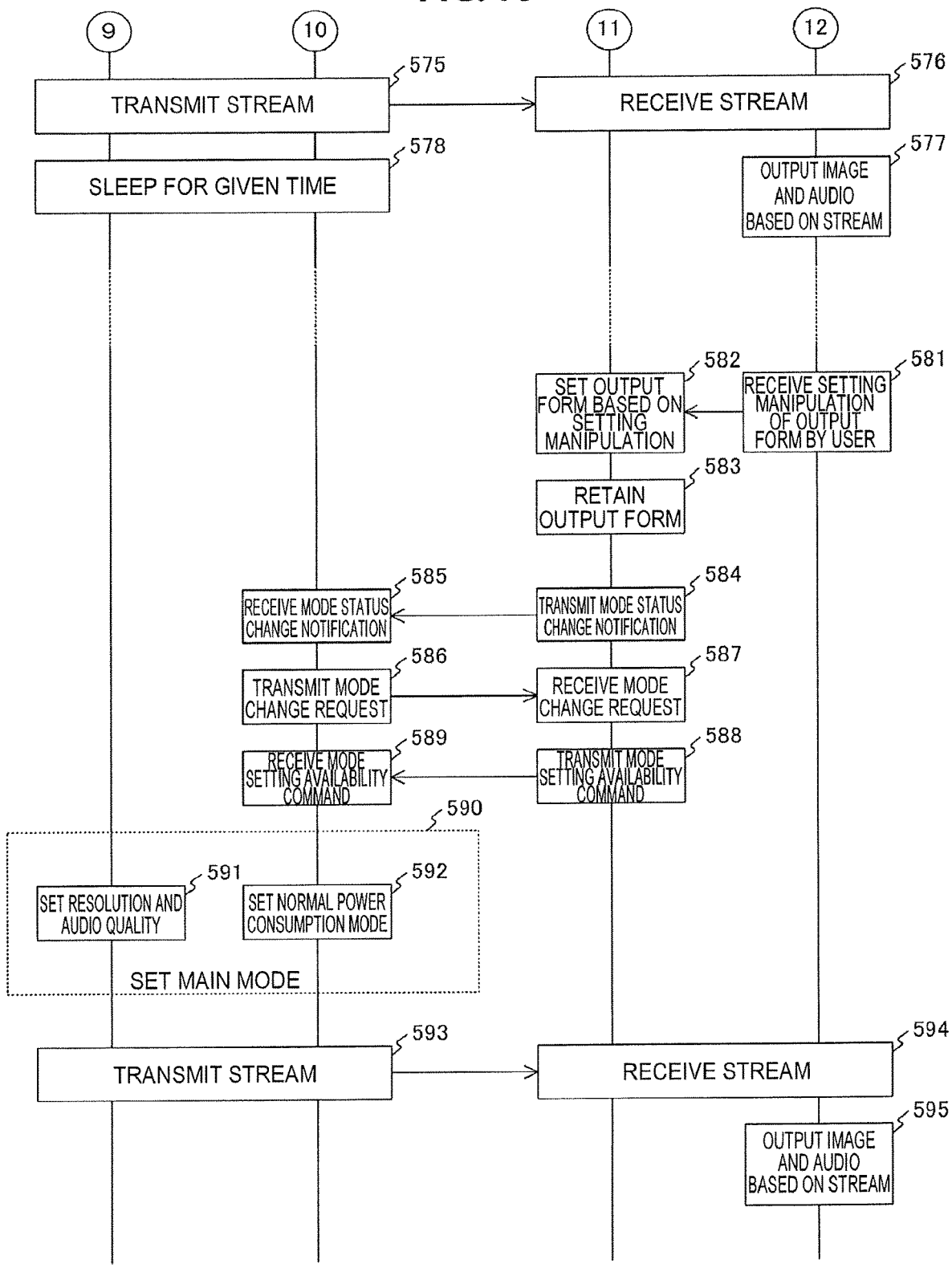
FIG. 10 is a sequence chart illustrating a communication process example between devices included in the communication system 100 according to the first embodiment of the present technology.
Figure 11:
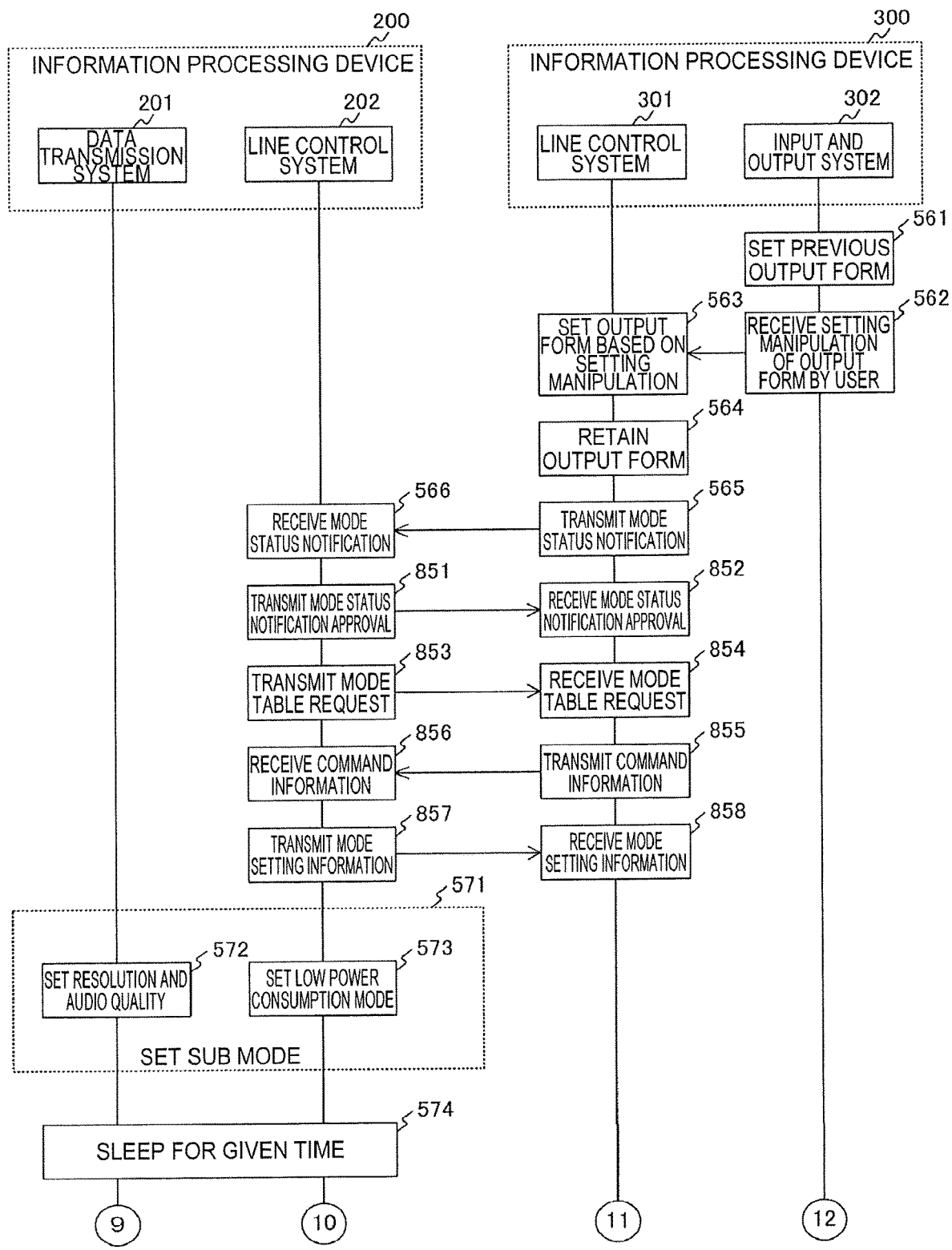
FIG. 11 is a sequence chart illustrating a communication process example between devices included in the communication system 100 according to the first embodiment of the present technology.

FIGS. 9 to 11 are sequence charts illustrating a communication process example between devices included in the communication system 100 according to the first embodiment of the present technology. In FIGS. 9 and 10, a part of the communication process example illustrated in FIGS. 6 to 8 is modified. Therefore, in FIGS. 9 and 10, the same reference numerals are given to common portions to the communication process example illustrated in FIGS. 6 to 8 and the description thereof will be partially omitted. In FIG. 11, a part of the communication process example illustrated in FIG. 9 is modified. Therefore, in FIG. 11, the same reference numerals are given to common portions to the communication process example illustrated in FIG. 9 and the description thereof will be partially omitted.

Processes (561 o 564) illustrated in FIG. 9 correspond to the processes (501 to 504) illustrated in FIG. 6.

Subsequently, the control unit 370 of the information processing device 300 transmits a mode status notification for notifying the information processing device 200 of the output form set by the user to the information processing device 200 (565 and 566). The mode status notification is information for giving notification of the resolution and the audio quality, the kinds of image and audio codecs, presence of absence of a 3D function, presence or absence of the content protection, the display size of a display device, topology information, a usable protocol, setting information (port information or the like) of the protocol, connection interface information (the type of connector or the like), horizontal synchronization and vertical synchronization positions, performance priority request information of a source device, a mode control table response to whether to correspond to the low power consumption mode, a maximum transmission throughput or a receivable maximum throughput of wireless transmission, central processing unit (CPU) power, a battery remaining quantity, and power supply information which can be set by the information processing device 200 along with the output form (for example, the main form or the sub-form) set by the user.

In this way, immediately after the setting manipulation of the output form by the user in the information processing device 300 is preformed, the mode status notification for notifying the information processing device 200 of the output form related to the setting manipulation can be transmitted to the information processing device 200. Therefore, it is possible to shorten a setting time (change time) between the information processing devices 200 and 300 connected using the wireless communication.

When the mode status notification is received (566), the control unit 240 of the information processing device 200 compares a status parameter specified by the received mode status notification to a status parameter of the own information processing device. Subsequently, the control unit 240 of the information processing device 200 decides the setting content (for example, the resolution and audio, and the power consumption mode) based on a comparison result. Subsequently, the control unit 240 of the information processing device 200 transmits a mode setting request for notifying of the decided setting content (for example, the resolution and audio, and the power consumption mode) to the information processing device 300 (567 and 568).

When the mode setting request is received (568), the control unit 370 of the information processing device 300 determines whether to permit the setting content (for example, the resolution and audio, and the power consumption mode) specified by the received mode setting request. Then, the control unit 370 of the information processing device 300 transmits a mode setting availability command for notifying the determination result to the information processing device 200 (569 and 570).

When the mode setting availability command is received (570), the control unit 240 of the information processing device 200 confirms the content of the mode setting availability. For example, when a mode setting availability command indicating permission of the setting content related to the mode setting request transmitted by the information processing device 200 is received, the control unit 240 of the information processing device 200 sets the image transmission mode (the peripheral channel) as the transmission mode (571). Further, processes (571 to 574) illustrated in FIG. 9 correspond to the processes (511 to 514) illustrated in FIG. 6. Further, processes (575 to 578) illustrated in FIG. 10 correspond to the processes (519 to 522) illustrated in FIG. 7.

When a mode setting availability command indicating non-permission of the setting content related to the mode setting request transmitted by the information processing device 200 is received, the control unit 240 of the information processing device 200 newly decides the setting content (for example, the resolution and audio, and the power consumption mode). Then, the control unit 240 of the information processing device 200 transmits a mode setting request for notifying the information processing device 300 of the newly decided setting content (for example, the resolution and audio, and the power consumption mode) to the information processing device 300.

Processes (581 to 583) illustrated in FIG. 10 correspond to the processes (531 to 533) illustrated in FIG. 7.

Subsequently, the control unit 370 of the information processing device 300 transmits a mode status change notification for notifying the information processing device 200 of the output forth changed by the user to the information processing device 200 (584 and 585). The mode status change notification is information for notifying of the resolution and the audio quality which can be set by the information processing device 200 and whether to correspond to the low power consumption mode along with the output form (for example, the main form or the sub-form) changed by the user.

When the mode status change notification is received (585), the control unit 240 of the information processing device 200 decides the setting content (for example, the resolution and audio, and the power consumption mode). The process of deciding the setting content is the same as the above-described decision process. Subsequently, the control unit 240 of the information processing device 200 transmits the mode change request for notifying the information processing device 300 of the decided setting content (for example, the resolution and audio, and the power consumption mode) to the information processing device 300 (586 and 587).

When the mode change request is received (587), the control unit 370 of the information processing device 300 determines whether to permit the setting content (for example, the resolution and audio, and the power consumption mode) specified by the received mode change request. Then, the control unit 370 of the information processing device 300 transmits the mode setting availability command for notifying the determination result to the information processing device 200 (588 and 589).

When the mode setting availability command is received (589), the control unit 240 of the information processing device 200 confirms the content of the mode setting availability command and sets the transmission mode (590). This confirmation process is the same as the above-described confirmation process. Processes (590 to 595) illustrated in FIG. 10 correspond to the processes (545 to 550) illustrated in FIG. 8.

Here, when the source device performs switch between the peripheral channel and the middle channel, information (for example, information for comprehending the beginning of a group of picture (GOP) or information for comprehending the beginning of a picture) indicating a timing of the switch may be included in the stream to be transmitted. In other words, when the source device performs the switch between the main display and the sub-display, information indicating the timing of the switch may be transmitted to the sink device. In this case, the sink device receiving the stream can switch between the peripheral channel and the middle channel at an appropriate timing based on information indicating the timing.

Here, FIGS. 6 to 10 illustrates the example in which the standby and wake-up of the source device connected to the sink device is controlled. Here, the standby and wake-up of the sink device may be controlled based on the standby and wake-up of the source device connected to the sink device. For example, when all of the source devices connected to the sink device stand by control can be performed such that the sink device stands by. When at least one of the source devices connected to the sink device wakes up, control can be performed such that the sink device wakes up.

A modification example of the case in which the sink device notifies the source device that the content retained in the process (564) is changed in the processes (565 to 570) illustrated in FIG. 9 and the source device transmits the mode table request is illustrated in FIG. 11.

As illustrated in FIG. 11, the information processing device 300 transmits a mode status notification to notify the information processing device 200 that the output form is changed (564) and prompt to transmit a mode setting request from the information processing device 200 (565 and 566). When the correspondence is possible, the information processing device 200 receiving the mode status notification transmits a mode status notification approval indicating approval of the mode status notification to the information processing device 300 (851 and 852).

In this way, after the mode status notification approval is transmitted (851), processes are performed (853 to 858). The processes (853 to 858) correspond to the processes (505 to 510) illustrated in FIG. 6. In this way, by performing the processes (853 to 858) after the transmission of the mode status notification approval (851), the stream transmission control (for example, the data transmission speed control and the scalability transmission rate control) can be appropriately in a state change (the change of the output form (564)).

Here, for example, in a command prepared in Wi-Fi Certified Miracast, an RTSPM5 message including wfd-triggered-method is currently defined as a command which is transmitted to the information processing device 300 by the information processing device 200. However, when the RTSPM5 message including wfd-triggered-method is expanded as a command which is transmitted to the information processing device 200 by the information processing device 300, the RTSPM5 message including wfd-triggered-method can be received by the information processing device 200 and the information processing device 200 can start capability re-negotiation with the information processing device 300. That is, the management information can be exchanged using the RTSPM5 message including wfd-triggered-method. For example, when the management information is changed, the control unit 370 of the information processing device 300 can perform control such that the RTSPM5 message including wfd-triggered-method defined in the Wi-Fi Certified Miracast specification is transmitted as a command for notifying the information processing device 200 of the change to the information processing device 200. Beside the command, a command may be newly defined to serve as an equivalent.

[Operation Example of Information Processing Device (Source Device)]

Figure 12:
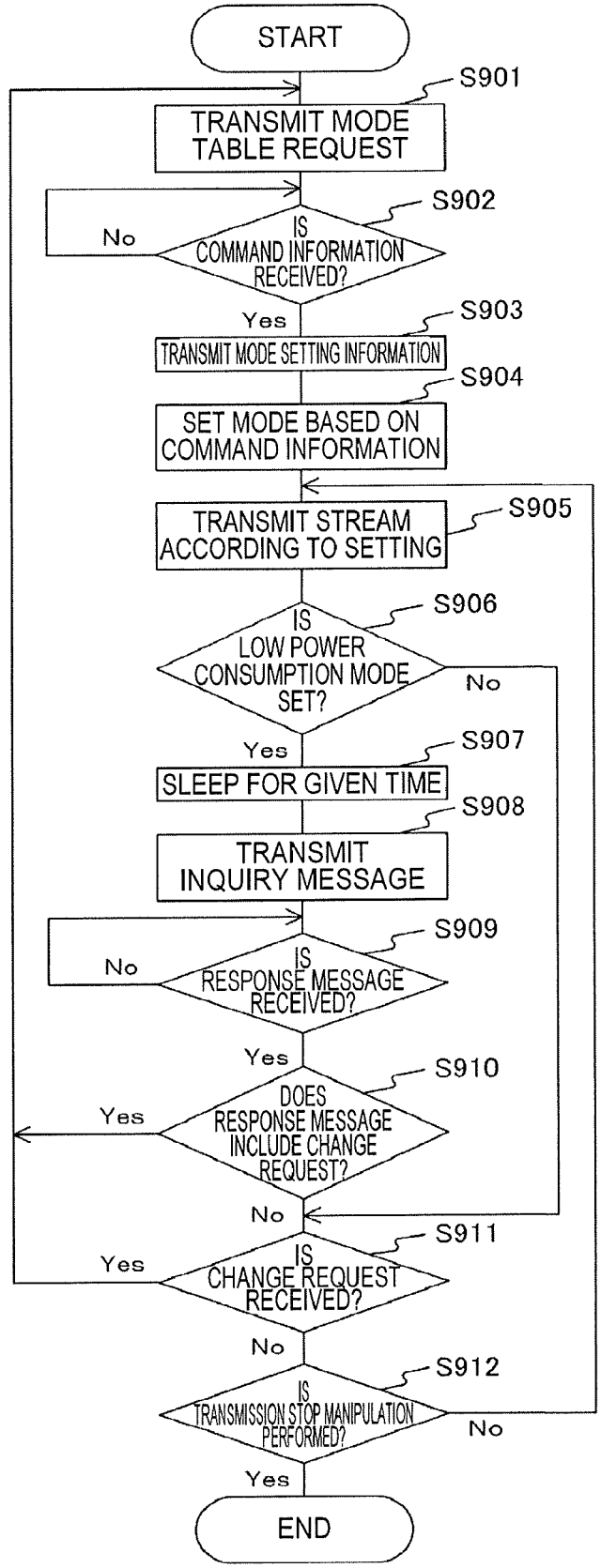
FIG. 12 is a flowchart illustrating an example of a processing procedure of a data transmission process performed by the information processing device 200 according to the first embodiment of the present technology.

FIG. 12 is a flowchart illustrating an example of a processing procedure of a data transmission process performed by the information processing device 200 according to the first embodiment of the present technology FIG. 12 illustrates an example of a case in which the information processing device 200 first transmits the stream (the image data and the audio data with a standard resolution to the information processing device 300. In this case, the output based on the stream to the information processing device 300 is assumed to be performed.

First, the control unit 240 transmits the mode table request to the information processing device 300 (step S901). Subsequently, the control unit 240 determines whether the command information is received from the information processing device 300 (step S902). When the command information is not received, the monitoring is continuously performed. When the command information may not be received despite waiting of a given time, the process may end as a timeout. For example, in Wi-Fi Certified Miracast, a timeout from 5 seconds to 9 seconds is set according to a situation.

When the command information is received from the information processing device 300 (step S902), the control unit 240 transmits the mode setting information indicating that the mode is set based on the received command information to the information processing device 300 (step S903).

Subsequently, the control unit 240 sets the mode based on the received command information (step S904). When a change request for increasing the resolution is included in the command information, the control unit 240 sets the resolution of the image and the audio in response to the change request. When a change request for decreasing the resolution is included in the command information, the control unit 240 sets the resolution of the image and the audio quality of the audio in response to the change request.

Subsequently, the control unit 240 performs the transmission process of transmitting the stream to the information processing device 300 according to the setting (step S905).

Subsequently, the control unit 240 determines whether the low power consumption mode is set (step S906). When the low power consumption mode is not set (that is, the normal power consumption mode is set), the process proceeds to step S911. Conversely, when the low power consumption mode is set (step S906), the control unit 240 sleeps for a given time (step S907).

Subsequently, the control unit 240 transmits an inquiry message to the information processing device 300 (step S908). Subsequently, the control unit 240 determines whether a response message is received from the information processing device 300 (step S909). When the response message is not received, the monitoring is continuously performed. When the response message may not be received despite of waiting of a given time, the process may end as a timeout. For example, in Wi-Fi certified Miracast, a timeout from 5 seconds to 9 seconds is set according to a situation.

When the response message is received from the information processing device 300 (step S909), the control unit 240 determines whether a change request is included in the response message (step S910). When the change request is included in the response message (step S910), the process returns to step S901.

When the change request is not included in the response message (step S910), the control unit 240 determines whether the change request is received (step S911). When the change request is received (step S911), the process returns to step S901. Conversely, when the change request is not received (step S911), the control unit 240 determines whether a transmission stop manipulation is performed (step S912). When the transmission stop manipulation is performed (step S912), the operation of the data transmission process ends. Conversely when the transmission stop manipulation is not performed (step S912), the process returns to step S905.

[Operation Example of Information Processing Device (Sink Device)]

Figure 13:
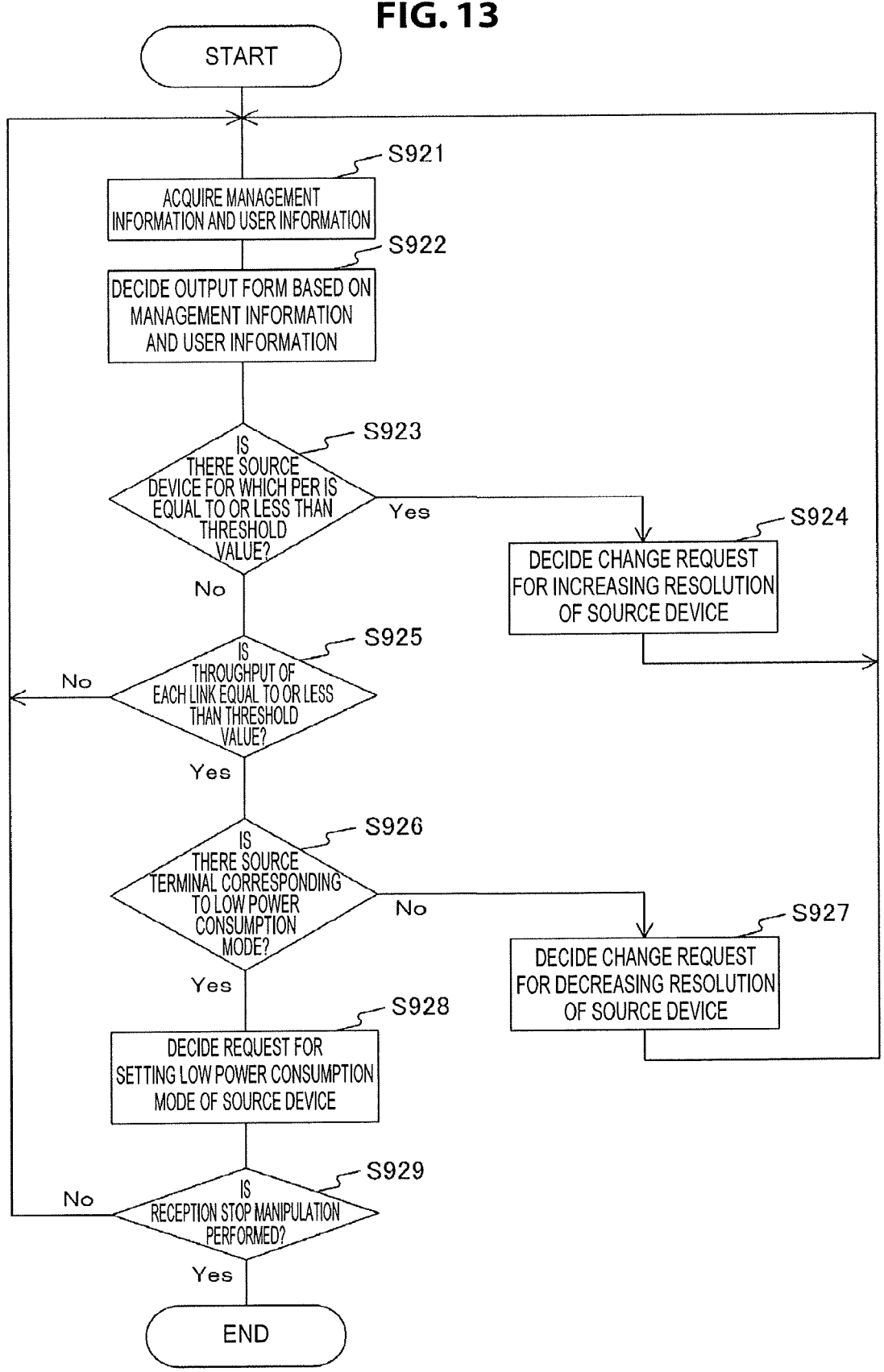
FIG. 13 is a flowchart illustrating an example of a processing procedure of a data transmission speed control process performed by the information processing device 300 according to the first embodiment of the present technology.

FIG. 13 is a flowchart illustrating an example of a processing procedure of a data transmission speed control process performed by the information processing device 300 according to the first embodiment of the present technology. FIG. 13 illustrates an example in which setting content (for example, a resolution and a power consumption mode) related to the source device is decided when the information processing device 300 receives the stream (the image data and the audio data).

For example, the control unit 370 of the information processing device 300 can decide the resolution to be used and the frequency channel to be used according to the user information for setting the middle channel or a link radio wave propagation environment between the information processing device 300 and each source device.

For example, a case in which a user manipulation of selecting the image 12 in the state illustrated in FIG. 5a performed is assumed. In this case, it is desirable to increase the resolution of the image 12 and decreases the resolution of the image 11. Further, it is desirable to select optimum resolutions of the images 11 and 12 according to elapse of a time and based on the link radio wave propagation environment of each source device.

For example, the information processing device 300 can comprehend the radio wave propagation characteristics while flowing data corresponding to the corresponding throughput to the plurality of frequency channels. For example, the information processing device 300 retains a table to comprehend an ideal throughput for each of the plurality of frequency channels. Then, the information processing device 300 may comprehend an available data transmission speed of the frequency channel to be used based on the number of simultaneously used source devices and the PER and may select an optimum frequency channel for each frequency channel.

For example, the control unit 370 acquires the management information from the management information retention unit 390 and acquires the user information from the user information acquisition unit 360 (step S921). Subsequently, the control unit 370 decides the output form based on the acquired management information and user information (step S922). Based on the decided output form, the images corresponding to two streams transmitted from each of the plurality of source devices are displayed on the display unit 351.

Subsequently, the control unit 370 determines whether there is the source device for which the PER included in the management information is less than a threshold value (step S923). When there is the source device for which the PER included in the management information is equal to or less than the threshold value (step S923), the control unit 370 decides a change request for increasing the resolution of the source device (step S924). The control unit 370 performs control such that a high data transmission speed is allocated to the middle channel in accordance with the output form based on the user information. For example, the change request is included in the command information (for example, the command information illustrated in FIG. 6) to be transmitted to this source device. It may be determined whether the throughput after the increase in the resolution of the source device is less than the threshold value and the rate of the stream may be controlled based on the determination result.

When there is no source device for which the PER included in the management information is equal to or less than the threshold value (step S923), the control unit 370 determines whether the throughput of each source device is equal to or less than a threshold value based on the management information (step S925). That is, it is determined whether the throughput of each link is not problematic even for the current frequency channel (step S925).

When the throughput of each source device is not equal to or less than the threshold value (step S925), the process returns to S921. Conversely when the throughput of each source device is equal to or less than the threshold value (step S925), the control unit 370 determines whether there is the source device corresponding to the low power consumption mode based on the management information (step S926).

When there is the source device corresponding to the low power consumption mode (step S926), the control unit 370 decides a change request for setting the low power consumption mode in the source device corresponding to the low power consumption mode (step S928). For example, the change request is included in the command information (for example, the command information illustrated in FIG. 6) to be transmitted to this source device.

When there is no source device corresponding to the low power consumption mode (step S926), the control unit 370 decides a change request for decreasing the resolution of the source device (the source device for which the PER is equal to or less than the threshold value) (step S927). For example, the change request is included in the command information (for example, the command information illustrated in FIG. 6) to be transmitted to this source device.

It is determined whether a reception stop manipulation is performed (step S929). When the reception stop manipulation is performed, the operation of the data transmission speed control process ends. When the reception stop manipulation is not performed, the process returns to step S921. When there is the source device that enters the sleep state through the setting of the low power consumption mode, the number of source devices connected to the information processing device 300 decreases. In this case, the threshold value for the throughput in step S925 may be changed. After the threshold value for the throughput is changed in this way, a step corresponding to step S925 may be further performed.

In this way, it is possible to realize a control protocol in which the sink device trains a line environment for a given time and notifies the source device of the resolution with which stable video communication can be performed. A control protocol in which the source device performs training in a line environment for a given time and requests a resolution with which stable video communication can be performed, and the sink device responds to the request may also be realized.

In this way, the control unit 370 of the information processing device 300 can perform transmission control (for example, the data transmission speed control and the scalability transmission rate control) of two streams transmitted from each source device based on the management information of the management information retention unit 390 and the user information acquired by the user information acquisition unit 360.

Further, control may be performed such that a sum data transmission speed of the two streams transmitted from each of the information processing devices 200 and 400 is minimized. For example, a maximum allowable value of the sum data transmission speed is set in the control unit 370 of the reception side information processing device 300. After the control unit 370 transmits a change request for decreasing a bit rate to the information processing device 200, the control unit 370 acquires bit rates of two streams transmitted from the information processing devices 200 and 400 from the stream reception unit 330. Subsequently, the control unit 370 calculates a sum data transmission speed of the acquired two streams. Subsequently, the control unit 370 decides the bit rate of the streams transmitted from the information processing device 400 within a range not greater than the set maximum allowable value and transmits a change request for increasing the bit rate to the information processing device 400. When the PER is large and thus is not receivable in the same frequency channel despite of the setting of the minimum bit rate, a different frequency channel may be used. When the images (the middle channel and the peripheral channel) are paused for a given time or more, the image data may be stopped as long as a manipulation (for example, pointing) is not performed by the user.

In this way, according to the first embodiment of the present technology, even when one sink device receives a plurality of streams transmitted from a plurality of source devices, appropriate stream transmission control (for example, the data transmission speed control) can be performed according to a manipulation, a situation, and an intention of the user. For example, it is possible to decrease the data transmission speeds of some of the plurality of image and audio streams and increase the data transmission speeds of the remaining streams according to an operation, a situation, and an intention of the user.

For example, when a sink device receives and displays a plurality of streams, important images and audios with high quality set timely by the user can be enjoyed. For the otherwise images and audios, the data transmission speeds can be adjusted automatically to the optimum frequency channel, power consumption, and transmission rate.

Here, for the management information retained in the management information retention unit 390, a command prepared in Wi-Fi Certified Miracast can be used for exchanging the management information. In this case, capability negotiation or capability re-negotiation defined in the Wi-Fi Display specification can be used. Here, as capability negotiation or capability re-negotiation, for example, RFC5939 or the Wi-Fi Certified Miracast specification can be exemplified. However, capability negotiation or capability re-negotiation is not limited thereto, but is defined as interchange of the device performance information. A communication example of the interchange using a command of the Wi-Fi Certified Miracast specification is illustrated in FIGS. 14 to 16.

[Communication Example of Interchange using Wi-Fi Certified Miracast Specification Command]

Figure 14:
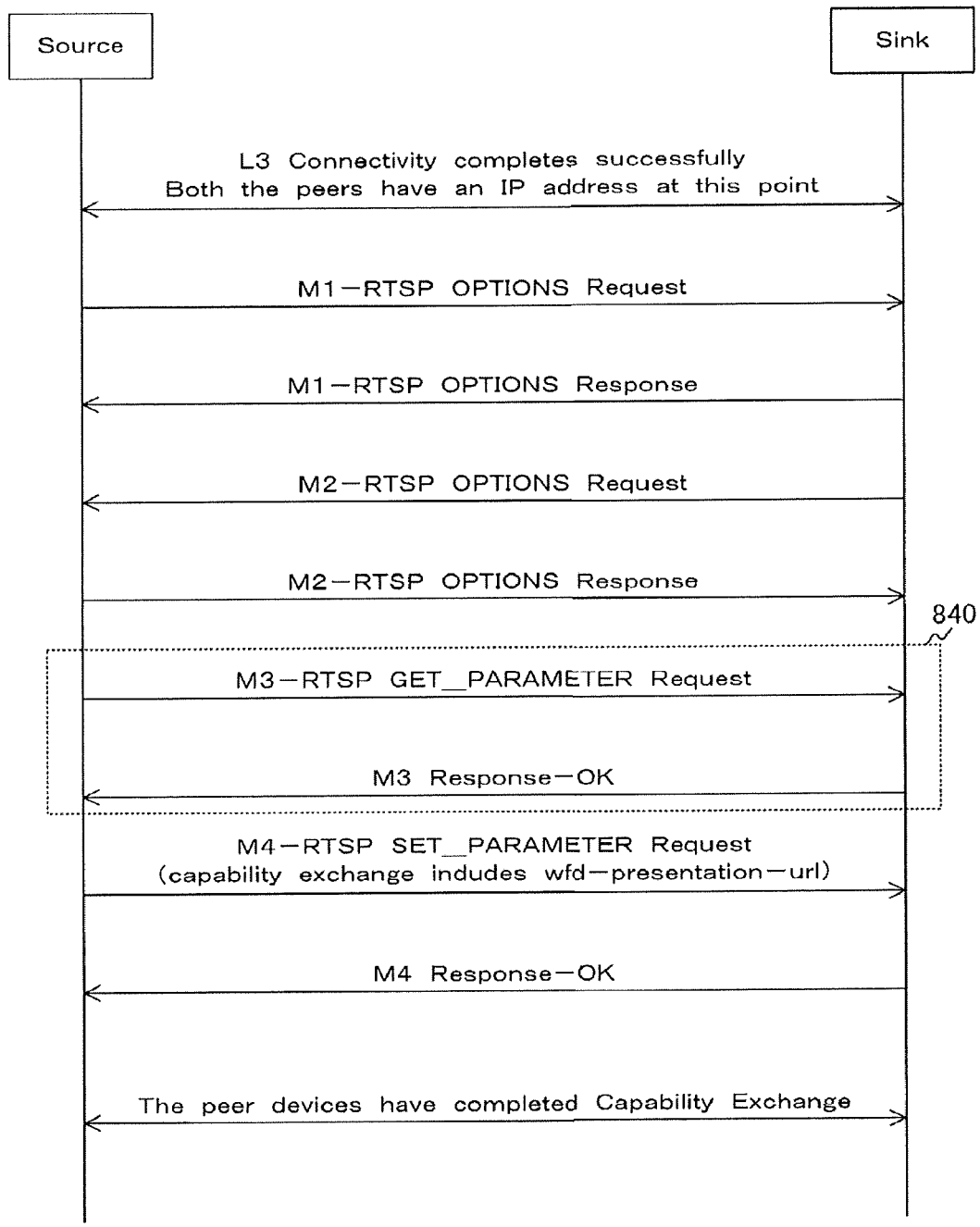
FIG. 14 is a sequence chart illustrating a communication process example between a source device and a sink device according to the first embodiment of the present technology.
Figure 15:
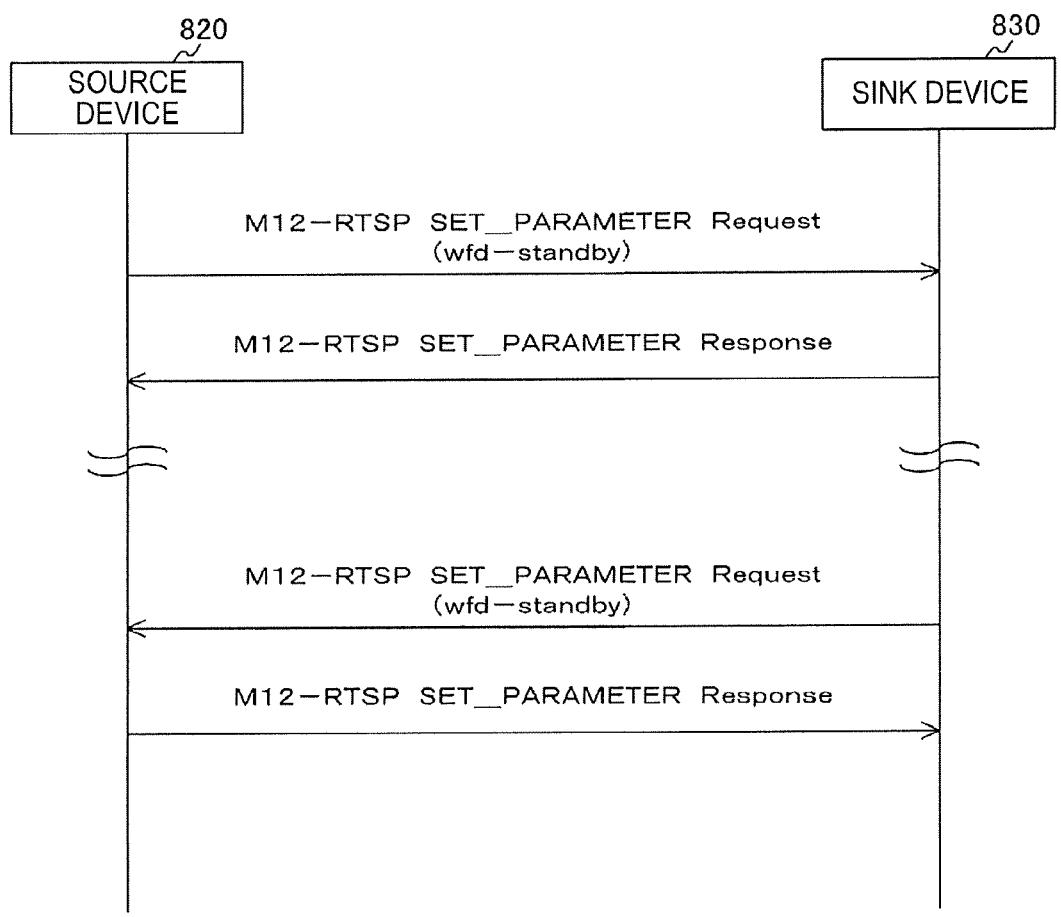
FIG. 15 is a sequence chart illustrating a communication process example between a source device and a sink device according to the first embodiment of the present technology.
Figure 16:
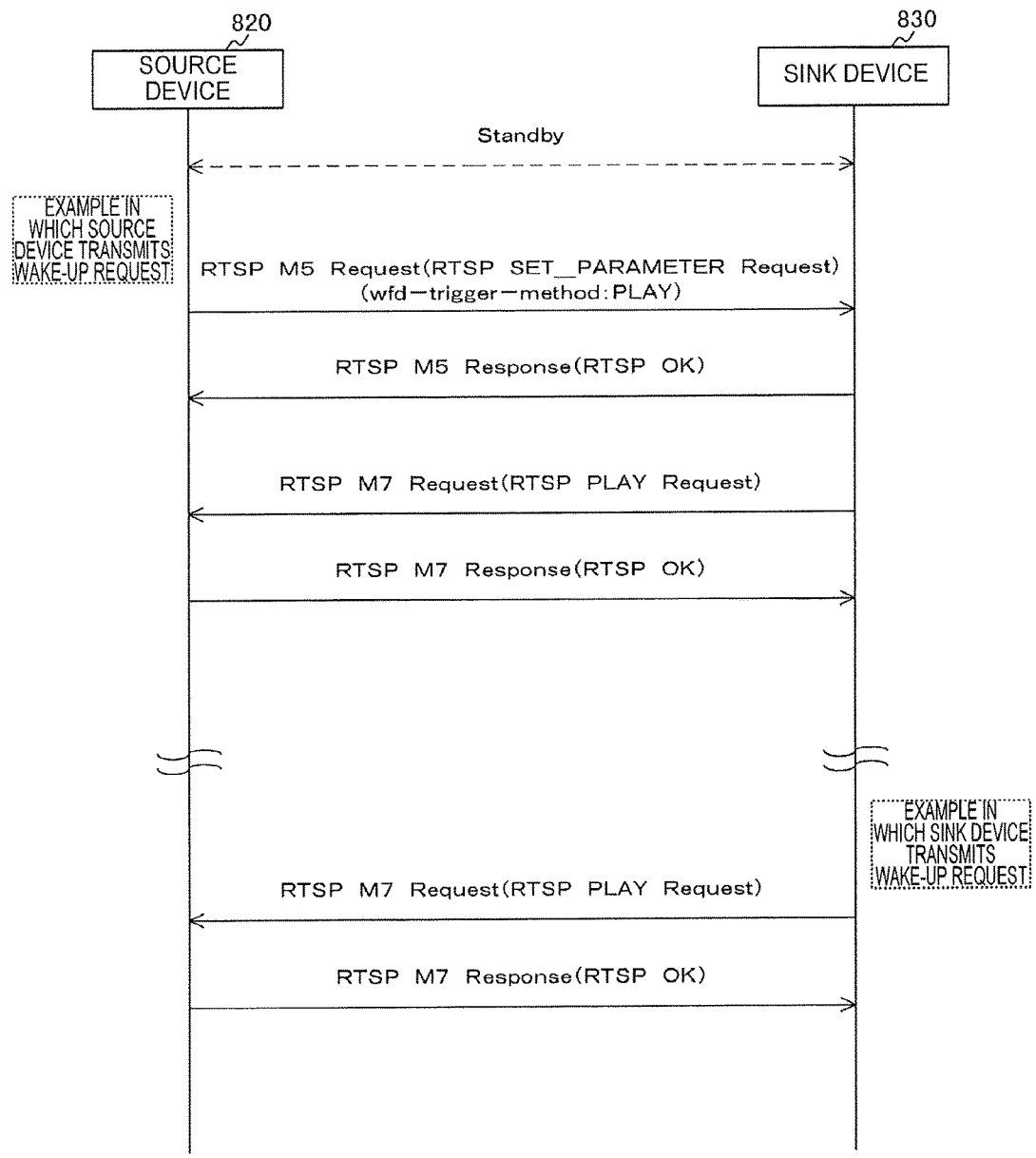
FIG. 16 is a sequence chart illustrating a communication process example between a source device and a sink device according to the first embodiment of the present technology.

FIGS. 14 to 16 are sequence charts illustrating a communication process example between a source device and a sink device according to the first embodiment of the present technology. FIGS. 14 to 16 illustrate a communication example of interchange using an RTSP protocol. A source device 820 corresponds to the information processing devices 200 and 400 and a sink device 830 corresponds to the information processing device 300.

First, the description will be made with reference to FIG. 14. For example, as indicated by a dotted rectangle 840 of FIG. 14, an "RTSP M3 Request" (RTSP GET_PARAMETER Request) message transmitted from the source device to the sink device and an "RTSP M3 Response" (RTSP GET_PARAMETER Response) message transmitted from the sink device to the source device in response to the "RTSP M3 Request" (RTSP GET_PARAMETER Request) message can be used. This exchange process corresponds to, for example, the processes (505 to 508) illustrated in FIG. 6 and the processes (539 to 542) illustrated in FIG. 8. On the other hand, the messages may be appropriately transmitted from the source device to the sink device. For example, the interchange of the "RTSP M3 Request" (RTSP GET_PARAMETER Request) message and the "RTSP M3 Response" (RTSP GET_PARAMETER Response) message may be omitted, the management information may be included in a message to be transmitted from the source device to the sink device, the management information may be transmitted from the source device to the sink device, and the sink device may select the information and retain the information in the management information retention unit 390. For example, when the content protection setting is performed, link protection setup is performed after M3 Response. Therefore, it is desirable to perform communication while ensuring a secrecy ability of a link set once by transmitting only messages of M4 or higher.

The interchange of information regarding the power consumption mode can be performed with predetermined messages using the RTSP protocol. For example, three kinds of management information of the following (1) to (3) can be exchanged:

(1) "setting to the standby mode,"

(2) "when the source device cancels the standby mode or when the source device cancels the standby mode of the sink device," and (3) "when the sink device cancel the standby mode or when the sink device cancels the standby mode of the source device."

First, the description will be made with reference to FIG. 15. For example, when a command prepared in Wi-Fi Certified Miracast is used, an "RTSP M12 Request" (RTSP SET_PARAMETER (with WFD-standby)) message transmitted from the source device 820 to the sink device 830 and an "RTSP M12 Response" (RTSP OK) message transmitted from the sink device 830 to the source device 820 in response to the "RTSP M12 Request" (RTSP SET_PARAMETER (with WFD-standby)) message can be used in the interchange of (1) "setting to the standby mode," as described above. On the other hand, the same also applies to the setting to the standby mode from the sink device 830 to the source device 820.

Next, the description will be made with reference to FIG. 16. For example, (2) "when the source device cancels the standby mode or when the source device cancels the standby mode of the sink device," as described above, the source device 820 interchanges an "RTSP M5 Request" (RTSP SET_PARAMETER (Request (wfd-trigger-method: PLAY)) message transmitted to the sink device 830 and an "RTSP M5 Response" (RTSP OK) message transmitted from the sink device 830 to the source device 820 in response to the "RTSP M5 Request" (RTSP SET_PARAMETER. (Request (wfd-trigger-method: PLAY)) message. The sink device 830 can uses an "RTSP M7 Request" (RTSP PLAY Request) message transmitted to the source device 820 and an "RTSP M7 Response" (RTSP OK) message transmitted from the source device 820 to the sink device 830 in response to the "RTSP M7 Request" (RTSP PLAY Request) message.

For example, (3) "when the sink device cancel the standby mode or when the sink device cancels the standby mode of the source device," as described above, the sink device 830 can use the "RTSP M7 Request" (RTSP PLAY Request) message transmitted to the source device 820 and the "RTSP M7 Response" (RTSP OK) message transmitted from the source device 820 to the sink device 830 in response to the "RTSP M7 Request" (RTSP PLAY Request) message. The interchange corresponds to, for example, the processes (515 to 518) illustrated in FIG. 7 and the processes (535 to 538) illustrated in FIG. 7.

For example, in the interchange of the processes (565 to 570) illustrated in FIG. 9, the "RTSP M12 Request" (RTSP SET_PARAMETER (with WFD-standby)) message transmitted from the sink device 830 to the source device 820 and the "RTSP M12 Response" (RTSP OK) message transmitted from the source device 820 to the sink device 830 in response to the "RTSP M12 Request" (RTSP SET_PARAMETER (with WFD-standby)) message can be used.

Further, for example, in the interchange of the processes (584 to 589) illustrated in FIG. 10, the "RTSP M7 Request" (RTSP PLAY Request) message transmitted from the sink device 830 to the source device 820 and the "RTSP M7 Response" (RTSP OK) message transmitted from the source device 820 to the sink device 830 in response to the "RTSP M7 Request" (RTSP PLAY Request) message may be used.

In this way, the wireless communication unit 320 can perform the exchange of the capability information with capability negotiation or capability re-negotiation defined in the Wi-Fi Display specification. For example, the capability information is exchanged with the RTSP M3 message in capability negotiation or capability re-negotiation.

In this way, for example, the wireless communication unit 320 of the information processing device 300 performs the communication with the source device to exchange the capability information regarding the information processing device 300 and the capability information regarding the information processing device 200. The wireless communication unit 220 of the information processing device 200 performs the communication with the information processing device 300 to exchange the capability information regarding the information processing device 200 and the capability information regarding the information processing device 300. In this case, the wireless communication units 220 and 320 can exchange the capability information with capability negotiation or capability re-negotiation.

The control unit 370 of the information processing device 300 performs the stream transmission control (for example, the data transmission speed control and the scalability transmission rate control) with the information processing device 200 based on the capability information regarding the information processing device 200, the radio wave propagation measurement information regarding the communication with the information processing device 200, and the use of the information processing device 300. A stream transmission method is different from in the embodiment of the present technology, but the control unit 240 of the information processing device 200 can also perform the stream transmission control (for example, the data transmission speed control and the scalability transmission rate control) with the information processing device 300 based on the control performed from the information processing device 300 based on the capability information regarding the information processing device 200 and the radio wave propagation measurement information regarding the communication of the stream with the information processing device 300.

The control unit 370 of the information processing device 300 performs the control such that the power consumption mode is set in the information processing device 200 based on the capability information (for example, the information indicating whether the device is a mobile device regarding the information processing device 200. In this case, the control unit 370 can perform the control such that the low power consumption mode is set in the information processing device 200 based on the capability information regarding the information processing device 200 and the management information for managing the information processing device 200. The control unit 240 of the information processing device 200 sets the power consumption mode based on the control performed from the information processing device 300 based on the capability information regarding the information processing device 200. In the embodiment of the present technology, the example of the topology in which two source devices are used has been described, but an embodiment of the present technology is not limited to the embodiment of the present technology. For example, when the number of devices is 2 or more, it is necessary to control data transmission speed control corresponding to the number of devices and state transition is considerable. Therefore, the control is difficult, but benefit can be obtained. It is possible to also correspond to topology in which two or more source devices are connected.

2. Second Embodiment

In a second embodiment of the present technology, an example of switching a connection between the source device and the sink device via an access point and a direct connection between the source device and the sink device will be described.

[Configuration Example of Communication System]

Figure 17:
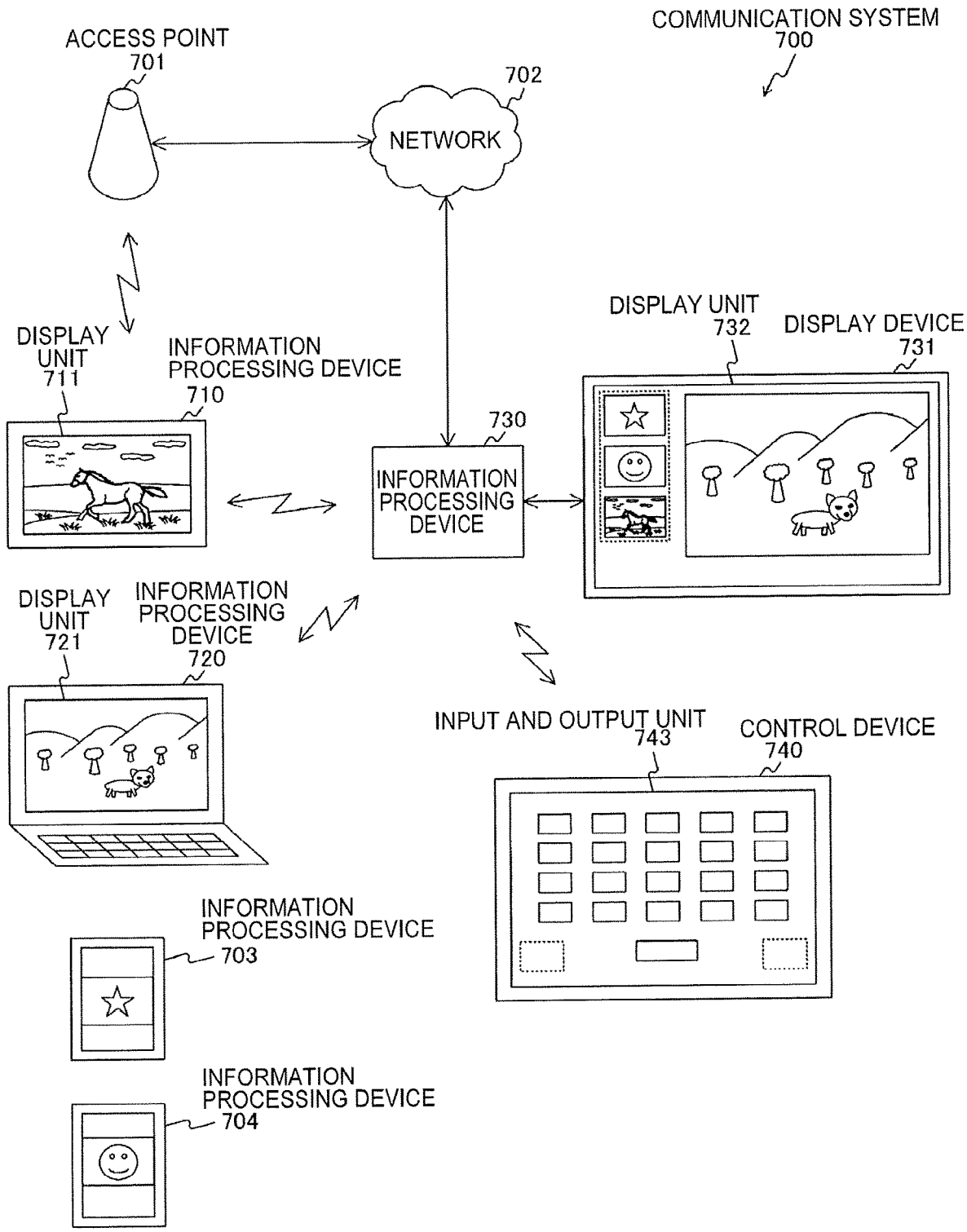
FIG. 17 is a diagram illustrating a system configuration example of a communication system 700 according to the second embodiment of the present technology.

FIG. 17 is a diagram illustrating a system configuration example of a communication system 700 according to the second embodiment of the present technology.

The communication system 700 includes an access point 701, a network 702, information processing devices 703, 704, 710, 720, and 730, a display device 731, and a control device 740.

The access point 701 is an access point of a wireless LAN (for example, Wi-Fi). For example, the access point 701 has a function of an infrastructure mode of an IEEE802.11 standard. The access point 701 is connected to one or more information processing devices (for example, a transmission side information processing device (source device) and a reception side information processing device (sink device)).

The access point 701 can be connected with the information processing device 730 via a wired line (for example, Ethernet (registered trademark)). For example, the access point 701 can be connected with the information processing device 730 via the network 702. The access point 701 may be connected with an internal bus of the information processing device 730 and perform a process. Examples of the internal bus of the information processing, device 730 include a Universal Serial Bus (USB), Peripheral Component Interconnect (PCI), and PCI Express. The connection between the access point 701 and the information processing device 730 may be a wired connection or a wireless connection (for example, the wireless LAN). For example, in the case of the wireless LAN, the network 702 is connected to the information processing device 730, and the information processing device 730 has to determine whether a transmission/reception process is a transmission/reception process with the access point 701 or a transmission/reception process with the information processing device 710.

In the second embodiment of the present technology, an example in which the access point 701 and the information processing devices 703, 704, 710, and 720 are connected using the wireless LAN (for example, the wireless LAN corresponding to IEEE 802.11 a/b/g/u/ac/ad) will be described. An example in which the access point 701 and the information processing device 730 are connected via an Ethernet line will be described.

Further, an example in which the information processing devices 703, 704, 710, and 720 are assumed to be the transmission side information processing device (source device), and the information processing device 730 is assumed to be the reception side information processing device (sink device) will be described. The information processing devices 703, 704, 710, and 720 correspond to the information processing device 200 illustrated in FIG. 2, and the information processing device 730 corresponds to the information processing device 300 illustrated in FIG. 3. In the following description, the information processing device 710 will be mainly described as the source device, and the description similarly applies to the information processing devices 703, 704, and 720.

The information processing device 710 is the transmission side information processing device (the source device) that transmits an image. The information processing device 710 is an information processing device that can be connected with the access point 701 in the infrastructure mode.

Here, a connection example in which the information processing device 710 establishes the connection with the access point 701 in the infrastructure mode will be described. The information processing device 710 transmits a connection request signal to the access point 701 in response to a beacon signal transmitted from the access point 701. As described above, the information processing device 710 starts an operation (a connection establishment operation) for establishing the connection with the access point 701 by transmitting the connection request signal.

The connection establishment operation is an operation of linking a level of a layer 2. For example, a connection authentication process of determining whether or not the information processing device 710 is connected as an application is necessary in addition to password authentication using packet identification (PID) performed in the wireless LAN.

The information processing device 710 can establish the connection with the information processing device 730 through P2P direct communication (for example, WiFi Direct). For example, the information processing device 710 has a protocol capable of establishing the connection with the information processing device 730 through the WiFi Direct and enabling image communication such as the Wi-Fi CERTIFIED Miracast or digital living network alliance (DLNA).

The information processing device 710 may be a standby device that establishes the connection with the access point 701 and interchanges various kinds of information with the information processing device 730 via the access point 701. Further, when the information processing device 710 is used only as the standby device, the information processing device 710 may not have a protocol capable of enabling image communication.

The information processing device 730 has a communication function for establishing a connection with the access point 701, the information processing devices 703, 704, 710, and 720, or the control device 740. The information processing device 730 has a function of establishing the connection with the access point 701, the information processing devices 703, 704, 710, and 720, and the control device 740 and controlling all protocols. The information processing device 730 has a communication function of establishing a connection with a private LAN or a global LAN.

Here, it is important to stabilize the connection between the information processing device 730 and the information processing devices 703, 704, 710, and 720. Thus, it is desirable to use a frequency different from a radio frequency used by the access point 701 for the connection between the information processing device 730 and the information processing devices 703, 704, 710, and 720. In the second embodiment of the present technology, an example in which a frequency band such as 2.4 GHz, 5 GHZ, or 60 GHz of IEEE 802.11 a/b/g/n/ac/ad is used will be described. Here, any other wireless standard or any other frequency band may be used.

The information processing device 730 has a display function of displaying an image. The display function is a function of performing screen display of a television or a projector. The information processing device 730 may cause an image to be displayed on a display unit with which the information processing device 730 is equipped or may cause an image to be displayed on an external display device. In the second embodiment of the present technology, an example in which the display device 731 separate from the information processing device 730 is installed will be described.

When the display device 731 separate from the information processing device 730 is installed as described above, the information processing device 730 and the display device 731 can be connected through wired connection or wireless connection. For example, when the information processing device 730 and the display device 731 are connected through wired connection, the connection can be established using a wireline cable (for example, High-Definition Multimedia interface (HDMI) (registered trademark), Mobile High Definition Link (MHL), DisplayPort, or USB3.0). Further, for example, when the information processing device 730 and the display device 731 are connected through wireless connection, the connection can be established using the wireless LAN. A plurality of display devices may be connected to the information processing device 730.

The control device 740 is a connection control device that manages the information processing devices (the information processing devices 703, 704, 710, 720, and 730) included in the communication system 700 and controls the connection of the information processing devices. For example, the control device 740 manages and detects information (for example, terminal identification information and capability information) related to the information processing devices and an operation state (for example, a communication mode and a group participation state) of the information processing devices. The control device 740 is connected with the information processing device 730 using wireless communication. For example, a communication scheme (for example, the wireless LAN) supported by the information processing device 730 may be used as the wireless communication. An infrared scheme, any other wireless scheme, or a wired line may be used. The control device 740 may have a protocol for establishing the connection with the access point 701 and establish the connection with the information processing device 730 via the access point 701.

[Installation Example of Communication System]

Figure 18:
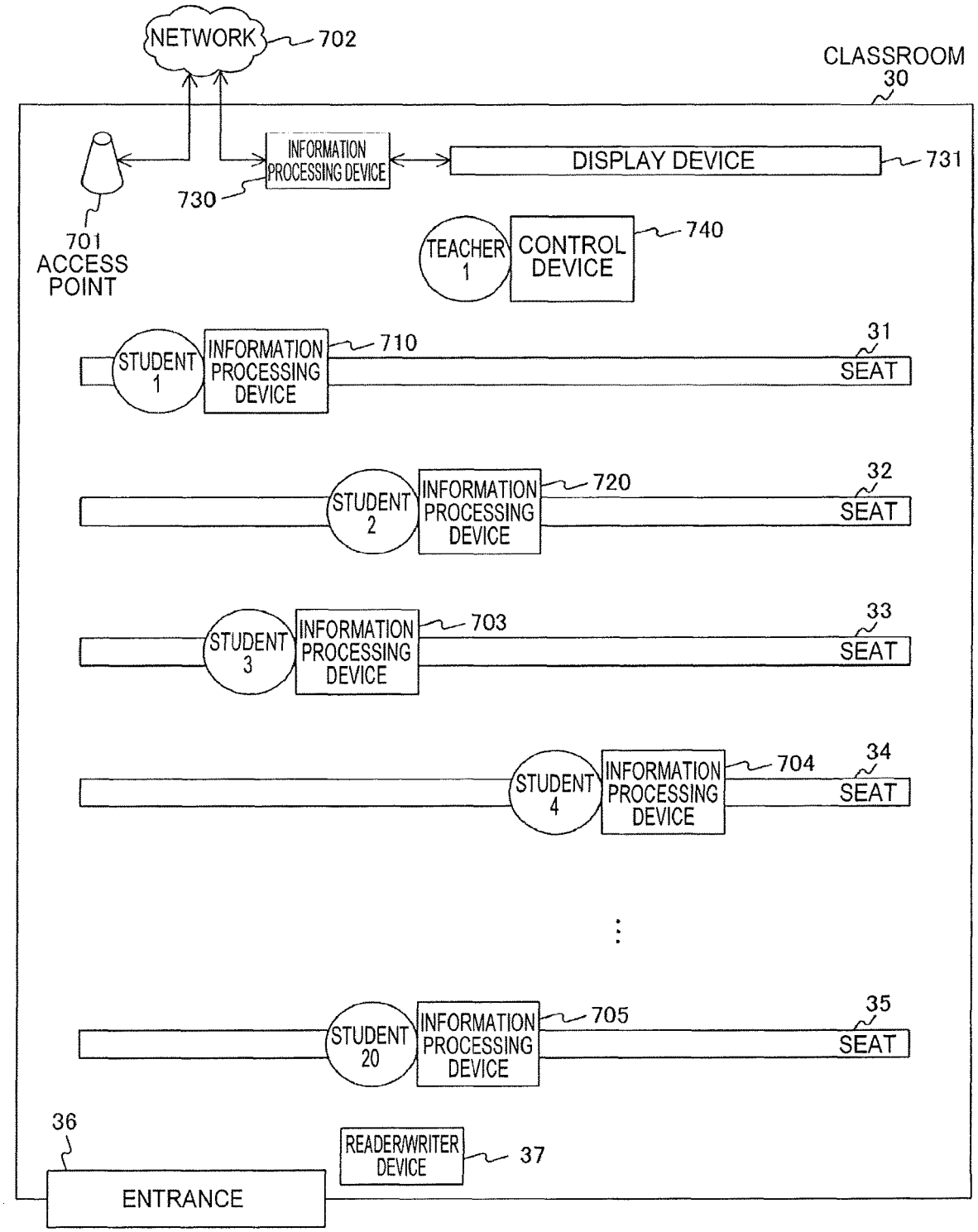
FIG. 18 is a diagram illustrating an installation example of a communication system 700 according to the second embodiment of the present technology.

FIG. 18 is a diagram illustrating an installation example of the communication system 700 according to the second embodiment of the present technology.

FIG. 18 illustrates an example in which the communication system 700 is installed in a classroom 30 in a university. In FIG. 18, people are schematically indicated by circles, and a title indicating each person is written in the circle corresponding to that person. For example, there is assumed to be a teacher 1 at a platform side (an upper side in FIG. 18) of the classroom 30, and the teacher 1 is assumed to be using the control device 740. A student 1 is assumed to be sitting on a seat 31 at a front side of the classroom 30, and the student 1 is assumed to be using the information processing device 710. Similarly, students 2 to 20 are assumed to be sitting on seats 32 to 35 and using the information processing devices 703 to 705 and 720. An entrance 36 is assumed to be installed in a rear side (a lower side in FIG. 18) of the classroom 30.

For example, in the classroom 30, the display device 731 is installed at the platform side to be easily visible to the students 1 to 20 sitting on the seats 31 to 35. The access point 701, the network 702, and the information processing device 730 are appropriately installed inside or outside the classroom 30 in view of space of the classroom 30. In this case, the access point 701 is preferably installed in a place in which wireless communication with the information processing devices used by the students sitting on the seats 31 to 35 can be performed.

For example, a case in which the students give presentations in the classroom 30 one by one is assumed. In this case, each student can give a presentation while causing an image related to the presentation to be displayed on the display device 731 and visible to the other students.

The teacher 1 can sequentially select the information processing devices of the students who have to cause the image to be displayed on a display unit 732 of the display device 731 by manipulating the control device 740. A selection example of information processing device will be described in detail with reference to FIG. 21.

A reader/writer device 37 is installed near the entrance 36 of the classroom 30. The reader/writer device 37 interchanges various kinds of information with the information processing device using the near field communication (for example, NFC). The reader/writer device 37 transmits information interchanged between the information processing devices to the information processing device 730 using a wireless line or a wired line. An example of using the reader/writer device 37 will be described in a third embodiment of the present technology.

[Configuration Example of Control Device]

Figure 19:
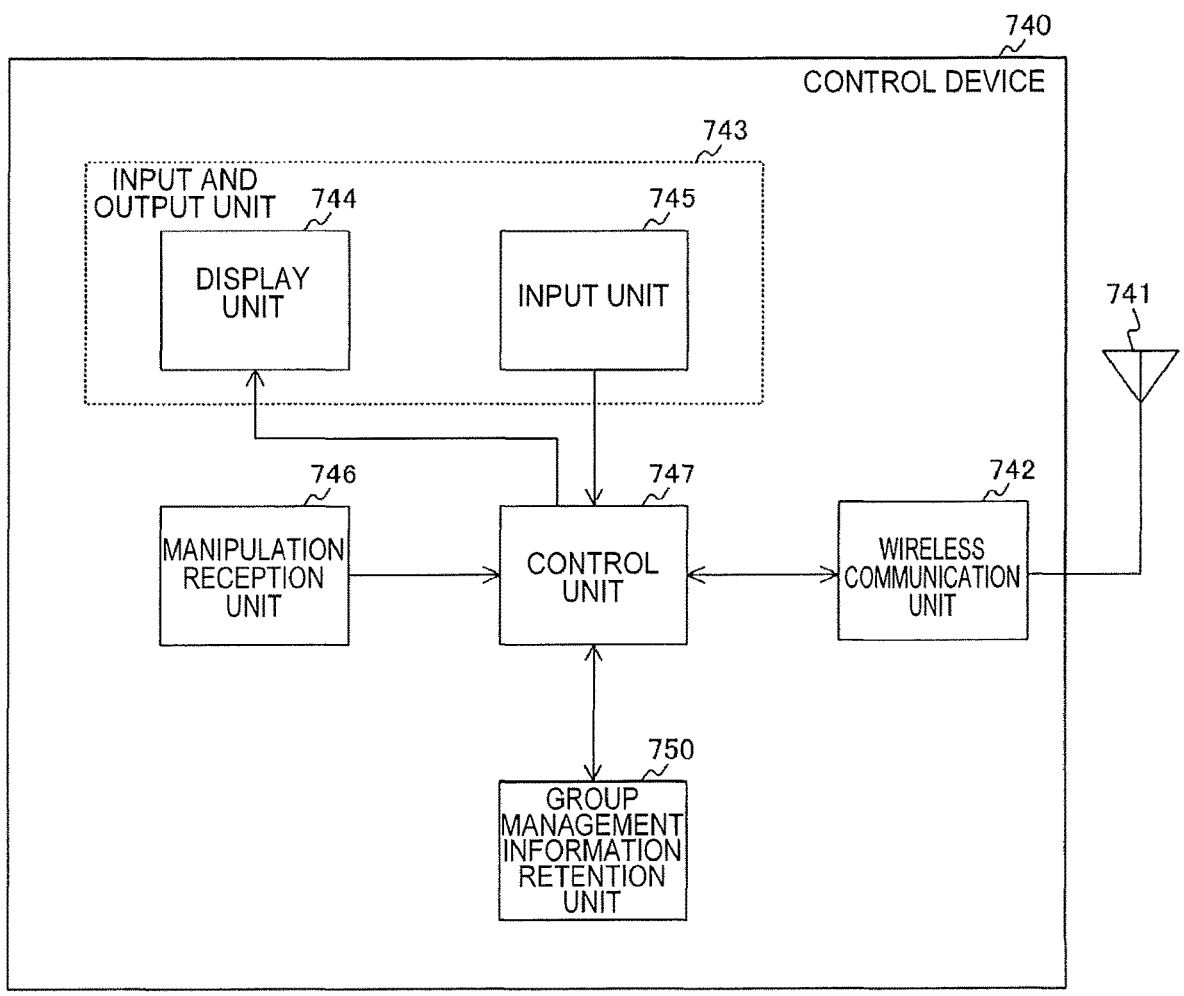
FIG. 19 is a block diagram illustrating a functional configuration example of a control device 740 according to the second embodiment of the present technology.

FIG. 19 is a block diagram illustrating a functional configuration example of the control device 740 according to the second embodiment of the present technology.

The control device 740 includes an antenna 741, a wireless communication unit 742, an input and output unit 743, a manipulation reception unit 746, a control unit 747, and a group management information retention unit 750.

The wireless communication unit 742 transmits and receives each piece of information to and from the information processing device 730 via the antenna 741 using wireless communication under the control of the control unit 747.

The manipulation reception unit 746 is a manipulation reception unit that receives a manipulation input performed by the user and outputs manipulation information to the control unit 747 according to the received manipulation input. The manipulation reception unit 746 is implemented by, for example, a keyboard or a mouse.

The input and output unit 743 causes various kinds of images to be displayed on a display unit 711 and receives the manipulation input from the user through an input unit 745 based on a detection state of an object that approaches or touches a display surface of the display unit 714. The input unit 745 outputs control information according to the received manipulation input to the control unit 747.

As described above, the input and output unit 743 is configured integrally with the display unit 744 and the input unit 745. The input and output unit 743 can be integrally configured using a touch panel on which the user can perform a manipulation input by touching or approaching a display surface with his or her finger. Further, for example, the user can manipulate the control device 740 by performing a touch manipulation (or an approach manipulation) on an image displayed on the display unit 744.

For example, a capacitive (electrostatic capacitive) touch panel that detects a touch or an approach of an object (for example, a human finger) having conductivity based on a change in capacitance can be used as the input unit 745. Further, any touch panel other than an electrostatic (electrostatic capacitive) touch panel may be used. For example, a pressure sensitive (resistive) touch panel or an optical touch panel may be used.

The control unit 747 controls each unit of the control device 740 based on a control program. For example, when real-time image transmission is performed between the sink device and a plurality of source devices according to the Wi-Fi CERTIFIED Miracast specification, the control unit 747 performs control such that the communication mode is set in the source device. In this case, the control unit 747 causes an image indicating a plurality of source devices to be displayed on the input and output unit 743, and performs control such that the communication mode is set in the source device based on the manipulation input in the input and output unit 743. Alternatively, the control unit 747 performs control such that the communication mode is set in the source device based on a predetermined order. Here, the predetermined order may be, for example, an order of images displayed on a peripheral channel region 734 illustrated in FIG. 22 side by side. Further, when there are a plurality of display devices, the control unit 747 may perform control such that all screens are displayed on each display device or a switching display is performed.

The group management information retention unit 750 is a table that retains information (group management information) for managing the source devices connected to the information processing device 730 in units of groups using wireless communication. Content retained in the group management information retention unit 750 will be described in detail with reference to FIG. 20.

[Content Example Retained in Group Management Information Retention Unit]

FIG. 20 is a diagram schematically illustrating a content example retained in the group management information retention unit 750 according to the second embodiment of the present technology.

In the group management information retention unit 750, terminal identification information 751, user information 752, a communication mode 753, a group participation state 754, an outdoor use 755, and an available group participation time 756 are retained in association therewith.

In the terminal identification information 751, identification information is stored to identify the source devices connected to the information processing device 300 using the wireless communication.

In the user information 752, information (user information) related to the users owning the source devices connected to the information processing device 300 using wireless communication is stored. For example, a name, a nickname, identification information (for example, a student ID number, an employee ID number, or a membership number), or an image (for example, an image of the user's face or a drawing of the user's face) of the user may be stored as the user information. The user information stored in the user information 752 is displayed on the input and output unit 743. The user information may be registered in the control device 740, for example, by the user owning the source device. The user information may be registered in the control device 740 each time the connection with the information processing device 300 is established.

The communication modes set in the source devices connected to the information processing device 300 using wireless communication are stored in the communication mode 753. For example, any one of a standby mode, an image transmission mode (a middle channel), and an image transmission mode (a peripheral channel) is stored as the communication mode. The communication modes will be described in detail with reference to FIG. 22.

Information indicating whether or not the information processing device 300 is connected using wireless communication is stored in the group participation state 754. For example, the source device registered in the control device 740 in advance is also considered not to be connected to the information processing device 300. Thus, it is possible to detect the source device that is registered in the control device 740 but not connected to the information processing device 300 with reference to the group participation state 754.

Information indicating whether or not the source device connected to the information processing device 300 using wireless communication can perform communication using a base station other than a specific access point is stored in the outdoor use 755. In other words, information indicating whether or not communication can be performed using the source device connected to the information processing device 300 using wireless communication even when the source device moves to a place other than a specific place is stored in the outdoor use 755.

Information indicating a time zone in which the source device connected to the information processing device 300 using wireless communication can participate in a group is stored in the available group participation time 756. For example, permission may not be given to some user in a time zone in which a presentation or a conference that is highly confidential, a presentation or a conference that has a high degree of importance, a meeting that has not to be exposed, or the like is performed.

[Display Example of Control Device]

Figure 21:
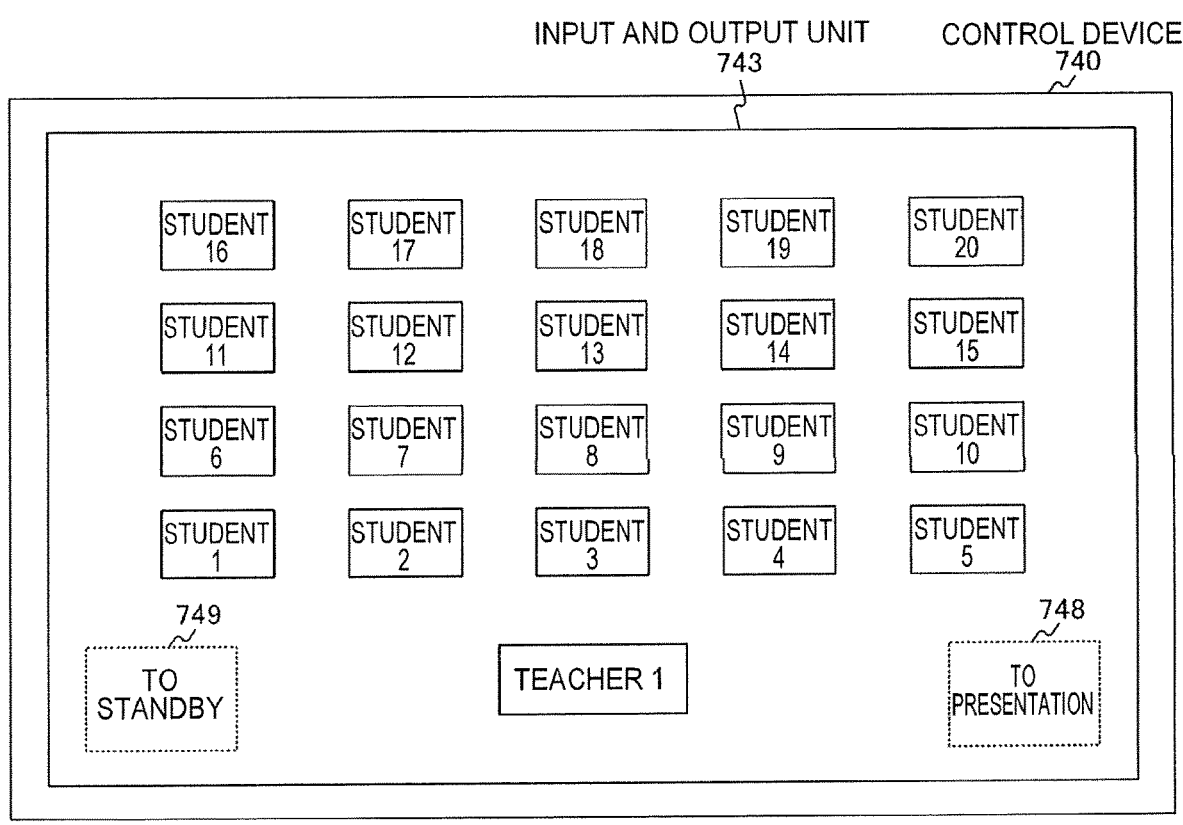
FIG. 21 is a diagram illustrating an example of a display screen displayed on an input and output unit 743 of the control device 740 according to the second embodiment of the present technology.

FIG. 21 is a diagram illustrating an example of a display screen displayed on the input and output unit 743 of the control device 740 according to the second embodiment of the present technology.

The image (the teacher 1 and the students 1 to 20) indicating one or more information processing devices managed by the control device 740 is displayed on the input and output unit 743. A presentation region 748 and a standby region 749 are arranged on the input and output unit 743.

FIG. 21 illustrates an example in which the communication system 700 is installed in the classroom 30 in a university as illustrated in FIG. 18. In this case, for example, images (for example, icons) indicating the teacher 1 and the students 1 to 20 present in the classroom 30 are displayed. In FIG. 21, the text "teacher" and a number identifying a teacher are written in a rectangle corresponding to an image indicating a teacher. Further, the text "student" and a number identifying a student are written in a rectangle corresponding to an image indicating a student. An icon with other information (for example, a student ID number, an ID, a face image, a name, or a nickname) identifying a student may be displayed.

In FIG. 21, an example in which the images indicating the students 1 to 20 are arranged in a lattice form in the order of numbers allocated to the students is illustrated, but the images indicating the students 1 to 20 may have any other arrangement. For example, the images indicating the students 1 to 20 may be arranged according to positions of the respective students. For example, position information (for example, a latitude and a longitude) of an information processing device owned by each student may be acquired, and an absolute position of the information processing device may be decided based on the position information. It is possible to decide relative positions of the information processing devices based on the positions of the information processing devices decided as described above and arrange the students. The information processing devices can acquire the position information, for example, using the Global Positioning System (GPS).

For example, the relative position of the information processing device may be detected using radio waves. For example, the information processing device 730 may acquire radio wave strengths from a plurality of information processing devices and acquire a relative position (a position of the own information processing device) with the other information processing devices based on the radio wave strengths using a triangulation technique. The control device 740 may acquire the relative positions obtained as described above and arrange the students.

Here, each of the source devices participating in the group performs, for example, a process of transmitting a command to the access point 701 or the information processing device 730 at a level at which power consumption is not influenced. When the command is received directly or indirectly via the access point 701, the information processing device 730 notifies the control device 740 of information related to the source device from which the command has been received. Thus, the control device 740 can confirm whether or not the source device has left the group.

For example, the control device 740 confirms whether or not the source device participating in the group has left the group, and deletes the image (for example, the icon) corresponding to the source device that has left from the input and output unit 743 when the source device that has left is detected. For example, when the command transmitted from the information processing device corresponding to the student 17 illustrated in FIG. 21 is determined not to have been received for a predetermined period of time or more, the control device 740 determines the information processing device corresponding to the student 17 to have left the group. Then, the control device 740 deletes the image (the student 17) corresponding to the information processing device that has left from the input and output unit 743.

The presentation region 748 is a region used when switching from the standby mode to the image transmission mode (the middle channel or the peripheral channel) is performed.

The standby region 749 is a region used when switching from the image transmission mode to the standby mode is performed.

In the second embodiment of the present technology, an example in which the control device 740 manages one or more information processing devices connected to the information processing device 730, and the images indicating the information processing devices are displayed on the input and output unit 743 of the control device 740 is described. However, one or more information processing devices connected to the information processing device 730 may be managed by the information processing device 730, and the images indicating the information processing devices may be displayed on the display unit of the information processing device 730 or the display device 731.

[Display Example of Display Device]

FIG. 22 is a diagram illustrating a transition example of the display screen displayed on the display device 731 according to the second embodiment of the present technology FIG. 22 illustrates a transition example of the display screen that is switched according to the communication mode of the source device.

As described above, in the state in which the source device is connected with the sink device (when participation in the group is permitted), the communication mode of either of the standby mode and the image transmission mode is set in the source device.

Here, the image transmission mode is a communication mode in which image transmission from the source device to the sink device is performed, and the source device and the sink device are directly connected in the P2P manner. The image transmission mode includes an image transmission mode (the middle channel) in which an image of the middle channel is transmitted and an image transmission mode (the peripheral channel) in which an image of the peripheral channel is transmitted.

The image transmission mode (the middle channel) is a communication mode in which image data for causing the image to be displayed on the middle channel (a middle channel region 733) in the display unit of the sink device is transmitted. In the image transmission mode (the middle channel), for example, the image data is transmitted through a wireless transmission path of a high frequency band.

The image transmission mode (the peripheral channel) is a communication mode in which image data for causing the image to be displayed on the middle channel (the peripheral channel region 734) in the display unit of the sink device is transmitted. In the image transmission mode (the peripheral channel), for example, the image data is transmitted through the wireless transmission path of the low frequency band.

The standby mode is a communication mode in which the connection state between the source device and the sink device via the access point is maintained with no image transmission from the source device to the sink device. In other words, the standby mode is a mode set when the source device is recognized as a network participant by the sink device and the control device 740.

As described above, in the image transmission mode, the image transmission from the source device to the sink device is assumed to be allowed, but in the standby mode, the image transmission from the source device to the sink device is assumed not to be allowed. However, even in the standby mode, transmission from the source device to the sink device is assumed to be allowed, for example, when there is simple messaging.

In the source device, the communication mode is assumed to be sequentially switched, for example, as in the standby mode→the image transmission mode (the peripheral channel)→the image transmission mode (the middle channel) →the standby mode.

In FIG. 22, a illustrates a display example when the standby mode is set in the information processing device 710. For example, in the example illustrated in FIG. 17, the standby mode is assumed to be set in the information processing device 710. In this case, the information processing device 710 is connected with the information processing device 730 via the access point 701. In this case, image transmission from the information processing device 710 to the information processing device 730 is not preformed. Thus, an image (a running horse) displayed on the information processing device 710 is not displayed on the display unit 732 of the display device 731.

In FIG. 22, b illustrates a display example when the image transmission mode (the peripheral channel) is set in the information processing device 710. For example, in the example illustrated in FIG. 17, the image transmission mode (the peripheral channel) is assumed to be set in the information processing device 710. In this case, the information processing device 710 is connected with the information processing device 730 without intervention of the access point 701. In this case, the image transmission from the information processing device 710 to the information processing device 730 is performed. The image (the running horse) displayed on the information processing device 710 is displayed on the peripheral channel region 734 in the display unit 732 of the display device 731.

Here, the images of the source devices are displayed on the peripheral channel region 734 in the order in which the images are displayed on the middle channel region 733. For example, the source device that transmits an image displayed at the lowest position of the peripheral channel region 734 serves as the source device that causes the image to be displayed on the middle channel region 733 the next time. Further, for example, the source device that transmits an image displayed at a second lowest position of the peripheral channel region 734 serves as the source device that causes the image to be displayed on the middle channel region 733 the time after that. In other words, the images (sub images) can be displayed on the peripheral channel region 734 side by side in the order of presentations.

In FIG. 22, c illustrates a display example when the image transmission mode (the middle channel) is set in the information processing device 710. For example, in the example illustrated in FIG. 17, the image transmission mode (the middle channel) is assumed to be set in the information processing device 710. In this case, the information processing device 710 is connected with the information processing device 730 without intervention of the access point 701. In this case, image transmission from the information processing device 710 to the information processing device 730 is performed. The image running horse) displayed on the information processing device 710 is displayed on the middle channel region 733 in the display unit 732 of the display device 731.

[Switching Example of Communication Mode of Source Device]

Here, a switching method when the communication modes (the standby mode and the image transmission mode) of the source device are switched will be described.

For example, the following (B1) to (B3) can be used as triggers for switching of the communication modes of the source device:

(B1) switching using the source device (for example, active switching according to a manipulation of the user using the source device);

(B2) switching using the control device (for example, switching (remote manipulation switching) according to a manipulation of the user using the control device 740); and (B3) switching using the sink device (for example, switching according to a manipulation of the user using the sink device).

The manipulation (the switching manipulation) of the user in each device is, for example, the manipulation of the user using the manipulation reception unit (for example, a manipulation member or a touch panel) with which each device is equipped or the manipulation of the user using the user information acquisition unit (for example, a detection unit that detects a gesture) with which each device is equipped.

In (B1), for example, a manipulation input of an application or a manipulation member installed in the source device in advance can be used as a switching trigger. For example, when the switching manipulation is performed in the source device, a command related to switching of the communication mode is transmitted to the sink device (the information processing device 730). When the command is received, the sink device (the information processing device 730) performs control such that the band of the source device that has transmitted the command is increased or decreased while performing control for the other bands. The sink device (the information processing device 730) transmits information indicating that the communication mode of the source device that has transmitted the command has been switched to the control device 740. In this case, the control device 740 may output notification information indicating that the communication mode has been switched (through a display or an audio output).

In (B2), for example, the manipulation of the user in the sink device (the information processing device 730) can be used as the switching trigger. For example, when the switching manipulation of the source device is performed in the sink device (the information processing device 730), control is performed such that the band of the source device in which the switching manipulation has been performed is increased or decreased while performing control for the other bands. The sink device (the information processing device 730) transmits information indicating that the communication mode of the source device in which the switching manipulation has been performed has been switched to the control device 740. In this case, similarly to the case of (B1), the control device 740 may output notification information indicating that the communication mode has been switched.

In (B3), for example, the manipulation of the user in the control device 740 can be used as the switching trigger. For example, when the switching manipulation of the source device is performed in the control device 740, information (for example, the terminal identification information) related to the source device in which the switching manipulation has been performed is transmitted to the sink device (the information processing device 730). When the information is received, the sink device (the information processing device 730) performs control such that the band of the source device in which the switching manipulation has been performed is increased or decreased while performing control for the other bands.

Here, the manipulation of the user in the control device 740 will be described. For example, in the display screen illustrated in FIG. 21, the information processing device (the student 17) set to the standby mode is assumed to be switched to the image transmission mode (the peripheral channel). In this case, a manipulation of moving the image corresponding to the information processing device (the student 17) up to the presentation region 748 is performed. For example, the drag & drop manipulation is performed. As a result, the information processing device (the student 1) set to the standby mode can be switched to the image transmission mode (the peripheral channel).

Further, for example, in the display screen illustrated in FIG. 21, the information processing device (the student 13) set to the image transmission mode (the middle channel, the peripheral channel) is assumed to be switched to the standby mode. In this case, a manipulation of moving the image corresponding to the information processing device (the student 13) up to the standby region 749 is performed. For example, the drag & drop manipulation is performed. As a result, the information processing device (the student 13) set to the image transmission mode (the middle channel, the peripheral channel) can be switched to the standby mode.

Similarly to the cases of (B1) and (B2), the control device 740 may output the notification information indicating that the communication mode has been switched.

The control device 740 may cause the images (for example, the students 1 to 20 illustrated in FIG. 21) indicating the information processing devices to have different display states according to the communication mode. For example, the contour of the image indicating the information processing device set to the image transmission mode (the middle channel) is indicated by a thick line, and the contour of the image indicating the information processing device set to the image transmission mode (the peripheral channel) is indicated by a fine line. The information processing device set to the standby mode may be indicated by a dotted line. As another example, the color of the image indicating the information processing device set to the image transmission mode (the middle channel) is red, and the color of the image indicating the information processing device set to the image transmission mode (the peripheral channel) is blue. Further, the color of the image indicating the information processing device set to the standby mode may be white.

[Switching Example of Communication Mode]

Figure 23:
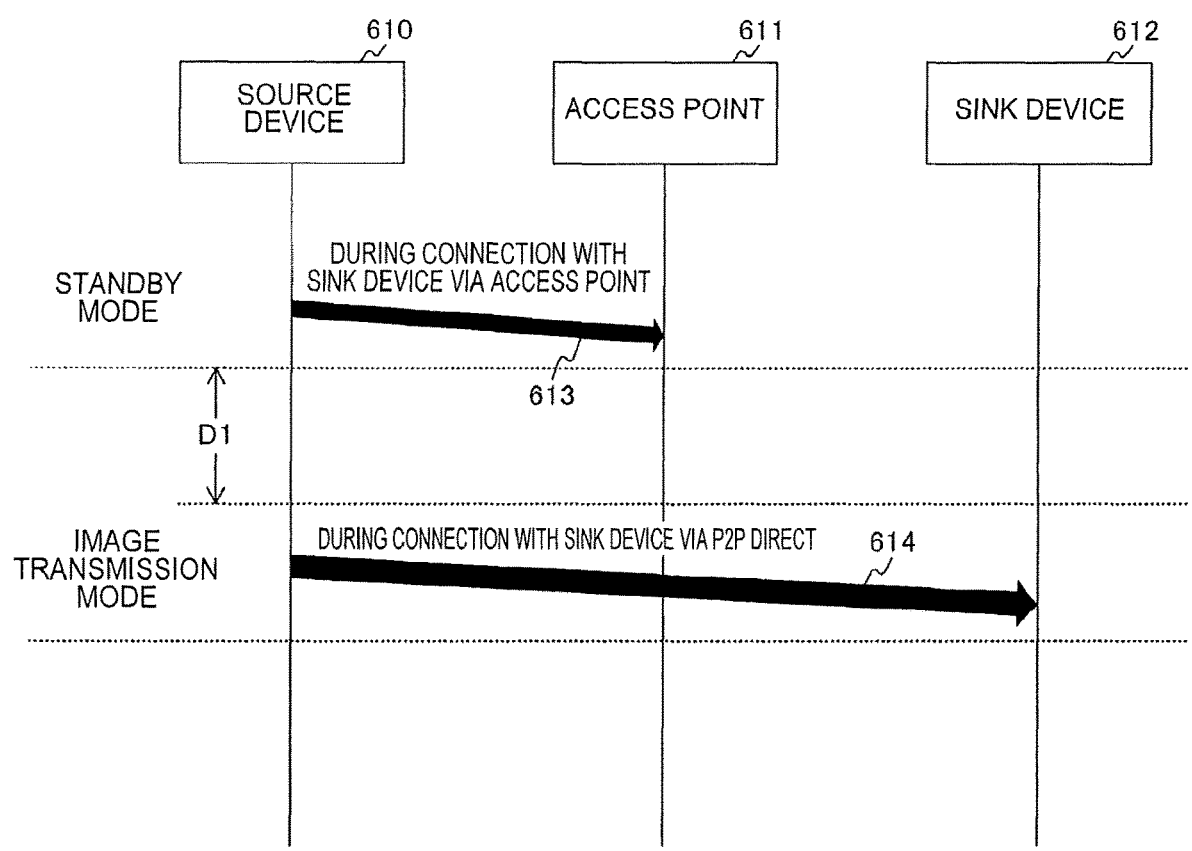
FIG. 23 is a diagram illustrating a switching example of a communication mode between a source device and a sink device serving as a basis for the present technology.

FIG. 23 is a diagram illustrating a switching example of the communication mode between the source device and the sink device serving as the basis for the present technology.

In the second embodiment of the present technology, a connection scheme of indirectly connecting a source device 610 with a sink device 612 via an access point 611 is employed in the standby mode as described above. In the image transmission mode, a connection scheme of directly connecting the source device 610 with the sink device 612 without intervention of the access point 611 is employed.

For example, switching from a connection (613) in the standby mode to a connection (614) in the image transmission mode is assumed to be performed. In other words, switching from the standby mode (613) in which the connection is established via the access point 611 to the image transmission mode (614) in which the connection is established without intervention of the access point 611 is assumed to be performed.

Figure 24:
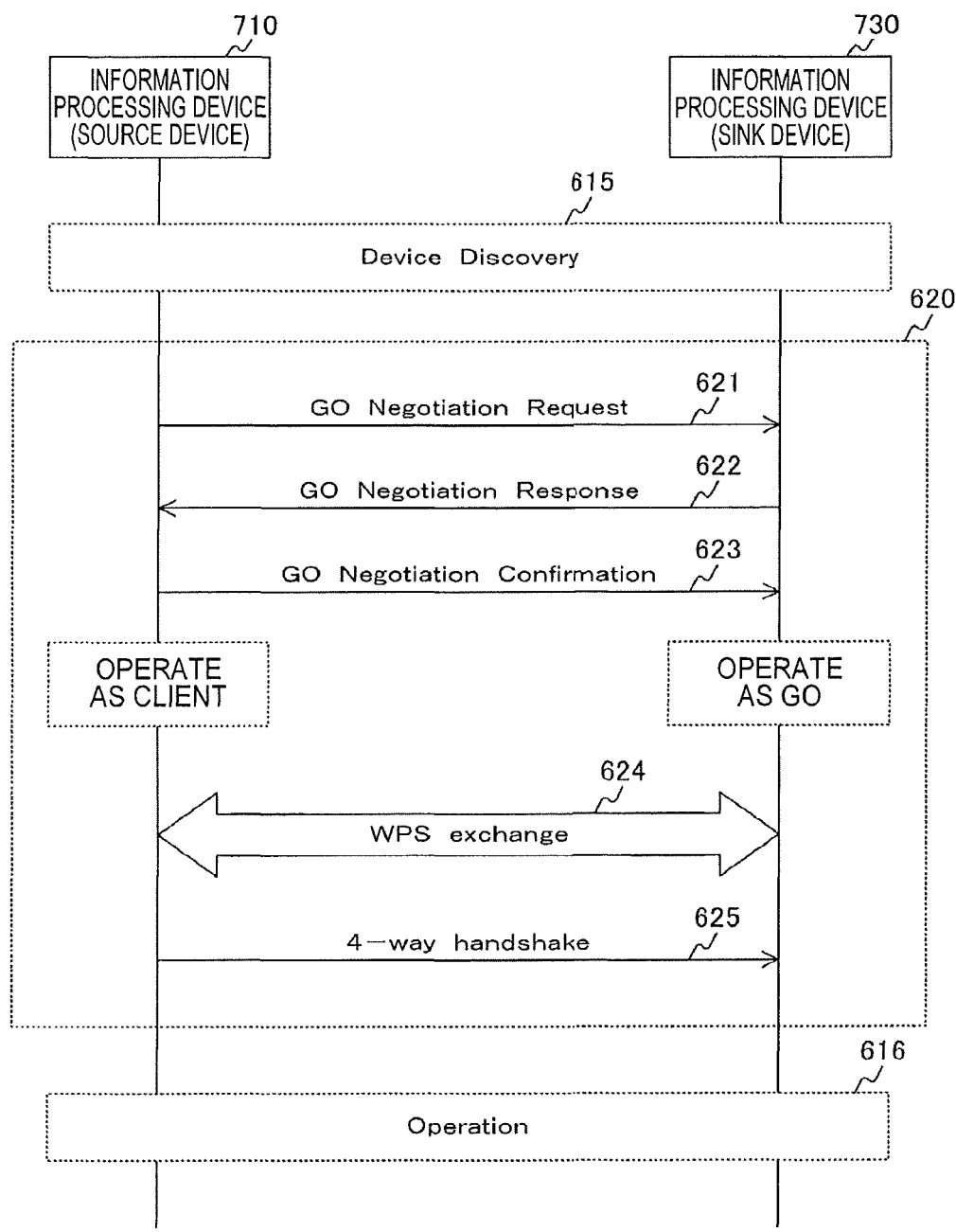
FIG. 24 is a sequence chart illustrating a connection process example between a source device and a sink device according to the second embodiment of the present technology.

When the switching is performed as described above, it is necessary to perform Wi-Fi direct control (P2P Device Discovery, P2P Service Discovery and GO Negotiation), 4-way handshake (Handshake) for performing the security authentication of the wireless LAN, dynamic host configuration protocol (DHCP) access for acquiring an Internet protocol (IP) address, interchange of a port setting of a real time streaming protocol (RTSP), or the like, which are illustrated in FIG. 24. Thus, when switching from the connection (613) in the standby mode to the connection (614) in the image transmission mode is performed, a connection period D1 of a time of several seconds occurs.

Here, the access point 611 and the source device 610 are assumed to be in the same group authentication and the source device 610 and the sink device 612 are assumed to be in the same group authentication. In this case, the security authentication is performed between the access point 611 and the source device 610. For this reason, there is assumed to be no problem even if a set value between the access point 611 and the source device 610 is used for the connection process between the source device 610 and the sink device 612.

In this regard, in the second embodiment of the present technology, an example in which the security authentication between the source device and the sink device is omitted, and more seamless connection switching is performed is described. For example, it is possible to divert a process such as IP acquisition of a high-bandwidth digital content protection system (HDCP) and a port setting of real-time transport protocol (RTP). Thus, even when switching to a communication mode having a different connection scheme (switching from the standby mode to the image transmission mode and switching from the image transmission mode to the standby mode) is performed, a rapid connection process can be performed. Thus, it is possible to cause the user to feel as if the connection were continuously maintained.

Further, when the source device and the sink device support a tunneled direct link setup (TDLS) function, a TDLS protocol may be used.

[Connection Process Example]

FIG. 24 is a sequence chart illustrating a connection process example between the source device and the sink device according to the second embodiment of the present technology. FIG. 24 illustrates a connection process example between the information processing device (the source device) 710 and the information processing device (the sink device) 730.

First, the information processing device 710 performs the Device Discovery (615). When the information processing device 730 is detected through the Device Discovery, the information processing device 710 performs decision of a master-slave relation based on a Formation and an authentication process with the information processing device 730 (620). When the respective processes are completed, a connection is established between the information processing device 710 and the information processing device 730. Then, the information processing device 710 performs direct communication (Operation) with the information processing device 730 (616).

Here, the Formation (620) will be described.

First, GO_Negotiation is performed between the information processing device 710 and the information processing device 730. In GO_Negotiation, the information processing device 710 and the information processing device 730 exchange a priority for operating as a group (GO), and the information processing device that has the higher priority is decided to operate as the group owner (GO). FIG. 24 illustrates an example in which the priority of the information processing device 730 is higher, and the information processing device 730 is decided as the group owner (GO).

Specifically, the information processing device 710 transmits GO_Negotiation_Request to the information processing device 730 (621). Upon receiving GO_Negotiation_Request (621), the information processing device 730 transmits GO_Negotiation_Response to the information processing device 710 (622). Upon receiving GO_Negotiation_Response (622), the information processing device 710 transmits GO_Negotiation_Confirmation to the information processing device 730 (623).

Through these interchanges (621 to 623), the information processing device 730 is decided as the group owner (GO), and the information processing device 710 is decided as a client.

Then, the information processing device 710 and the information processing device 730 execute Wi-Fi protected access (WPS)_exchange (624). Through the execution of WPS_exchange, the information processing device 710 and the information processing device 730 share credentials (for example, a service set identifier (SSID) and a Wi-Fi protected access 2 (WPS2)-pre-shared key (PSK).

Then, the information processing device 710 and the information processing device 730 execute 4-way handshake (625).

[Communication Example]

Figure 25:
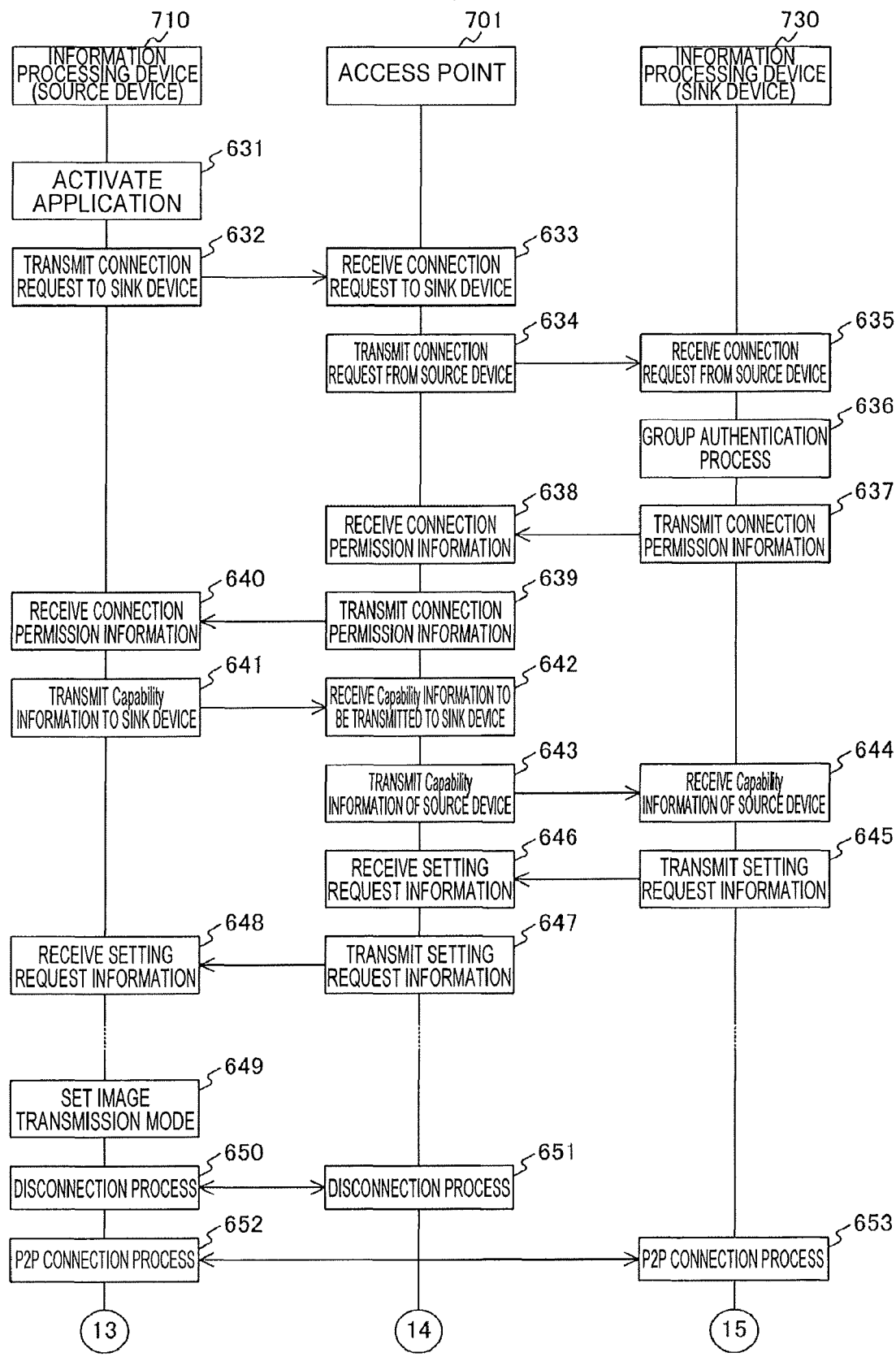
FIG. 25 is a sequence chart illustrating a communication process example between devices included in the communication system 700 according to the second embodiment of the present technology.
Figure 26:
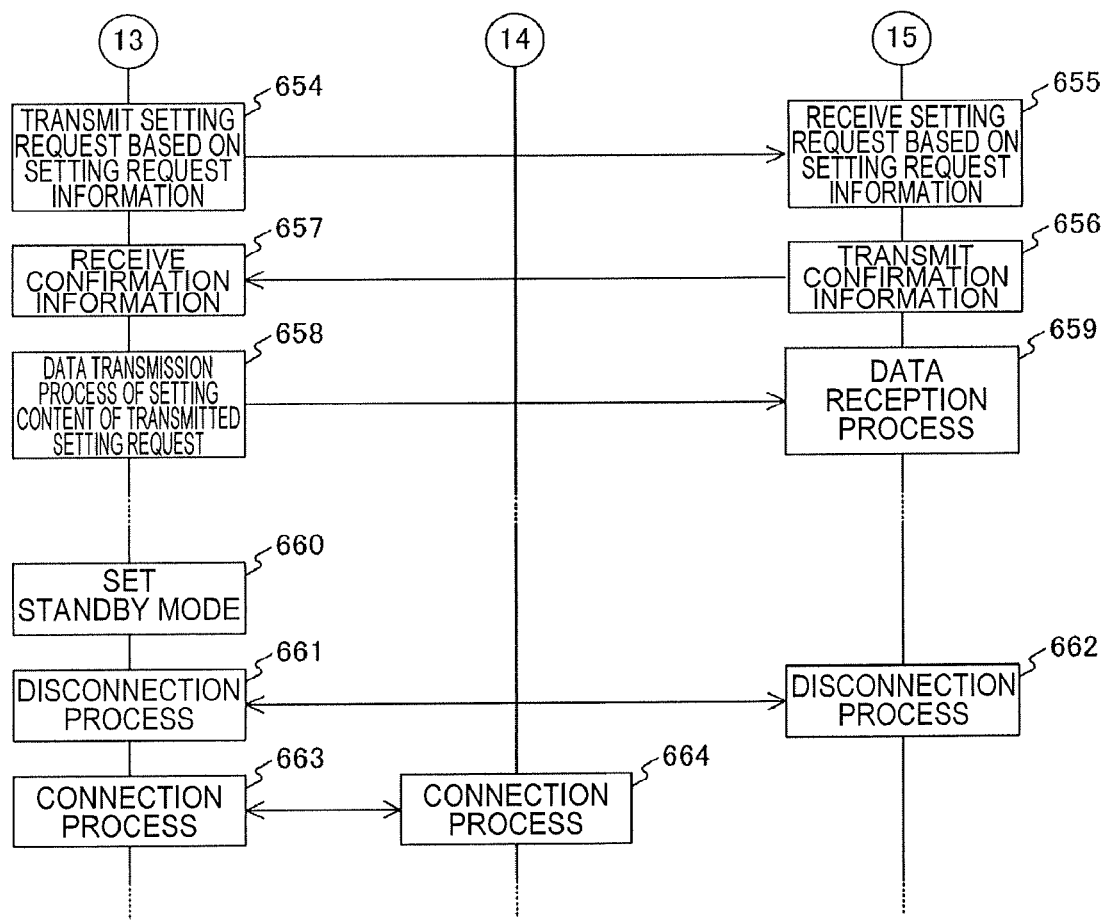
FIG. 26 is a sequence chart illustrating a communication process example between devices included in the communication system 700 according to the second embodiment of the present technology.

FIGS. 25 and 26 are sequence charts illustrating a communication process example between devices included in the communication system 700 according to the second embodiment of the present technology. FIGS. 25 and 26 illustrate a communication process example among the information processing device (the source device) 710, the information processing device (the sink device) 730 and the access point 701.

In the example of FIGS. 25 and 26, the information processing device (the sink device) 730 functions as a group authentication server. In other words, the information processing device (the sink device) 730 is assumed to have a group authentication function.

FIGS. 34 to 38 are diagrams illustrating an example of a WFD IE format interchanged between devices included in the communication system 700 according to the second embodiment of the present technology.

FIG. 39 is a diagram illustrating an example of a new message for an application service platform (ASP) interchanged between devices included in the communication system 700 according to the second embodiment of the present technology.

First, the information processing device 710 activates an application (an application installed in the information processing device 710 in advance) for performing communication with the information processing device 730 (631). The activation of the application is performed, for example, according to a manipulation of the user (for example, a manipulation of pressing an application button).

Here, in the example of FIGS. 25 and 26, the source device is connected directly to the access point and then starts each process as a default. In other words, the information processing device 710 activates an application that is installed in advance, and transmits a connection request to the sink device (the information processing device 730) via a specific access point (the access point 701).

Specifically, after establishing the connection with the access point 701, the information processing device 710 performs the device discovery (corresponding to the Device Discovery (615) illustrated in FIG. 24), and causes a connectable sink device to be displayed on the display unit 711.

Here, for example, a method of receiving a message such as a Probe Request and performing the device discovery so that the WiFi direct protocol can be executed via the access point 701 may be used as the device discovery method. Further, for example, a method of interchanging a device service type represented by a universal plug and play (UPnP) between stations connected to the access point 701 and performing the device discovery may be used.

Here, an example of a control method of the Device Discovery or the Service Discovery will be described.

The information processing device 710 (the source device) transmits the Probe Request to the information processing device 730 (the sink device) via the access point 701, and searches for a device that supports a P2P connection.

For example, when the information processing device 730 (the sink device) is the device that supports the P2P connection, it is possible to receive a Probe Response via the access point 701 and detect a frequency channel used in the P2P connection. Here, the description will proceed under the assumption that the information processing device 730 (the sink device) is the device that supports the P2P connection, and the Probe Response has been received.

Through the above process, the information processing device 710 (the source device) detects the frequency channel for the P2P connection, and establishes the P2P connection with the information processing device 730 (the sink device).

After the P2P connection is established, the information processing device 710 (the source device) establishes a link of a TCP connection or an RTSP connection with the information processing device 730 (the sink device), and then interchanges one or more of the following (C1) to (C4) with the information processing device 730:

(C1) P2P information element (IE);
(C2) WFD IE;
(C3) ASP (for example, a new format according to a format command of the ASP); and
(C4) a protocol in the UPnP standard.

For example, a method of encapsulating the WFD IE in a payload portion of the Probe Request or the Probe Response and interchanging the WFD IE will be described.

A format example using the WFD IE of (C2) described above is illustrated in. FIGS. 34 to 38. FIGS. 34 to 36 illustrate a format that is already allocated in Miracast Release 1. However, a new bit is allocated to a subelement ID (11) illustrated in FIG. 36. Specifically, a new field corresponding to the subelement ID (11) is illustrated in FIGS. 37 and 38.

In FIG. 38, [5:0] of a New Device Information field is information that enables the information processing device 730 (the sink device) to determine an optimum frequency channel in the P2P connection.

In the process of the sequence using any one of (C1) to (C3) described above, the information processing device 710 (the source device) can detect all information and determine the optimum frequency channel in the P2P connection with the information processing device 730 (the sink device). For example, associated frequency information (a field of [23:14] illustrated in FIG. 38) between the access point 701 and the information processing device 730 (the sink device) may be used. Further, for example, concurrent information (a field of [5:2] illustrated in FIG. 38) of a wireless line of the information processing device 730 (the sink device) may be used. The concurrent information is information indicating whether or not connection forms such as a time division connection of the same frequency channel, a time division connection of different frequency channels, a simultaneous connection of the same frequency channel, and a simultaneous connection of different frequency channels are possible (the field of [5:2] illustrated in FIG. 38). For example, a terminal capability serving as a radio function (a field of [13:8] illustrated in FIG. 38) may be used.

There are cases in which the access point 701 and the information processing device 730 (the sink device) are connected in a wired manner or by a connector such as an Ethernet cable or a USB cable connector. In this case, the information processing device 730 (the sink device) gives a notification indicating that the connection with the access point 701 is a wired connection ([1:0] illustrated in FIG. 38) and whether a wireless P2P connection is supported by the information processing device 710 (the source device). Thus, the information processing device 710 (the source device) can determine the optimum frequency channel. For example, when the information processing device 730 (the sink device) supports only the wired line, the information processing device 730 (the sink device) establishes the connection with the access point 701 without change and without transitioning to the P2P connection. On the other hand, when the information processing device 730 (the sink device) supports the wireless line as well, the information processing device 730 (the sink device) can select one of supported frequency channels and establish the connection.

The example of encapsulating the WFD IE in the payload portion of the Probe Request or the Probe Response has been described above, but the present technology is not limited to this example.

For example, when a Display Service of Wi-Fi Direct Services is used, Service Capability information can be exchanged between devices through a message of the ASP standard. Specifically, information included in the WFD IE is delimited in units of 4 bits, converted into a hexadecimal number and converted into a text string, and the text string is transmitted and received. Further, the information included in the WFD IE is not limited to a current specification. For example, the Service Capability information illustrated in FIG. 39 may be included in the payload.

A negotiation of the associated frequency information and the concurrent information of the device may be performed as a series of processes of the Device Discovery or the Service Discovery. Further, the negotiation of the associated frequency information and the concurrent information of the device may be performed again when it is necessary to change the frequency channel during transmission. Further, when the negotiation starts, any one of (C1) to (C4) that can be interchanged is negotiated between the information processing device 710 (the source device) and the information processing device 730 (the sink device), and a method of interchanging information may be selected.

In the above-described processes, the example in which the information processing device 710 (the source device) receives the Probe Response, then establishes the TCP connection or the RTSP connection of the P2P connection link, and then interchanges (C1) to (C4) has been described. However, the Probe Request and the Probe Response including the WFD IE may be interchanged using the TCP connection or the RTSP connection in which the information processing device 710 (the source device) and the information processing device 730 (the sink device) are connected via the access point 701 before the P2P connection link is established. In this example, the process is initiated by the information processing device 710 (the source device), but the process may be initiated by the information processing device 730 (the sink device).

Further, regardless of the above-described processes, the frequency for establishing the P2P connection may be described in the Probe Request, and the frequency Channel for transmitting the Probe Response from the information processing device 730 (the sink device) may not be the frequency channel used by the Probe Request. The reception may be performed through the P2P connection.

In the embodiment of the present technology, the example in which the device discovery is performed immediately after the application is activated has been described, but the present technology is not limited to this example. For example, at least one of the source device and the sink device may have an NFC tag function or a reader function. In this case, the control method of the Device Discovery or the Service Discovery may start at a timing at which any one device using the NFC is touched through the NFC. Further, it may be determined whether or not a connection to the access point starts at a timing at which it is touched through the NFC. Furthermore, a criterion for selecting (C1) to (C4) described above may be performed between the information processing device 710 (the source device) and the information processing device 730 (the sink device) through the NFC. For example, an NFC touch timing may be used for switching of the following (D1) and (D2):

(D1) at a touch timing, an access point is disconnected, and direct connection is established; and (D2) connection is established by TDLS at a touch timing.

A plurality of sink devices corresponding to the activated application may also be discovered through the device discovery process. In this case, a selection screen for selecting a desired sink device from a plurality of discovered sink devices may be displayed on the display unit of the source device, and the desired sink device may be selected on the selection screen by the manipulation of the user. A device closest to the source device among a plurality of discovered sink devices may be automatically selected and connected. When the closest device is automatically selected, for example, the position information acquired by the respective devices may be used.

As described above, the information processing device 710 activates an application, and selects the sink device (631). FIGS. 25 and 26 illustrate an example in which the information processing device 730 is selected.

When the sink device (the information processing device 730) is selected as described above (631), the control unit (corresponding to the control unit 240 illustrated in FIG. 2) of the information processing device 710 transmits the connection request to the sink device (the information processing device 730) via the access point 701 (632 to 635). The connection request includes, for example, identification information (for example, the terminal identification information 391 illustrated in FIG. 4) identifying the information processing device 710 and identification information (application information) identifying an application to be activated.

Upon receiving the connection request from the information processing device 710 (635), the control unit (corresponding to the control unit 370 illustrated in FIG. 3) of the information processing device 730 performs a group authentication process (636). In the group authentication process, it is determined whether or not the information processing device 710 participates in the group operated by the application activated by the information processing device 710 (636). In other words, the control unit of the information processing device 730 performs the group authentication process for determining whether or not a connection for operating the application activated by the information processing device 710 is permitted to the information processing device 710 (636).

For example, in the group authentication process, it is determined whether or not the manipulation of the user for giving the permission to the information processing device 710 has been performed in any one of the source device, the sink device, and the control device 740 that belong to the same group and are already in the connection state. Then, a determination for permitting the information processing device 710 to participate in the group can be performed under the condition that the manipulation of the user for giving the permission to the information processing device 710 have been performed in any one of the devices (the source device, the sink device, and the control device 740).

For example, a display screen (for example, popup) for performing the manipulation of the user for giving the permission to the information processing device 710 is displayed on the display unit of at least one of the devices (the source device, the sink device, and the control device 740). Then, when the manipulation of the user for giving the permission to the information processing device 710 is performed on display screen, the control unit of the information processing device 730 determines to permit the information processing device 710 to participate in the group (636).

The group authentication process may be performed, for example, based on the presence or absence of registration in the control device 740. For example, the control unit of the information processing device 730 determines to permit the information processing device whose terminal identification information is stored in the terminal identification information 751 (illustrated in FIG. 20) of the group management information retention unit 750 to participate in the group (636). However, in this case, only when it is within the period of time of the available group participation time 756 (illustrated in FIG. 20) of the group management information retention unit 750, does the control unit of the information processing device 730 determine to give permission for participation in the group (636).

When the information processing device 710 is determined to be permitted to participate in the group in the group authentication process (636), the control unit of the information processing device 730 transmits connection permission information to the information processing device 710 via the access point 701 (637 to 640). Here, the connection permission information is information indicating that the information processing device 710 is permitted to participate in the group operated by the application activated by the information processing device 710.

Further, when the information processing device 710 is determined not to be permitted to participate in the group in the group authentication process (authentication is not permitted) (636), the control unit of the information processing device 730 transmits connection non-permission information to the information processing device 710 via the access point 701. Here, the connection non-permission information is information indicating that the information processing device 710 is not permitted to participate in the group operated by the application activated by the information processing device 710. When the information processing device 710 receives the connection non-permission information, the operation of the data transmission process ends.

Upon receiving the connection permission information from the information processing device 730 (640), the control unit of the information processing device 710 transmits the capability information related to the information processing device 710 to the information processing device 730 via the access point 701 (641 to 644). The capability information is capability information for performing Wi-Fi CERTIFIED Miracast communication with the information processing device 730. The capability information includes information for performing direct P2P connection with the information processing device 730.

Upon receiving the capability information from the information processing device 710 (644), the control unit of the information processing device 730 transmits setting request information to the information processing device 710 via the access point 701 (645 to 648). The setting request information is information for requesting a setting for performing the image transmission according to the Wi-Fi CERTIFIED Miracast standard.

Here, the information processing device 730 performs band control and display screen control for the source devices connected with the information processing device 730. For this reason, it is necessary to request a newly connected information processing device 710 to transmit a setting of a parameter in which group sharing is considered based on a relation with other source devices. In this regard, after the information processing device 710 is permitted to participate in the group, the information processing device 730 transmits the setting request information related to the information processing device 710 based on each piece of information related to each of the source devices connected with the information processing device 730 (645 to 648).

Further, as described above, in the information processing device 710, the standby mode is initially set based on an instruction given from the information processing device 730. In other words, when the setting request information is received from the information processing device 730 (648), in the information processing device 710, the standby mode is set as an initial state.

Further, based on an instruction given from the information processing device 730, in the information processing device 710, the communication mode is sequentially switched, for example, in the order of the standby mode-→the image transmission mode (the peripheral channel) →the image transmission mode (the middle channel)→the standby mode.

Here, the communication mode of the information processing device 710 is assumed to be switched according to the switching method of any one of (B1) to (B3) described above. Here, an example in which the communication mode of the information processing device 710 is switched from the standby mode to the image transmission mode (the peripheral channel) is described.

When the image transmission mode is set as described above (649), the control unit of the information processing device 710 disconnects access to the information processing device 730 via the access point 701 (650 and 651).

Then, the control unit of the information processing device 710 performs the P2P connection process for performing direct connection with the information processing device 730 (652 and 653). After the P2P connection process is completed (652 and 653), the control unit of the information processing device 710 transmits the connection request to the information processing device 730 based on the setting request information received from the information processing device 730 (654 and 655). In other words, the control unit of the information processing device 710 transmits the connection request to the information processing device 730 based on the setting request information received from the information processing, device 730 (654 and 655). The connection request is a connection request related to a connection setting of up to a layer 3.

Upon receiving the connection request (655), the control unit of the information processing device 730 transmits confirmation information indicating permission for reception of an image corresponding to the connection request to the information processing device 710 (656 and 657). Upon receiving the confirmation information (657), the control unit of the information processing device 710 starts the direct P2P connection with the information processing device 730 (658 and 659).

In other words, the control unit of the information processing device 710 performs a negotiation of an image parameter and an audio parameter with the information processing device 730 based on the connection request corresponding to the received confirmation information, and transmits the image data (658 and 659).

Here, the communication mode of the information processing device 710 is assumed to be switched according to the switching method of any one of (B1) to (B3) described above. Here, an example in which the communication mode of the information processing device 710 is switched from the image transmission mode (the middle channel) to the Standby mode is described.

When the standby mode is set as described above (660), the control unit of the information processing device 710 disconnects the direct connection with the information processing device 730 (661 and 662).

Then, the control unit of the information processing device 710 performs the connection process for performing the connection with the information processing device 730 via the access point 701 (663, 664).

Further, when switching between the direct connection and the connection via the access point 701 is performed, the connection period of time may be detected in advance, and the image lastly displayed on the display device 731 may be retained in the sink device (the information processing device 730) without change. Then, the sink device (the information processing device 730) performs the connection switching during a process of changing a display position in the display device 731. In other words, the sink device performs an interpolation process so that the disconnection is not recognized by the user. Thus, the switching can be performed while preventing the user from feeling a switching period of time that physically occurs.

[Operation Example of Information Processing Device (Source Device)]

Figure 27:
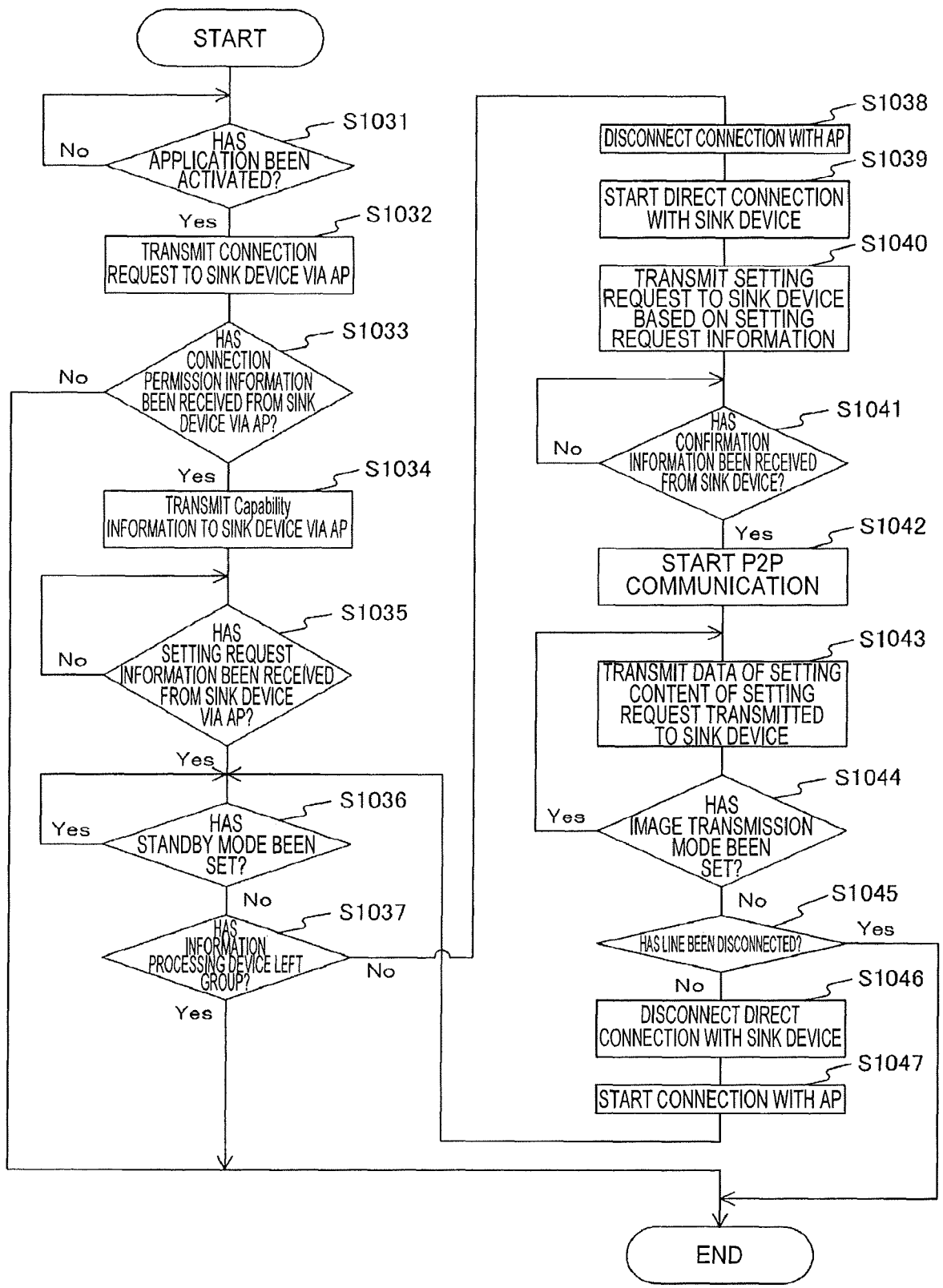
FIG. 27 is a flowchart illustrating an example of a processing procedure of a data transmission process performed by the information processing device 710 according to the second embodiment of the present technology.

FIG. 27 is a flowchart illustrating an example of a processing procedure of a data transmission process performed by the information processing device 710 according to the second embodiment of the present technology. FIG. 27 illustrates an example in which the source device (the information processing device 710) is directly connected to the access point and then starts each process as default. In other words, the information processing device 710 activates an application that is installed in advance, and transmits the connection request to the sink device via a specific access point (the access point 701). Further, FIG. 27 illustrates an example in which the source device (the information processing device 710) is connected to the information processing device 730 serving as the sink device and connected to the access point 701 serving as a specific access point.

First, the information processing device 710 activates air application for performing communication with the sink device (the information processing device 730) (step S1031). After the activation, the sink device (the information processing device 730) serving as a connection target is selected (step S1031).

Then, the control unit of the information processing device 710 transmits the connection request to the information processing device 730 via the access point 701 (AP) (step S1032). Then, the control unit of the information processing, device 710 determines whether or not the connection permission information has been received from the information processing device 730 via the access point 701 (step S1033). When the connection permission information has not been received from the information processing device 730 (step S1033), the operation of the data transmission process ends. In this case, the operation of the data transmission process may end when the connection permission information has not been received within a predetermined period of time.

When the connection permission information has been received from the information processing device 730 (step S1033), the control unit of the information processing device 710 transmits the capability information of the information processing device 710 to the information processing device 730 via the access point 701 (step S1034).

Then, the control unit of the information processing device 710 determines whether or not the setting request information has been received from the information processing device 730 via the access point 701 (step S1035). Step S1035 is an example of a second process set forth in the claims. When the setting request information has not been received (step S1035), it is continuously monitored.

When the setting request information has been received (step S1035), in the information processing device 710, the standby mode is set as the initial state. Then, the control unit of the information processing device 710 determines whether or not the standby mode has been set (step S1036). Then, when the standby mode has been set in the information processing device 710 (step S1036), it is continuously monitored.

When the standby mode has not been set (when the image transmission mode has been set) (step S1036), the control unit of the information processing device 710 determines whether or not the information processing device 710 has left the group (step S1037). Here, when the information processing device 710 has left the group, for example, when the information processing device 710 has moved to a place that neither the radio waves of the access point nor the sink device reaches, a manipulation of the user for leaving the group may be performed. This manipulation of the user may be, for example, a manipulation of pressing a leaving button (for example, a manipulation of pressing the manipulation member or a manipulation of pressing the touch panel). The manipulation of the user is assumed to be performed in any one of the information processing device 710, another source device, the sink device, and the control device 740.

Then, when the information processing device 710 has left the group (step S1037), the operation of the data transmission process ends. When the information processing device 710 has not left the group (step S1037), the control unit of the information processing device 710 disconnects the connection with the information processing device 730 via the access point 701 (step S1038).

Then, the control unit of the information processing device 710 performs the P2P connection process for performing the direct connection with the information processing device 730 (step S1039). After the P2P connection process is completed (step S1039), the control unit of the information processing device 710 transmits the connection request to the information processing device 730 based on the setting request information received from the information processing device 730 (step S1040). Step S1040 is an example of a third process set forth in the claims.

Then, the control unit of the information processing device 710 determines whether or not the confirmation information indicating permission for reception of an image corresponding to the connection request has been transmitted from the information processing device 730 (step S1041). When the confirmation information has not been transmitted from the information processing device 730 (step S1041), it is continuously monitored.

When the confirmation information has been transmitted from the information processing device 730 (step S1041), the control unit of the information processing device 710 starts the direct P2P connection with the information processing device 730 (step S1042). Then, the control unit of the information processing device 710 performs the negotiation of the image parameter and the audio parameter with the information processing device 730 based on the connection request corresponding to the received confirmation information, and transmits the image data (step S1043). Step S1043 is an example of a first process set forth in the claims.

Then, the control unit of the information processing device 710 determines whether or not the image transmission mode has been set (step S1011). Then, when the image transmission mode has been set in the information processing device 710 (step S1011), the process returns to step S1043.

When the image transmission mode has not been set (when the standby mode has been set) (step S1044), the control unit of the information processing device 710 determines whether or not the fine has been disconnected (step S1045). For example, when the information processing device 710 has left the group, the line with the access point 701 or the information processing device 730 is disconnected. Then, when the line has been disconnected (step S1045), the operation of the data transmission process ends.

When the line is not disconnected (step S1045), the control unit of the information processing device 710 disconnects the direct connection with the information processing device 730 (step S1046). Then, the control unit of the information processing device 710 starts the connection with the access point 701 (step S1047).

As described above, the information processing device 710 performs real-time image transmission with the information processing device 730 according to the Wi-Fi CERTIFIED Miracast specification. The control unit of the information processing device 710 performs control such that setting request information for causing the information processing device 710 to perform a setting related to the real-time image transmission is received from the information processing device 730 via the access point 701. Further, the control unit of the information processing device 710 performs control such that a setting request for performing a setting based on the setting request information is transmitted to the information processing device 730 through the direct communication with the information processing device 730. The setting request information is generated based on the capability information (related to the information processing device 710) interchanged between the information processing device 710 and the information processing device 730 via the access point 701.

Further, when the connection state is switched, the control unit of the information processing device 710 can perform control such that the connection process is performed using at least one of port information and IP information related to a connection before the switching. The switching of the connection state is switching from the connection state with the information processing device 730 via the access point 701 to the connection state with the information processing device 730 by the direct communication or inverse switching.

In the image transmission mode (the peripheral channel), the control unit of the information processing device 710 performs control such that an image to be displayed on the peripheral channel region 734 in the display device 731 is transmitted through the wireless transmission path of the low frequency band. In the image transmission mode (the peripheral channel), the control unit of the information processing device 710 performs control such that an image to be displayed on the middle channel region 733 in the display device 731 is transmitted through the wireless transmission path of the high frequency band.

The control unit of the information processing device 710 performs control such that the setting request is transmitted to the information processing device 730 through the direct communication based on the manipulation of the user in any one of the devices. Alternatively, the control unit of the information processing device 710 performs control such that the setting request is transmitted to the information processing device 730 through the direct communication in a predetermined order (for example, the order of images displayed on the peripheral channel region 734 side by side).

The control unit of the information processing device 730 performs control such that the setting request information for causing the information processing device 710 to perform the setting related to the real-time image transmission is transmitted to the information processing device 710 via the access point 701. Further, the control unit of the information processing device 730 performs control such that the setting request for performing a setting based on the setting request information is received from the information processing device 710 through the direct communication with the information processing device 710.

When switching between the access point and the direct connection is performed as described above, the switching period of time can be reduced. For example, in an environment in which the band control is performed on a plurality of source devices, an Infrastructure environment, and a WiFi Direct (or the Wi-Fi CERTIFIED Miracast) environment, the switching period of time can be reduced. Thus, the seamless connection switching can be provided.

In a multi-source environment, it is possible to set a connection order and share image information of a high-quality image while causing a plurality of source devices to participate in the group. For example, it is possible to notify the sink device (or the control device) of the source device that participates in an Infrastructure environment. In the WiFi Direct (or Wi-Fi CERTIFIED Miracast) environment, it is possible to perform the image transmission through the direct communication through a frequency channel different from that in the Infrastructure environment. Thus, even when a plurality of source devices are connected to a single display device (sink device), stable image communication can be performed. Further, even when hardly any of the source devices are switched to the image transmission mode due to wireless band restrictions, all connections can be stably established.

As the number of connected devices in the group increases, the overhead of connection control increases, band usage efficiency gets worse, and thus it is difficult to perform image transmission stably. On the other hand, in the embodiment of the present technology, it is possible to provide the communication system capable of performing stable image transmission even in the environment in which the number of connected devices is large. In other words, in the embodiment of the present technology it is possible to perform appropriate control when communication is performed between a plurality of information processing devices.

[Example in which Connection with Public Line Other than Initially Connected Access Point can be Established]

In the above example, when the source device is connected to the sink device, the connection with the sink device via the access point or the direct connection with the sink device is performed. Here, the user using the source device may move when the source device is a portable information processing device (for example, a smartphone or a tablet terminal). In this case, for example, the user using the source device may also move to a place in which it is difficult to establish the connection with the access point. In this case, the user may desire to continuously perform the connection with the sink device. In this regard, an example in which the user using the source device moves to a place in which it is difficult to establish the connection with the access point will be described below.

[Usage Example of Source Device]

Figure 28:
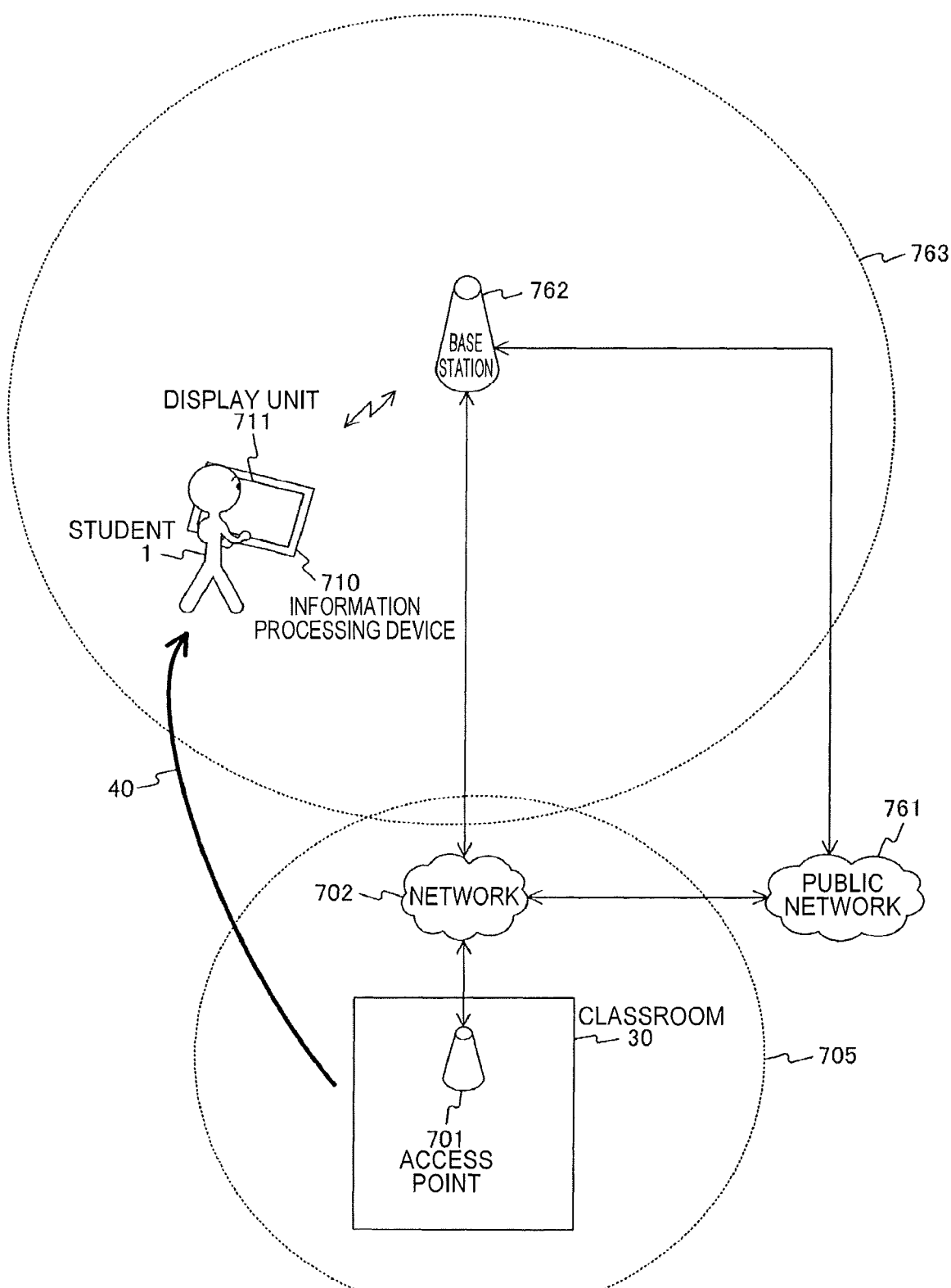
FIG. 28 is a diagram illustrating a usage example of the information processing device 710 according to the second embodiment of the present technology.

FIG. 28 is a diagram illustrating a usage example of the information processing device 710 according to the second embodiment of the present technology.

FIG. 28 schematically illustrates an example in which the student 1 using the information processing device 710 in the classroom 30 illustrated in FIG. 18 moves to the outside of the classroom 30 as indicated by an arrow 40. For example, the student 1 may move from the classroom 30 in which a presentation has been given to a laboratory or a place outside a university. Further, for example, in the case of an office, a salesman may go out of a conference room in which a presentation has been given.

In FIG. 28, a range (a radio wave arrival range from the access point 701) in which direct communication with the access point 701 can be performed using wireless communication is indicated as a radio wave arrival range 705. A range (a radio wave arrival range from a base station 762) in which direct communication with the base station 762 can be performed using wireless communication is indicated as a radio wave arrival range 763.

The public network 761 is a public line network such as a telephone network or the Internet. The network 702 and the base station 762 are connected via, for example, the public network 761.

The base station 762 is a base station operated by a communication service provider, and connects the information processing device with the public network 761 using wireless communication and provides various kinds of wireless services. The wireless service is, for example, a hotspot service of IEEE 802.11 or a line service that conforms to IEEE 802.15, IEEE 802.16, 3GPP specifications (for example, W-CDMA, GSM, WiMAX, WiMAX2, LTE, and LTE-A).

[Operation Example of Information Processing Device (Source Device)]

Figure 29:
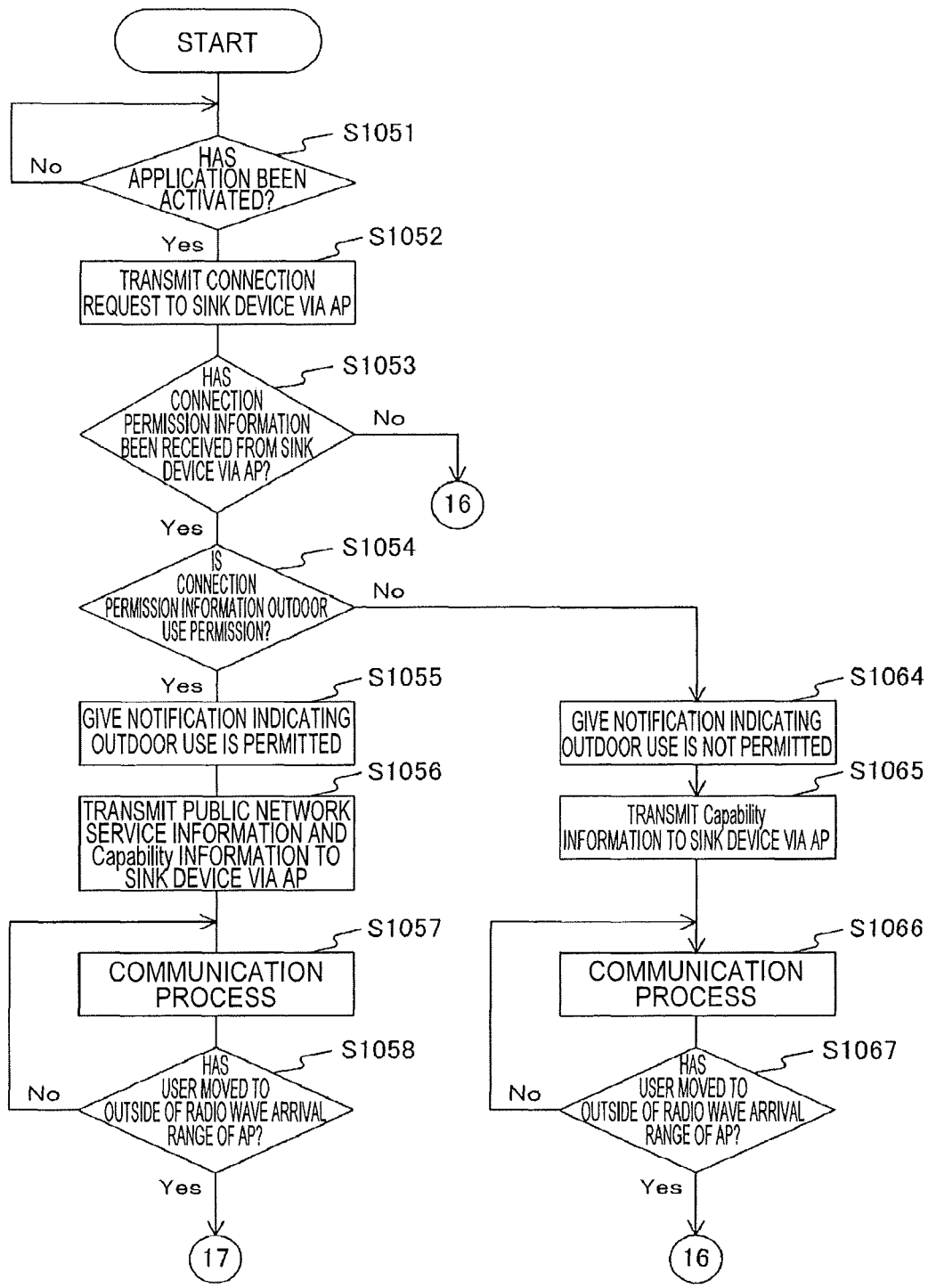
FIG. 29 is a flowchart illustrating an example of a processing procedure of a data transmission process performed by the information processing device 710 according to the second embodiment of the present technology.
Figure 30:
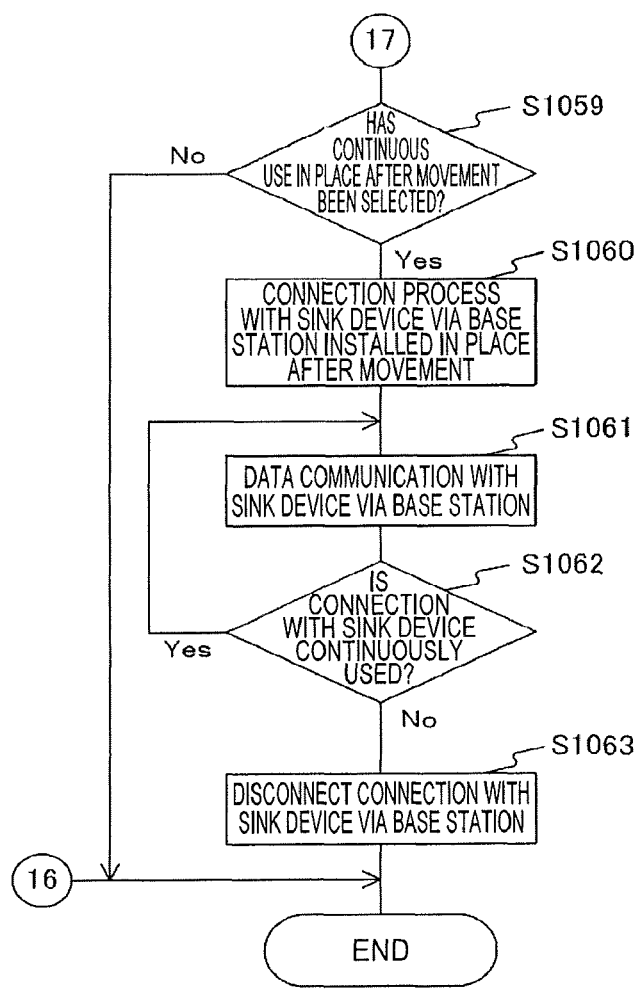
FIG. 30 is a flowchart illustrating an example of a processing procedure of a data transmission process performed by the information processing device 710 according to the second embodiment of the present technology.

FIGS. 29 and 30 are flowcharts illustrating an example of a processing procedure of the data transmission process performed by the information processing device 710 according to the second embodiment of the present technology. FIGS. 29 and 30 illustrate an example in which, as a default, after the source device (the information processing device 710) is directly connected to the access point, the source device (the information processing device 710) starts each process and can also be connected to a public line other than the access point. The example illustrated in FIGS. 29 and 30 is a modified example of FIG. 27, and a description of parts that are common to FIG. 27 is partially omitted.

First, an application is activated (step S1051), and the connection request is transmitted to the information processing device 730 via the access point 701 (AP) (step 1052). Then, the control unit of the information processing device 710 determines whether or not the connection permission information has been received from the information processing device 730 via the access point 701 (step S1053). When the connection permission information has not been received from the information processing device 730 (step S1033), the operation of the data transmission process ends. Steps S1051 to S1053 correspond to steps S1031 to S1033 illustrated in FIG. 27.

When the connection permission information has been received from the information processing device 730 (step S1053), the control unit of the information processing device 710 determines whether or not information (outdoor use information) for giving permission for outdoor use is included in the connection permission information (step S1054). The outdoor use information is permission information indicating whether or not the connection with the information processing device 730 via the access point other than the access point 701 or the base station is permitted and stored in the outdoor use 755 (illustrated in FIG. 20) of the group management information retention unit 750. Further, when the information processing device 730 transmits the connection permission information in response to the connection request received via the access point 701 (AP), the information processing device 730 acquires the outdoor use information (permission or non-permission) from the control device 740, includes the acquired outdoor use information (permission or non-permission) in the connection permission information, and transmits the resulting connection permission information. Further, although "permission" is stored in the outdoor use 755, when it is a time zone other than a time zone stored in the available group participation time 756 (illustrated in FIG. 20), the information processing device 730 includes the outdoor use information of the non-permission in the connection permission information and transmits the resulting connection permission information. In other words, the control device 740 can perform scheduling (schedule management), manage scheduled participation times, and permit the outdoor use only in the time zone. The outdoor use information may be included in the capability information and transmitted from the sink device to the source device.

Further, when the outdoor use information of the permission is included in the connection permission information and transmitted, the information processing device 730 includes setting information for using the public network in a place that the radio waves of the access point 701 do not reach in the connection permission information.

In this example, the permission or the non-permission for the outdoor use is set in advance, but the permission or the non-permission may be set in each device each time there is the connection request from the source device. For example, the manipulation for setting the permission or the non-permission can be performed using at least one of the other source devices (for example, the information processing devices 703, 704, and 720), the sink device (the information processing device 730), and the control device 740.

For example, the information processing device 730 can cause a display screen for selecting the permission or the non-permission to be displayed on the input and output unit 743 of the control device 740 and receive a selection manipulation of the permission or the non-permission performed on the display screen.

Further, for example, the information processing device 730 can cause the display screen for selecting the permission or the non-permission to be displayed on the display unit 732 of the display device 731 and receive the selection manipulation of the permission or the non-permission using the display screen. For example, the selection manipulation of the permission or the non-permission can be received through a manipulation input using the manipulation member or a manipulation input based on a gesture.

Further, for example, the information processing device 730 causes the display screen (for example, pop-up) for selecting the permission or the non-permission to be displayed on a display unit 721 of another source device (for example, the information processing device 720). Then, the information processing device 730 can receive the selection manipulation of the permission or the non-permission performed on the display screen.

As described above, the permission or the non-permission can be set each time there is the connection request from the source device. Thus, for example, even when confidentiality or a degree of importance is different, the permission or the non-permission can be appropriately set.

In this example, the sink device functions as the group authentication server, and performs management of determining whether or not the sink device gives permission for the outdoor use. However, a management device (for example, a management server) that manages the permission and the non-permission of the outdoor use in association with the source device may be newly installed, and the management of determining whether or not permission for the outdoor use is given may be performed through the management device.

When the outdoor use information for giving the permission for the outdoor use is included in the connection permission information (step S1054), the control unit of the information processing device 710 causes information indicating that the outdoor use is permitted to be displayed on the display unit 711 (step S1055). For example, information indicating that the use within the same floor (the range that the radio waves of the access point 701 reach) and the outdoor use are permitted can be displayed in a pop-up manner, and the user can be notified of it.

Then, the control unit of the information processing device 710 transmits the capability information related to the information processing device 710 and public network service information to the information processing device 730 via the access point 701 (step S1056). Here, the public network service information is information that enables the information processing device 710 to use a public network service, and includes, for example, a connection destination telephone number (a telephone number of the information processing device 710), an authentication password, or the like.

Then, the control unit of the information processing device 710 performs a communication process (step S1057). In the communication process, the process (steps S1035 to S1047) illustrated in FIG. 27 is performed.

Then, the control unit of the information processing device 710 determines whether or not the user has moved to the outside of the radio wave transfer range of the access point 701 (step S1058). Then, when the user has not moved to the outside of the radio wave transfer range of the access point 701 (step S1058), the process returns to step S1057.

When the user has moved to the outside of the radio wave transfer range of the access point 701 (step S1058), the control unit of the information processing device 710 confirms whether or not the user desires the outdoor use continuously (step S1059). For example, the user may perform an operation (for example, a communication end manipulation) of disconnecting the connection with the sink device. Thus, it is confirmed whether or not the user desires the outdoor use continuously.

For example, the control unit of the information processing device 710 causes a pop-up screen including information indicating that the user has moved to the outside of the radio wave transfer range of the access point 701 and a selection button for selecting whether or not the user desires the outdoor use continuously to be displayed on the display unit 711. Then, the control unit of the information processing device 710 determines whether or not the selection button for selecting the continuous outdoor use has been pressed on the pop-up screen (step S1059). In other words, the control unit of the information processing device 710 determines whether or not the continuous use in a place after movement has been selected (step S1059). When the continuous use in the place after the movement has not been selected (step S1059), the operation of the data transmission process ends.

As described above, when the outdoor use information (permission information) for giving the permission for the outdoor use has been received, the control unit of the information processing device 710 performs control such that the interchange with the information processing device 730 via the access point other than the access point 701 or the base station is performed. In this case, the control unit of the information processing device 710 can perform control such that at least one of image data and audio data is received from the information processing device 730 via the access point other than the access point 701 or the base station and output.

In this example, the confirmation of the continuous outdoor use is performed each time the movement to the outside of the radio wave transfer range of the access point 701 is detected, but the presence or absence of the continuous outdoor use may be set in advance. By setting the presence or absence of the continuous outdoor use in advance as described above, switching between the use within the same floor and the outdoor use can be automatically performed seamlessly.

When the continuous use in the place after the movement is selected (step S1059), the information processing device 730 performs the connection process via the base station installed in the place after the movement (step S1060). For example, the control unit of the information processing device 730 determines whether or not the information processing device 710 has moved to the outside of the radio wave transfer range of the access point 701. Then, when the information processing device 710 has moved to the outside of the radio wave transfer range of the access point 701, the control unit of the information processing device 730 performs the connection process for establishing the connection with the information processing device 710 via the base station installed in the place after the movement. For example, when the telephone number is included in the public line service information received from the information processing device 710, the control unit of the information processing device 730 originates a call to the information processing device 710 via the public network based on the telephone number. Then, the control unit of the information processing device 710 performs the connection process with the information processing device 730 via the public network.

Here, when the user has moved to the outside of the radio wave transfer range of the access point 701, the user owning the information processing device 710 may not view the display unit 732 of the display device 731 and audio output from the display device 731 may be hardly audible. In this regard, the information processing device 730 performs an interchange for confirming whether or not the information processing device 710 can receive an image and audio at a point in time at which the connection with the information processing device 710 is established via the public network. Then, the information processing device 730 determines whether the information processing device 710 can receive both or either of the image and the audio.

Based on the determination result, the information processing device 730 performs the data communication (the image data and the audio data) with the information processing device 710. In other words, the control unit of the information processing device 710 performs the data communication (the image data and the audio data) with the information processing device 730 via the public network. In the data communication, a two-way interchange is performed between the information processing device 710 and the information processing device 730.

For example, the control unit of the information processing device 730 transmits at least one of the display screen displayed on the display unit 732 of the display device 731 and the audio output from the display device 731. In the case of outdoor places, it may be difficult to view the display screen displayed on the display unit 711 of the information processing device 710. In this case, only the audio may be transmitted. Data to be transmitted can be configured to be modified by the user of the information processing device 710.

Further, when the two-way data interchange is performed between the information processing device 710 and the information processing device 730, the information processing device 730 may confirm a transmission path (for example, a band or a communication state) to the information processing device 710 via the public network. Then, the information processing device 730 may switch data to be transmitted based on the confirmation result. For example, when a large-capacity transmission path is secured, the information processing device 730 transmits both of the image data and the audio data. Further, for example, when the large-capacity transmission path is not secured, the information processing device 730 reduces an amount of image data by transcoding or transmits only the audio data.

Then, the control unit of the information processing device 710 determines whether or not the connection with the information processing device 730 via the public network is continuously used (step S1062). For example, the control unit of the information processing device 710 causes a display screen for selecting whether or not the connection with the information processing device 730 via the public network is continuously used to be displayed (consistently or regularly) on the display unit 711. Then, based on the selection manipulation in the display screen, the control unit of the information processing device 710 can determine whether or not the connection with the information processing device 730 via the public network is continuously used.

When the connection with the information processing device 730 via the public network is continuously used (step S1062), the process returns to step S1061. When the connection with the information processing device 730 via the public network is not continuously used (step S1062), the control unit of the information processing device 710 disconnects the connection with the information processing device 730 via the public network (step S1063).

When the outdoor use information indicating that the outdoor use is not permitted is included in the connection permission information (step S1054), the control unit of the information processing device 710 causes information indicating that the outdoor use is not permitted to be displayed on the display unit 711 (step S1064).

Then, the control unit of the information processing device 710 transmits the capability information related to the information processing device 710 to the information processing device 730 via the access point 701 (step S1065).

Then, the control unit of the information processing device 710 performs the communication process (step S1066). In the communication process, the process (steps S1035 to S1047) illustrated in FIG. 27 is performed.

Then, the control unit of the information processing device 710 determines whether or not the user has moved to the outside of the radio wave transfer range of the access point 701 (step S1067). Then, when the user has not moved to the outside of the radio wave transfer range of the access point 701 (step S1067), the process returns to step S1066. When the user has moved to the outside of the radio wave transfer range of the access point 701 (step S1067), the process proceeds to step S1063.

As described above, when the sink device and a plurality of source devices share information, the information can be interchanged regardless of the position of the source device. For example, even when the student 1 owning the information processing device 710 has moved to the outside of the radio wave arrival range 705 of the access point 701, the information processing device 710 can be connected to the information processing device 730 via the base station. For example, the student 1 may move from the classroom 30 in which a presentation has been given to a laboratory or a place outside a university. Further, for example, when the communication system 700 is installed in an office, a salesman may go out of a conference room in which a presentation has been given. In this case, the salesman can listen to details of a conference outside (for example, in a train).

In the second embodiment of the present technology, the example in which the group authentication between the source device and the sink device starts when the source device is connected to the access point or the base station has been described. However, a device having an NFC reader/writer function may start the group authentication between the source device and the sink device in collaboration with the sink device or another device. Another such device is, for example, a device that conforms to the Wi-Fi CERTIFIED Miracast specification. An example in which the group authentication between the source device and the sink device starts using the NFC reader/writer function will be described in a third embodiment of the present technology.

3. Third Embodiment

In the second embodiment of the present technology, the example in which the group authentication between the source device and the sink device starts when the source device is connected to the access point or the base station initially has been described.

In the third embodiment of the present technology, an example in which the group authentication between the source device and the sink device starts using the near field communication will be described. For example, the group authentication can start using a Wi-Fi Direct over NFC protocol or a Wi-Fi direct using NFC protocol. For example, the group authentication can be initiated by the source device having the NFC function touching the sink device having the NFC function directly.

The Wi-Fi Direct over NFC protocol is a protocol for connecting the source device and the sink device by touching between the source device and the sink device. The protocol is, for example, a protocol for interchanging information for connecting Wi-Fi Direct by causing the source device with the NFC tag to touch (or approach) the sink device equipped with the NFC reader/writer function.

As described above, the group authentication can be initiated by the operation of the user of causing the source device to touch the sink device directly. Thus, when the user intends to participate in the group, the user can actively perform an operation for participating in the group. Further, switching to the connection with the access point can be performed after the direct connection between the source device and the sink device. Accordingly, it is possible to provide a user-friendly interface.

In the second embodiment of the present technology, the example in which, when a plurality of sink devices are discovered through the device discovery, the selection screen for selecting a desired sink device is displayed, and the user selects the desired sink device on the selection screen has been described. On the other hand, in the third embodiment of the present technology, it is possible for the user to cause the source device to be connected to a desired sink device by performing the operation of causing the source device to touch the desired sink device.

The group authentication may be initiated by causing the source device to touch another device instead of touching the sink device directly. For example, in the example illustrated in FIG. 18, the group authentication may be initiated by causing the source device to touch the reader/writer device 37 installed near the entrance 36 of the classroom 30. In this case, the reader/writer device 37 transmits information (for example, terminal identification information or a personal identification number (PIN) code) related to the touched source device to the sink device. For the PIN code, a unique ID that is independently generated is preferably used.

Further, for example, a remote controller for manipulating the sink device (for example, the information processing device 730) or the display device (for example, the display device 731) may be used as the sink device. For example, the group authentication may be initiated by causing the source device to touch the remote controller equipped with the NFC reader/writer function. In this case, the remote controller transmits information (for example, the terminal identification information or the PIN code) related to the touched source device to the sink device.

[Operation Example of Information Processing Device (Source Device)]

Figure 31:
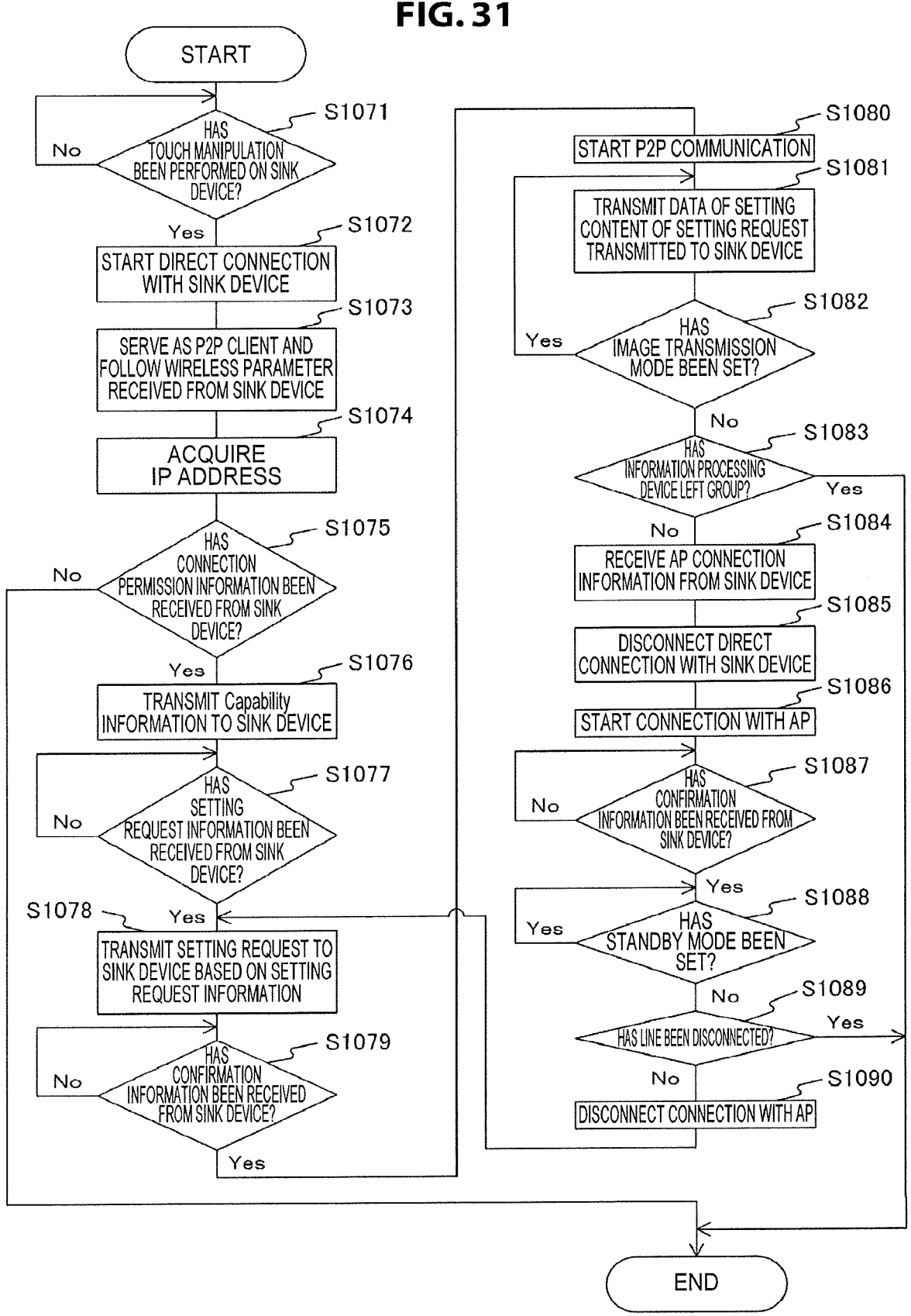
FIG. 31 is a flowchart illustrating an example of a processing procedure of a data transmission process performed by the information processing device 710 according to the third embodiment of the present technology.

FIG. 31 is a flowchart illustrating an example of a processing procedure of the data transmission process performed by the information processing device 710 according to the third embodiment of the present technology. FIG. 31 illustrates an example in which the group authentication is initiated by causing the information processing device 710 to touch the information processing device 730 directly. The example illustrated in FIG. 31 is a modified example of FIG. 27, and a description of parts that are common to FIG. 27 is partially omitted.

In FIG. 31, the information processing device 710 is assumed to have an NFC tag function, and the information processing device 730 is assumed to have an NFC read/writer function. However, the NFC tag function and the NFC reader/writer function may be implemented in either of the source device and the sink device. The information processing device 730 functions as a DHCP server.

First, the control unit of the information processing device 710 determines whether or not the information processing device 710 touches the information processing device 730 (step S1071). When the information processing device 710 does not touch the information processing device 730 (step S1071), it is continuously monitored.

When the information processing device 710 touches the information processing device 730 (step S1071), the control unit of the information processing device 710 starts the direct connection with the information processing device 730 (step S1072). In other words, the information processing device 710 functions as a P2P client, and the information processing device 730 functions as a P2P GO. Then, the control unit of the information processing device 710 receives a wireless parameter from the information processing device 730, and performs the connection process based on the received wireless parameter (step S1073).

Then, the control unit of the information processing device 710 acquires an IP address from the information processing device 730 (DHCP server) (step S1074).

Then, the control unit of the information processing device 710 determines whether or not the connection permission information has been received from the information processing device 730 (step S1075). When the connection permission information has not been received from the information processing device 730 (step S1075), the operation of the data transmission process ends.

When the connection permission information has been received from the information processing device 730 (step S1075), the control unit of the information processing device 710 transmits the capability information related to the information processing device 710 to the information processing device 730 (step S1076).

Then, the control unit of the information processing device 710 determines whether or not the setting request information has been received from the information processing device 730 (step S1077). When the setting request information has not been received (step S1077), it is continuously monitored.

When the setting request information has been received (step S1077), in the information processing device 710, the image transmission mode is set as the initial state. Then, the control unit of the information processing device 710 transmits the connection request to the information processing device 730 based on the setting request information received from the information processing device 730 (step S1078).

Then, the control unit of the information processing device 710 determines whether or not the confirmation information indicating permission for reception of an image corresponding to the connection request has been received from the information processing device 730 (step S1079). When the confirmation information has not been received from the information processing device 730 (step S1079), it is continuously monitored.

When the confirmation information has been received from the information processing device 730 (step S1079), the control unit of the information processing device 710 starts the direct P2P connection with the information processing device 730 (step S1080). Then, the control unit of the information processing device 710 performs the negotiation of the image parameter and the audio parameter with the information processing device 730 based on the connection request corresponding to the received confirmation information, and transmits the image data (step S1081).

Then, the control unit of the information processing device 710 determines whether or not the image transmission mode has been set (step S1082). Then, when the image transmission mode has been set in the information processing device 710 (step S1082), the process returns to step S1081.

Then, the control unit of the information processing device 710 determines whether or not the information processing device 710 has left the group (step S1083). Then, when the information processing device 710 has left the group (step S1083), the operation of the data transmission process ends.

When the information processing device 710 has not left the group (step S1083), the control unit of the information processing device 710 receives AP connection information from the information processing device 730 (step S1084). The AP connection information is information for disconnecting the connection between the information processing device 710 and the information processing device 730 and connecting the information processing device 710 with the access point 701.

Then, the control unit of the information processing device 710 disconnects the direct connection with the information processing device 730 (step S1085). Then, the control unit of the information processing device 710 performs the connection process for establishing the connection with the information processing device 730 via the access point 701 (step S1086).

Then, the control unit of the information processing device 710 determines whether or not the confirmation information indicating that the connection is permitted has been received from the information processing device 730 via the access point (step S1087). When the confirmation information has not been received from the information processing device 730 (step S1087), it is continuously monitored.

When the confirmation information has been received from the information processing device 730 (step S1087), the connection with the information processing device 730 via the access point 701 is established. Then, the control unit of the information processing device 710 determines whether or not the standby mode has been set (step S1088). Then, when the standby mode has been set in the information processing device 710 (step S1088), it is continuously monitored.

When the standby mode has not been set (when the image transmission mode has been set) (step S1088), the control unit of the information processing device 710 determines whether or not the line has been disconnected (step S1089). Then, when the line has been disconnected (step S1089), the operation of the data transmission process ends.

When the line is not disconnected (step S1089), the control unit of the information processing device 710 disconnects the connection with the information processing device 730 via the access point 701 (step S1090), and the process returns to step S1078.

As described above, the control unit of the information processing device 710 can perform control such that the information for performing the direct communication is interchanged using the near field communication (for example, NFC).

For example, it may be determined whether or not a touch manipulation on the information processing device 730 is valid based on whether or not the touch manipulation is registered in the control device 740. For example, for the information processing device whose terminal identification information is stored in the terminal identification information 751 (illustrated in FIG. 20) of the group management information retention unit 750, the control unit of the information processing device 730 determines the touch manipulation to be valid and gives permission for participation in the group. However, in this case, the control unit of the information processing device 730 determines to give permission for participation in the group only when it is within the period of time of the available group participation time 756 (illustrated in FIG. 20) of the group management information retention unit 750. A period of time to participate in the group after the touch manipulation may be limited to a predetermined period of time. For example, it is possible to participate in the group only in a conference time zone (for example, within one hour after touching). After a predetermined period of time elapses after touching, another session key may be used.

As described above, it is possible to easily perform a connection setting, between the source device and the sink device using the NEC. Thus, for example, the user can intuitively activate a conference participation trigger and participate in a conference more simply.

4. Fourth Embodiment

In the second and third embodiments of the present technology, the example in which the source device is connected to the sink device or the access point through the manipulation of the user or the operation of the user has been described.

Here, the source device may be connected to the access point or the sink device using the wireless LAN, and then the connection may be disconnected. In this case, the connection setting of the wireless LAN may be stored in the source device even after the connection is disconnected. In this case, the source device may be automatically connected to the access point or the sink device even if the user owning the source device does not perform a setting manipulation for connection or the like.

In this regard, in the fourth embodiment of the present technology an example in which the source devices are automatically connected to the access point or the sink device will be described. In an environment in which the source device is automatically connected to the access point or the sink device, there may be a plurality of access points connected to various kinds of sink devices. Thus, by continuously maintaining the connection of the source device to the plurality of access points through soft handover, such an environment is implemented.

First, an example in which the source device is automatically connected to the access point will be described. For example, a case in which it is automatically connected to a private wireless LAN continuously is assumed.

[Operation Example of Information Processing Device (Source Device)]

Figure 32:
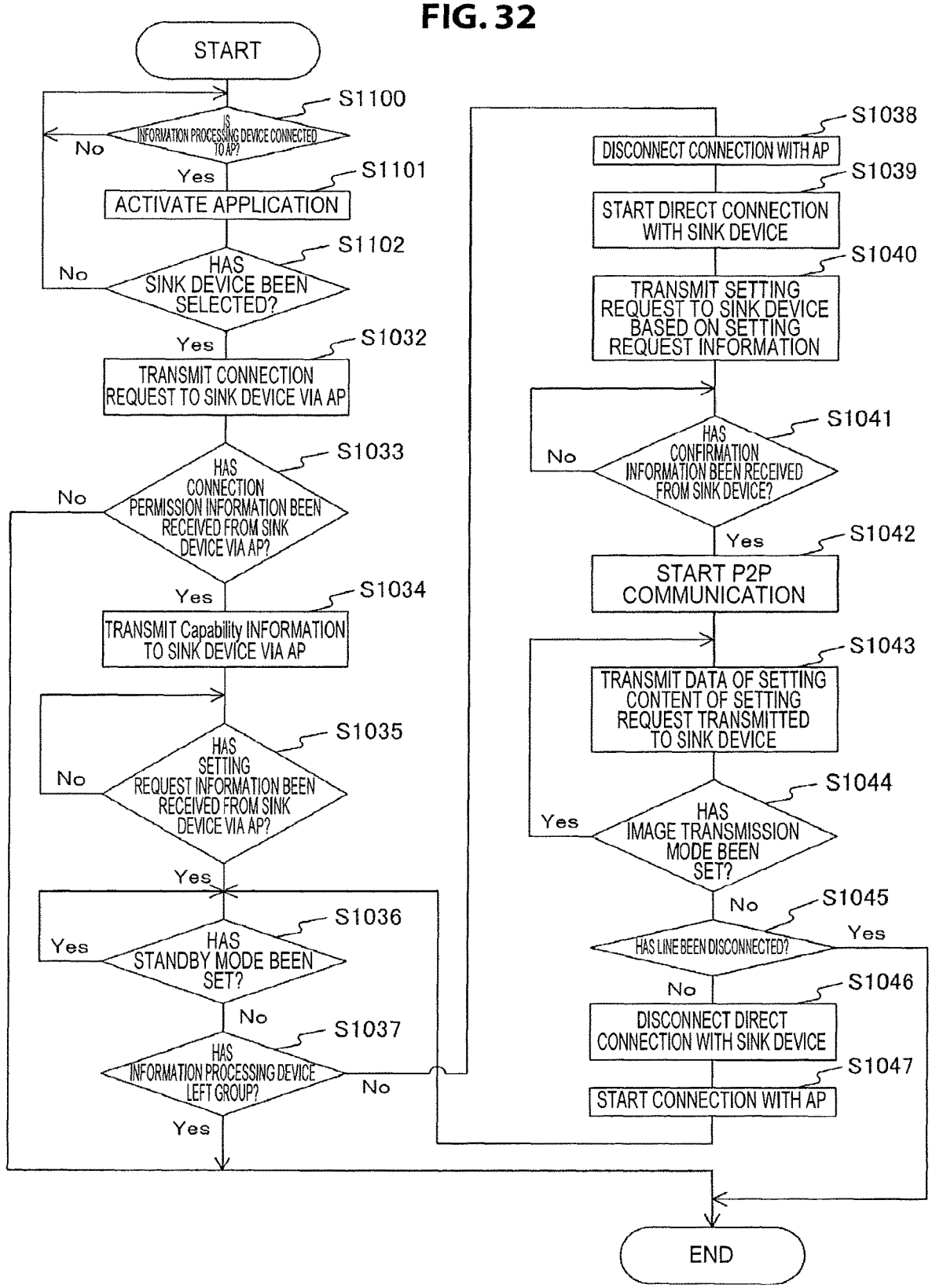
FIG. 32 is a flowchart illustrating an example of a processing procedure of a data transmission process performed by the information processing device 710 according to the fourth embodiment of the present technology.

FIG. 32 is a flowchart illustrating an example of a processing procedure of a data transmission process performed by the information processing device 710 according to the fourth embodiment of the present technology. The example illustrated in FIG. 32 is a modified example of FIG. 27, parts that are common to FIG. 27 are denoted by the same reference numerals, and thus a description thereof is partially omitted.

First, the information processing device 710 is automatically handed over and connected to the access point installed in the place in which the information processing device 710 is located (step S1100). For example, the user owning the information processing device 710 may move to a specific floor to participate in the group. In this environment, the information processing device 710 activates an application (step S1101). After the activation, the control unit of the information processing device 710 attempts the device discovery process for a sink device that is desired to be connected.

A plurality of sink devices corresponding to the activated application may be discovered through the device discovery process. In this case, the selection screen for selecting a desired sink device from a plurality of discovered sink devices may be displayed on the display unit 711 of the information processing device 710, and the desired sink device may be selected on the selection screen by the manipulation of the user (step S1102). A device closest to the source device among a plurality of discovered sink devices may be automatically selected and connected (step S1102).

Next, an example in which the source device is automatically connected to the sink device and access point will be described. For example, the connection setting of the sink device is assumed to be stored in the source device, and the source device is assumed to move into the radio wave arrival range of the sink device and be automatically connected to the sink device.

[Operation Example of Information Processing Device (Source Device)]

Figure 33:
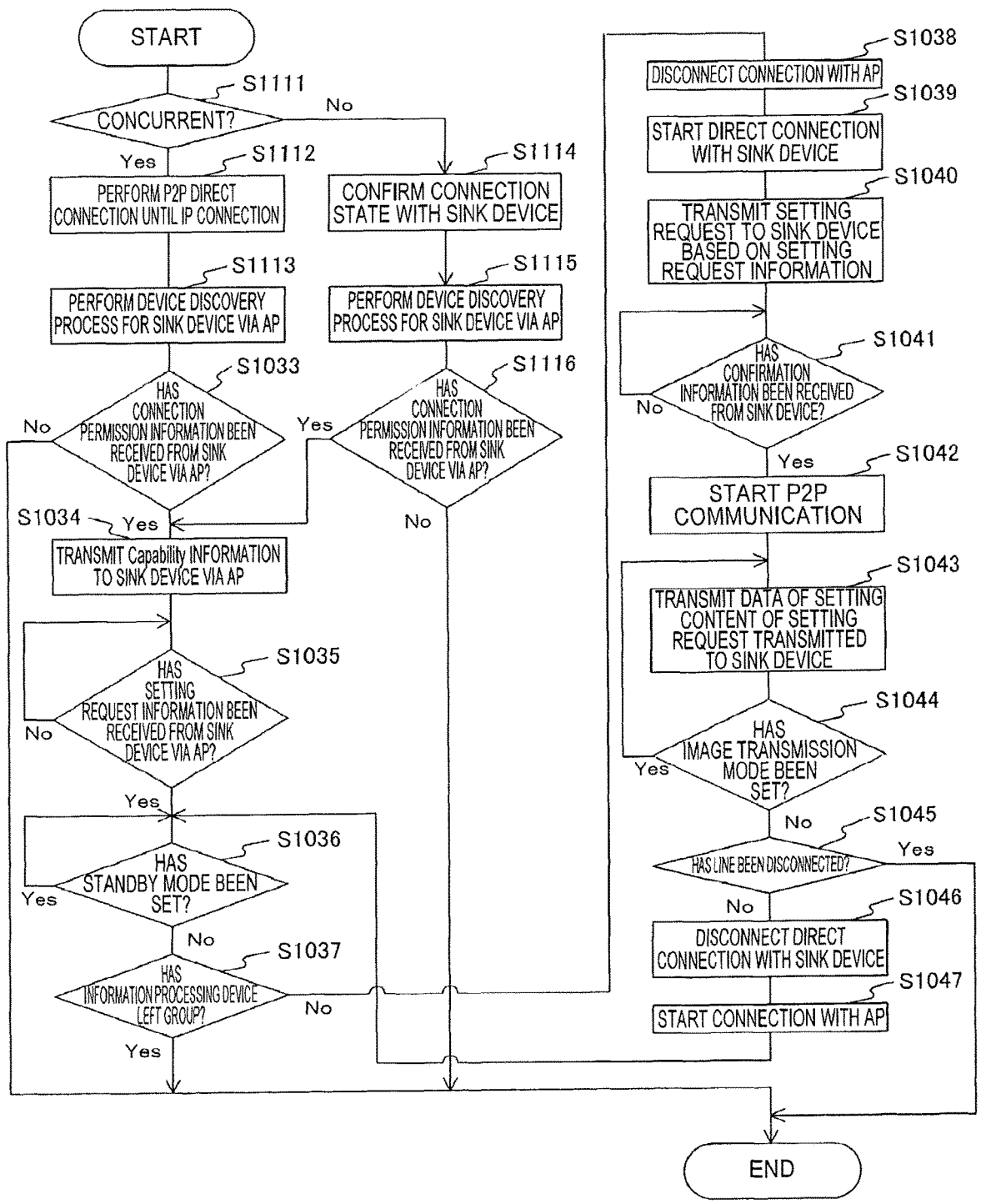
FIG. 33 is a flowchart illustrating an example of a processing procedure of a data transmission process performed by the information processing device 710 according to the fourth embodiment of the present technology.

FIG. 33 is a flowchart illustrating an example of a processing procedure of the data transmission process performed by the information processing device 710 according to the fourth embodiment of the present technology. The example illustrated in FIG. 33 is a modified example of FIG. 27, parts that are common to FIG. 27 are denoted by the same reference numerals, and thus a description thereof is partially omitted.

First, the control unit of the information processing device 710 determines whether or not the information processing device 710 has a concurrent function (a time division concurrent function or a simultaneous use concurrent function) as a wireless LAN function (step S1111). When the information processing device 710 has the concurrent function, the information processing device 710 can establish the time division connection or the simultaneous connection with both of the access point and the sink device without performing disconnection switching of the access point and the sink device.

When the information processing device 710 has the concurrent function (step S1111), the control unit of the information processing device 710 performs a setting, (a setting up to acquisition of an IP address) up to a layer 3 through the automatic connection (step S1112). Then, the control unit of the information processing device 710 makes an attempt to establish the connection with the sink device via the access point (step S1113). Here, when the connection with the sink device is established based on both links of the connection via the access point and the direct P2P connection, it is desirable that the device discovery process be performed through only one of the connection via the access point and the direct P2P connection. For example, a priority may be given to the connection via the access point, only link connection may be maintained for the direct P2P connection, and the image transmission according to the Wi-Fi CERTIFIED Miracast may be stopped. In this case, in the image transmission mode, a high-speed operation can be performed during a next switching period of time without wasting the frequency band used in the Wi-Fi CERTIFIED Miracast.

When the information processing device 710 has no concurrent function (step S1111), the control unit of the information processing device 710 confirms the connection state with the sink device (step S1114). Here, for example, when the connection with the sink device is the direct P2P connection, the direct P2P connection is first disconnected and switching to the connection via the access point is performed. Further, when the connection with the sink device is the connection via the access point, the connection is maintained. Further, when the information processing device 710 has no concurrent function, the port information and the IP information of the connection state are retained in the information processing device 710 and diverted.

Then, the control unit of the information processing device 710 performs the device discovery process via the access point (step S1115). After the device discovery process, the control unit of the information processing device 710 determines whether or not the connection permission information has been received from the sink device via the access point (step S1116).

Here, in an environment in which the number of participating devices is small, direct P2P connection may be maintained without change. In this case, when the connection permission information has been received from the sink device via the access point (step S1116), the process proceeds to step S1038.

As described above, it is possible to appropriately detect the current setting information without the user worrying about the connection setting. Further, it is possible to perform association so that the same operation as in the second embodiment of the present technology is performed.

The present technology is not limited to the embodiments of the present technology. For example, a device connected in the Wi-Fi infrastructure mode may cause the device discovery to be performed on only a device (for example, a device that conforms to the Wi-Fi CERTIFIED Miracast specification) connected to the same IP sub network. Further, the device having the concurrent function, for example, the device connected in the Wi-Fi infrastructure mode, can be a device that performs a concurrent process of the same channel in the P2P manner.

In the embodiments of the present technology, transmission of an image (video) or audio via the access point is not considered, but the present technology is not limited to this example. For example, the embodiments of the present technology can be applied even to the following environment. For example, the embodiments of the present technology can be applied to a form in which the source device transmits an image (video) or audio to the sink device connected to the same IP sub network in the Wi-Fi infrastructure mode via an IP network of the Wi-Fi infrastructure mode. Further, for example, the embodiments of the present technology can be applied to a form in which the sink device receives an image (video) or audio from the source device connected to the same IP sub network in the Wi-Fi infrastructure mode via an IP network of the Wi-Fi infrastructure mode.

5. Application Examples

The technology of the present disclosure can be applied to various products. For example, the information processing device 200, 300, 400, 703, 704, 710, 720, 730, and the control device 740 may be realized as a mobile terminal such as a smartphone, a tablet-type personal computer (PC), a notebook PC, a portable game terminal, or a digital camera, a fixed-type terminal such as a television receiver set, a printer, a digital scanner, or a network storage, or an in-vehicle terminal such as a car navigation device. In addition, the information processing device 200, 300, 400, 703, 704, 710, 720, 730, and the control device 740 may be realized as a terminal which performs machine-to-machine (M2M) communication (which is also referred to as a machine-type communication (MTC) terminal) such as a smart meter, a vending machine, a remote monitoring device, or a point-of-sale (POS) terminal. Furthermore, the information processing device 200, 300, 400, 703, 704, 710, 720, 730, and the control device 740 may be a wireless communication module (for example, an integrated circuit module configured in one die) mounted in these terminals.

5-1. First Application Example

Figure 40:
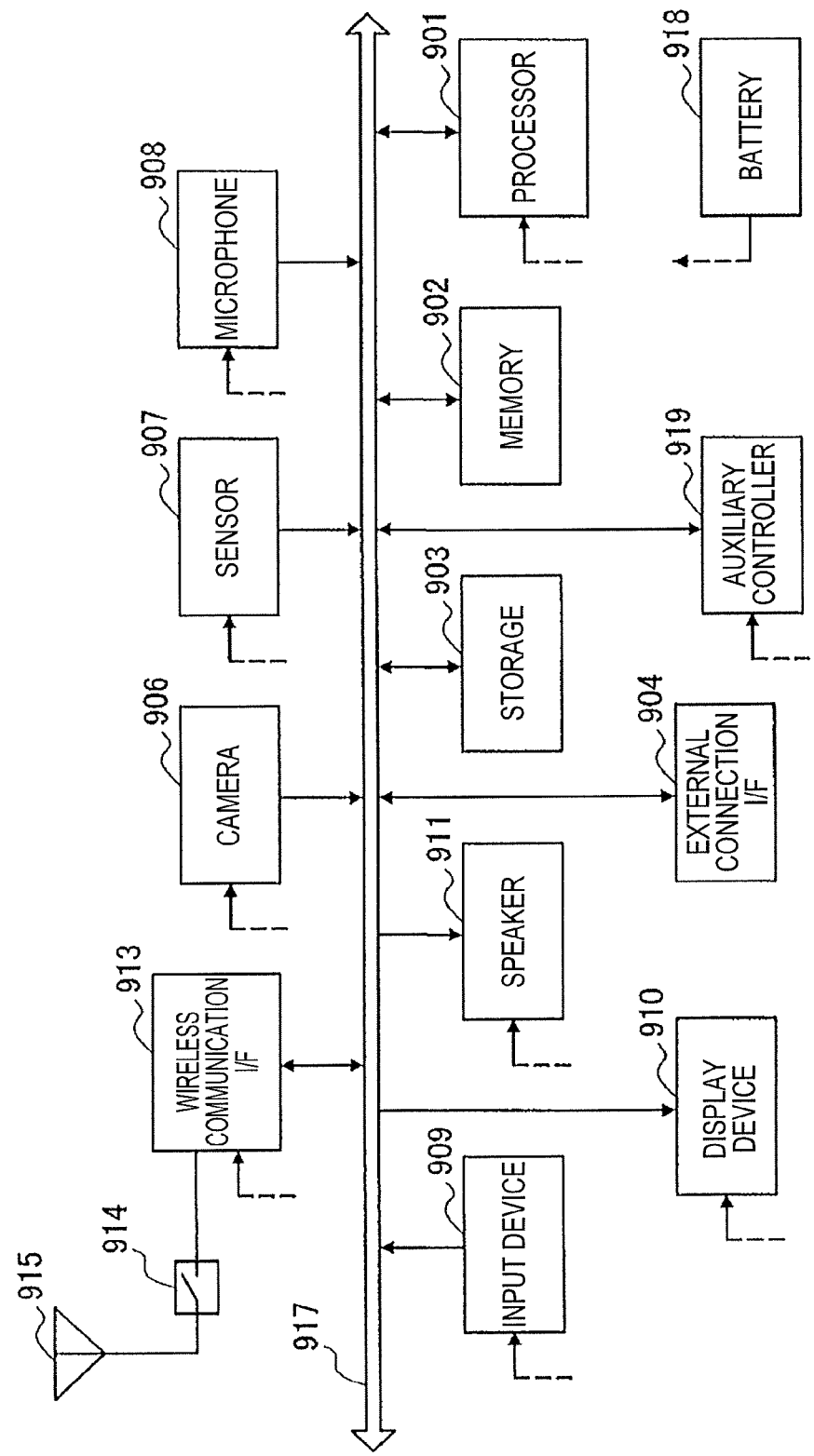
FIG. 40 is a block diagram illustrating an example of a schematic configuration of a smartphone.

FIG. 40 is a block diagram showing an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on a chip (SoC), and controls functions of an application layer and another layer of the smartphone 900. The memory 902 includes a random access memory (RAM) and a read only memory (ROM), and stores a program that is executed by the processor 901, and data. The storage 903 may include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smart lone 900. The speaker 911 converts audio signals that are output from the smartphone 900 to sounds.

The wireless communication interface 913 supports one or more of wireless LAN standards such as IEEE 802.11a, 11b, 11g, 11n, 11ac, and 11ad to execute wireless communication. The wireless communication interface 913 can communicate with another device via a wireless LAN access point in an infrastructure mode. In addition, the wireless communication interface 913 can directly communicate with another device in an ad hoc mode or a direct communication mode such as Wi-Fi direct, or the like. In the Wi-Fi Direct, unlike the ad-hoc mode, one of two terminals operates as an access point, but communication is performed directly between the terminals. The wireless communication interface 913 can typically include a baseband processor, a radio frequency (RF) circuit, and a power amplifier. The wireless communication interface 913 may be a one-chip module in which a memory which stores a communication control program, a processor which executes the program and a relevant circuit are integrated. The wireless communication interface 913 may support other kinds of wireless communication schemes such as a near field wireless communication scheme, a proximity wireless communication scheme or a cellular communication scheme in addition to the wireless LAN scheme. The antenna switch 914 switches connection destinations of the antenna 915 between a plurality of circuits (for example, circuits for different wireless communication schemes) included in the wireless communication interface 913. The antenna 915 has a single or a plurality of antenna elements (for example, a plurality of antenna elements which constitute a MIMO antenna), which are used by the wireless communication interface 913 for transmission and reception of radio signals.

It should be noted that the smartphone 900 is not limited to the example of FIG. 40 and may include a plurality of antennas (for example, an antenna for a wireless LAN, an antenna for the proximity wireless communication scheme, etc.). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to blocks of the smartphone 900 illustrated in FIG. 40 via feeder lines, which are partially shown as dashed lines in the figure. The auxiliary controller 919 operates a minimum necessary function of the smartphone 900, for example, in a sleep mode.

In the smartphone 900 shown in FIG. 40, the control unit 240, and the control unit 370 described using FIG. 3 may be implemented by the wireless communication interface 913. In addition, at least some of these functions may be implemented by the processor 901 or the auxiliary controller 919.

The smartphone 900 may operate as a wireless access point (software AP) by executing an access point function at an application level through the processor 901. Further, the wireless communication interface 913 may have a wireless access point function.

5-2. Second Application Example

Figure 41:
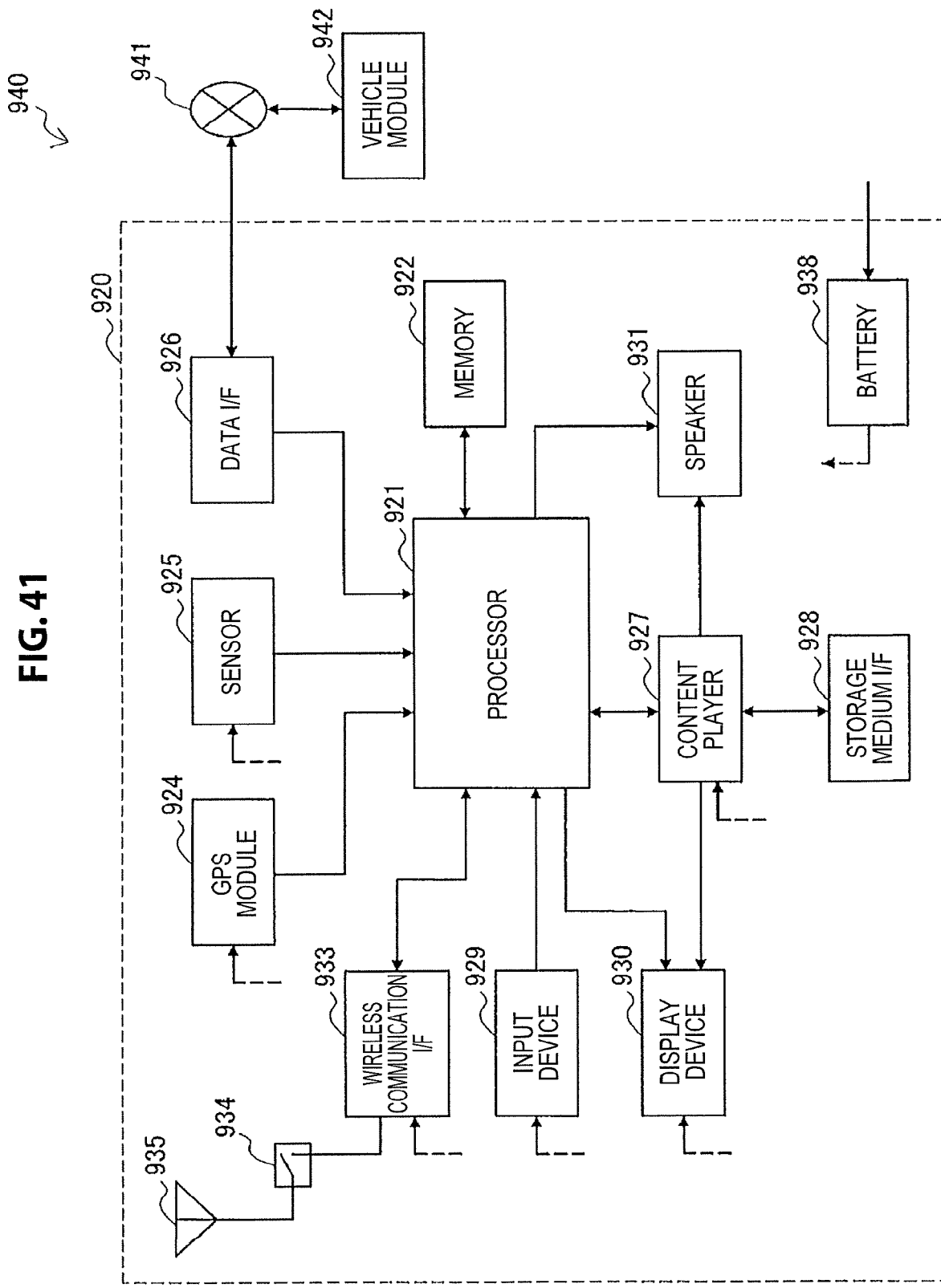
FIG. 41 is a block diagram illustrating an example of a schematic configuration of a car navigation device.

FIG. 41 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports one or more of wireless LAN standards such as IEEE 80.2.11a, 11b, 11g, 11n, 11ac, and 11ad to execute wireless communication. The wireless communication interface 933 can communicate with another device via a wireless LAN access point in an infrastructure mode. In addition, the wireless communication interface 933 can directly communicate with another device in an ad hoc mode or a direct communication mode such as Wi-Fi Direct. The wireless communication interface 933 can typically include a baseband processor, an RF circuit, and a power amplifier. The wireless communication interface 933 may be a one-chip module in which a memory which stores a communication control program, a processor which executes the program and a relevant circuit are integrated. The wireless communication interface 933 may support other kinds of wireless communication schemes such as a near field wireless communication scheme, a proximity wireless communication scheme or a cellular communication scheme in addition to the wireless LAN scheme. The antenna switch 934 switches connection destinations of the antenna 935 between a plurality of circuits included in the wireless communication interface 933. The antenna 935 has a single or a plurality of antenna elements, which are used by the wireless communication interface 933 for transmission and reception of radio signals.

In addition, the car navigation device 920 may include a plurality of antennas, not limited to the example of FIG. 41. In that case, the antenna switches 934 may be omitted from the configuration of the car navigation device 920.

The battery 938 supplies power to blocks of the car navigation device 920 illustrated in FIG. 41 via feeder lines that are partially shown as dashed lines in the figure. The battery 938 accumulates power supplied form the vehicle.

In the car navigation device 920 illustrated in FIG. 41, the control unit 240 described using FIG. 2 and the control unit 370 described using FIG. 3 may be implemented by the wireless communication interface 933. At least a part of the functions may also be implemented by the processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disc), a memory card, and a Blu-ray disc (registered trademark) can be used.

Effects described in the present description are just examples, the effects are not limited, and there may be other effects.

Additionally, the present technology may also be configured as below.

(1)

An information processing device that performs real-time image transmission with another information processing device according to a wireless fidelity (Wi-Fi) CERTIFIED Miracast specification, including:

a control unit configured to perform control such that setting request information for performing a setting related to the real-time image transmission is received from the other information processing device via an access point, and a setting request for performing the setting based on the setting request information is transmitted to the other information processing device through direct communication.

(2)

The information processing device according to (1), wherein the control unit interchanges capability information related to the information processing device with the other information processing device via the access point, and the other information processing device generates the setting request information based on the capability information.

(3)

The information processing, device according to (1) or (2), wherein the control unit performs control such that, when switching between a connection state with the other information processing device via the access point and a connection state with the other information processing device through the direct communication is performed, a connection process is performed using at least one of port information and IP information related to a connection before the switching.

(4)

The information processing device according to any of (1) to (3), wherein the control unit performs control such that image transmission according to the Wi-Fi CERTIFIED Miracast specification is performed through the direct communication after the setting request is transmitted to the other information processing device.

(5)

The information processing device according to (4), wherein the control unit performs control such that an image displayed on a predetermined region in a display unit is transmitted through a wireless transmission path of a low frequency band, and an image displayed on a region larger than the predetermined region in the display unit is transmitted through a wireless transmission path of a high frequency band.

(6)

The information processing device according to any of (1) to (5), wherein the control unit performs control such that the setting request is transmitted to the other information processing device through the direct communication based on a manipulation of a user.

(7)

The information processing device according to any of (1) to (5), wherein the control unit performs control such that, when there are a plurality of information processing devices configured to perform image transmission through the direct communication, the setting request is transmitted to the other information processing device through the direct communication based on a predetermined order.

(8)

The information processing device according to any of (1) to (7), wherein the control unit performs control such that permission information indicating whether or not a connection with the other information processing device via an access point other than the access point or a base station is permitted is interchanged via the access paint, and when the permission information indicating that the connection is permitted is received, an interchange with the other information processing device via the access point other than the access point or the base station is performed.

(9)

The information processing device according to (8), wherein the control unit performs control such that, when the permission information indicating that the connection is permitted is received, at least one of image data and audio data is received from the other information processing device via the access point other than the access point or the base station and output.

(10)

The information processing device according to any of (1) to (9), wherein the control unit performs control such that information for performing the direct communication is interchanged using near field communication.

(11)

An information processing device that performs real-time image transmission with another information processing device according to a Wi-Fi CERTIFIED Miracast specification, including:

a control unit configured to perform control such that setting request information for performing a setting related to the real-time image transmission is transmitted to the other information processing device via an access point, and a setting request for performing the setting based on the setting request information is received from the other information processing device through direct communication.

(12)

An information processing device, including:

a control unit configured to perform control such that, when real-time image transmission is performed between a sink device and a plurality of source devices according to a CERTIFIED Miracast specification, any one communication mode of a standby mode in which the sink device and the source devices are connected via an access point and an image transmission mode in which the sink device and the source devices are connected through direst communication is set in the source devices.

(13)

The information processing device according to (12), wherein the control unit performs control such that an image indicating the plurality of source devices is displayed on an input and output unit, and the communication mode is set in the source device based on an manipulation input in the input and output unit.

(14)

The information processing device according to (12), wherein the control unit performs control such that the communication mode is set in the source device based on a predetermined order.

(15)

An information processing system, including:

a sink device configured to perform real-time image transmission with a source device according to a Wi-Fi CERTIFIED Miracast specification and perform control such that a setting request information for causing the source device to perform a setting related to the real-time image transmission is transmitted to the source device via an access point, and a setting request for performing the setting based on the setting request information is received from the source device through direct communication with the source device; and a control device configured to perform control such that, when the real-time image transmission is performed between the sink device and the plurality of source devices, any one communication mode of a standby mode in which the sink device and the source devices are connected via the access point and an image transmission mode in which the sink device and the source devices are connected through the direct communication is set in the source devices.

(16)

An information processing method, including;

a first process of performing real-time image transmission with another information processing device according to a Wi-Fi CERTIFIED Miracast specification;

a second process of receiving setting request information for performing a setting related to the real-time image transmission from the other information processing device via an access point; and a third process of transmitting a setting request for performing the setting based on the setting request information to the other information processing device through direct communication.

REFERENCE SIGNS LIST 100 communication system
200 information processing device
210 antenna
220 wireless communication unit
230 control signal reception unit
240 control unit
250 image and audio signal generation unit
260 image and audio compression unit
270 stream transmission unit
300 information processing device
310 antenna
320 wireless communication unit
330 stream reception unit
340 image and audio decompression unit
350 image and audio output unit
351 display unit
352 audio output unit
360 user information acquisition unit
370 control unit
380 control signal transmissions unit
390 management information retention unit
400 information processing device
610 source device
611 access point
612 sink device
700 communication system
701 access point
702 network
703 to 705, 710, 720, 730 information processing device
711, 721 display unit
731 display device
732 display unit
740 control device
741 antenna
742 wireless communication unit
743 input and output unit
744 display unit
745 input unit
746 manipulation reception
747 control unit
750 group management information retention unit
900 smartphone
901 processor
902 memory
903 storage
904 external connection interface 906 camera
907 sensor
908 microphone
909 input device
910 display device
911 speaker
913 wireless communication interface
914 antenna switch
915 antenna
917 bus
918 battery
919 auxiliary controller
920 car navigation device
921 processor
922 memory
924 GPS module
925 sensor
926 data interface
927 content player
928 storage medium interface
929 input device
930 display device
931 speaker
933 wireless communication interface
934 antenna switch
935 antenna
938 battery
941 in-vehicle network
942 vehicle module

The invention claimed is:

1. An information processing device, comprising:
circuitry configured to perform control such that, under a condition that real-time image transmission is performed between a sink device and a plurality of source devices, any one of the plurality of source devices is settable to a communication mode of an image transmission mode in which the sink device and the source devices are connected, and other source devices which are different from the one of the plurality of the source devices are settable in a standby mode in which the sink device and the other source devices are connected via an access point.

2. The information processing device according to claim 1, wherein
the circuitry is configured to perform control such that an image indicating the plurality of source devices is displayed on a user interface and the communication mode is set in the one of the plurality of source devices based on an manipulation input to the user interface.

3. The information processing device according to claim 1, wherein
the circuitry is configured to perform control such that the communication mode is set in the one of the plurality of source devices based on a predetermined order.

4. An information processing system, comprising:
a sink device configured to perform real-time image transmission with a plurality of source devices and perform control such that a setting request information for causing at least one of the plurality of source devices to perform a setting related to the real-time image transmission is transmitted to the at least one of the plurality of source devices via an access point, and a setting request for performing the setting based on the setting request information is received from the at least one of the plurality of source devices; and
a control device configured to perform control such that, under a condition that the real-time image transmission is performed between the sink device and the plurality of source devices, any one of the plurality of source devices is settable to a communication mode of an image transmission mode in which the sink device and the source devices are connected, and other source devices which are different from the one of the plurality of the source devices are settable in a standby mode in which the sink device and the other source devices are connected via the access point.

* * * * *